United States Patent [19]

Miyoshi et al.

[11] Patent Number: 5,501,201
[45] Date of Patent: Mar. 26, 1996

[54] FLOW QUANTITY VALVE CONTROLLER AND MANUFACTURING METHOD FOR FLOW QUANTITY VALVE

[75] Inventors: Sotsuo Miyoshi; Hidetoshi Okada; Hajime Kako; Hirofumi Ohuchi; Satoshi Kawamura; Toshihiko Miyake, all of Hyogo, Japan

[73] Assignee: Mitsubishi Denki Kabushiki Kaisha, Tokyo, Japan

[21] Appl. No.: 407,705

[22] Filed: Mar. 21, 1995

[30] Foreign Application Priority Data

Jun. 3, 1994 [JP] Japan .......................... 6-122582

[51] Int. Cl.$^6$ ............................ F02M 25/07; F16K 31/04
[52] U.S. Cl. ..................... 123/571; 251/129.11; 318/600
[58] Field of Search ............... 123/339.23, 339.26, 123/571; 251/129.11, 129.12, 129.05; 318/600, 601, 602, 603, 626

[56] References Cited

U.S. PATENT DOCUMENTS

| | | | |
|---|---|---|---|
| 4,392,468 | 7/1983 | Kobashi et al. | 123/339.26 |
| 4,782,811 | 11/1988 | Hewette et al. | 123/571 |
| 4,845,416 | 7/1989 | Scholl et al. | 251/129.11 |
| 5,094,218 | 3/1992 | Everingham et al. | 123/571 |
| 5,129,623 | 7/1992 | Lockwood | 123/571 |
| 5,137,255 | 8/1992 | Sumida et al. | 251/129.11 |
| 5,184,593 | 2/1993 | Kobayashi | 123/571 |
| 5,351,935 | 10/1994 | Miyoshi et al. | 251/129.11 |

FOREIGN PATENT DOCUMENTS

| | | |
|---|---|---|
| 2238162 | 9/1990 | Japan . |
| 2241963 | 9/1990 | Japan . |
| 3203599 | 9/1991 | Japan . |

*Primary Examiner*—Willis R. Wolfe
*Attorney, Agent, or Firm*—Sughrue, Mion, Zinn, Macpeak & Seas

[57] ABSTRACT

A flow quantity valve controller includes a unit for positioning so that a phase of a stepper motor becomes a predetermined phase when a motor shaft making a linear move with rotation of the stepper motor is pulled most into the stepper motor side. When the motor shaft is pulled most into the stepper motor side, a flow quantity valve controller changes a stepper motor drive signal to a drive signal corresponding to a predetermined phase.

28 Claims, 33 Drawing Sheets

Ft : INITIALIZATION TIME FLAG
C : COUNTER
Fi : INITIALIZATION FLAG

5,501,201

FLOW QUANTITY VALVE CONTROLLER AND MANUFACTURING METHOD FOR FLOW QUANTITY VALVE

BACKGROUND OF THE INVENTION

1. Field of the Invention

This invention relates to a controller of a flow quantity valve of a stepper motor type for controlling the flow quantity of a fluid flowing through a flow path disposed in an internal combustion engine and, for example, is applied to exhaust gas recirculation control valves, idle rotation speed control valves, etc.

2. Description of the Related Art

As an exhaust gas recirculation control valve used with an exhaust gas recirculation controller of an internal combustion engine, one which is opened and closed electrically by a stepper motor is already proposed, for example, as shown in Japanese Patent Unexamined Publication No. Hei 2-238162.

By the way, generally such an exhaust gas recirculation controller is not provided with a position sensor for detecting the valve position of an exhaust gas recirculation control valve for reducing costs. Thus, to know how much the exhaust gas recirculation control valve is opened, with a predetermined valve position as a reference point, the number of times a drive signal in the valve opening or closing direction has been given to a stepper motor is counted since the valve is at the reference point, thereby finding the assumed position of the valve, namely, the current opening of the exhaust gas recirculation control valve.

Therefore, with such an exhaust gas recirculation controller, it becomes important to move the valve position of the exhaust gas recirculation control valve to the reference point and reset the assumed position to a predetermined value at the reference point as initialization accurately.

Initialization in conventional exhaust gas recirculation controllers is, for example, to move a valve to the fully closed position and then reset the value of the assumed position to 0.

However, when the valve is fully closed, what phase the stepper motor is in is unknown, and the phase varies from one exhaust gas recirculation control valve to another.

For example, we will discuss this problem with an exhaust gas recirculation control valve using a four-phase stepper motor. When the valve is fully closed, the stepper motor also stops at a predetermined position. However, which of phases 0 to 3 the stepper motor at the predetermined position is in is unknown.

Therefore, to next drive the valve by one step in the valve opening direction, which phase 0 or 2 a drive signal for opening the valve by one step is to be given from is unknown; what drive signal is to be given to the stepper motor cannot be specified. If the stepper motor phase does not match the drive signal, the stepper motor cannot be turned.

Therefore, if the stepper motor phase does not match the drive signal, although a drive signal in the valve opening direction is given to the stepper motor five times, actually the valve may be driven by three steps. Thus, accurate exhaust gas recirculation control cannot be performed.

In the conventional exhaust gas recirculation controllers, initialization is executed only when the internal combustion engine is started or stopped. Thus, if the stepper motor moves out of adjustment during exhaust gas recirculation control, it cannot stay in adjustment until the key switch is handled.

SUMMARY OF THE INVENTION

It is therefore a first object of the invention to provide a flow quantity valve controller which can execute initialization accurately and easily.

It is a second object of the invention to easily position a stepper motor phase at initialization at an integral-type flow quantity valve comprising a motor shaft making a linear move with rotation of a rotor of a stepper motor and a valve shaft being linearly moved by the motor shaft and having a body on one end. The integral-type flow quantity value is so constituted that the motor shaft and the valve shaft are integrated into one piece (coupled together).

It is a third object of the invention to easily position a stepper motor phase at initialization at a separate-type flow quantity valve comprising a motor shaft and a valve shaft mechanically separated from each other.

It is a fourth object of the invention to improve control precision of a flow quantity valve controller by accurately adjusting the distance from the position where a motor shaft is pulled most into the stepper motor side to one end of a valve shaft when a body is at the fully closed position at a separate-type flow quantity valve.

It is a fifth object of the invention to accurately and easily adjusting the distance from the position where a motor shaft is pulled most into the stepper motor side to one end of a valve shaft when a body is at the fully closed position at a separate-type flow quantity valve.

It is a sixth object of the invention to more accurately and easily adjusting the distance from the position where a motor shaft is pulled most into the stepper motor side to one end of a valve shaft when a body is at the fully closed position at a separate-type flow quantity valve.

It is a seventh object of the invention to prevent a stepper motor from moving out of adjustment at initialization for accurate initialization.

It is an eighth object of the invention to prevent a stepper motor from moving out of adjustment at initialization by changing the frequency of a stepper motor drive signal.

It is a ninth object of the invention to prevent a stepper motor from moving out of adjustment at initialization by changing the travel distance of the stepper motor.

It is a tenth object of the invention to prevent a stepper motor from moving out of adjustment at initialization by smoothing a move of the stepper motor.

It is an eleventh object of the invention to prevent a stepper motor from moving out of adjustment at initialization by changing the driving force of the stepper motor.

It is a twelfth object of the invention to physically suppress out-of-adjustment of a stepper motor at initialization by mechanical adjustment at a separate-type flow quantity valve.

It is a thirteenth object of the invention to prevent a stepper motor from moving out of adjustment and control precision from worsening when the flow quantity is controlled, particularly when the stepper motor rotation direction is reversed.

It is a fourteenth object of the invention to prevent a stepper motor from moving out of adjustment when the rotation direction changes by changing the frequency of a stepper motor drive signal.

It is a fifteenth object of the invention to prevent a stepper motor from moving out of adjustment by once holding the stepper motor when the rotation direction changes.

It is a sixteenth object of the invention to prevent a stepper motor from moving out of adjustment when the rotation direction changes by changing the travel distance of the stepper motor.

It is a seventeenth object of the invention to prevent a stepper motor from moving out of adjustment when the rotation direction changes by smoothing a move of the stepper motor.

It is an eighteenth object of the invention to improve control precision of a flow quantity valve controller by increasing initialization frequency.

It is a nineteenth object of the invention to maintain control precision of a flow quantity valve controller by executing initialization in a run condition in which initialization may be executed.

It is a twentieth object of the invention to execute initialization at the same time without impairing control of a flow quantity valve controller.

It is a twenty-first object of the invention to eliminate the need for means for positioning a stepper motor phase when a motor shaft is pulled most into the stepper motor side at a separate-type flow quantity valve, and enable accurate initialization to be executed.

It is a twenty-second object of the invention to eliminate the need for means for positioning a stepper motor phase when a motor shaft is pulled most into the stepper motor side and second adjustment means at a separate-type flow quantity valve, and enable accurate initialization to be executed in a simple configuration.

It is a twenty-third object of the invention to eliminate the need for means for positioning a stepper motor phase when a motor shaft is pulled most into the stepper motor side and second adjustment means at an integral-type or separate-type flow quantity valve, and enable accurate initialization to be executed.

It is a twenty-fourth object of the invention to provide a method for manufacturing a flow quantity valve to enable easy adjusting of the distance from the position where a motor shaft is pulled most into the stepper motor side to one end of a valve shaft when a body is at the fully closed position at a separate-type flow quantity valve.

It is a twenty-fifth object of the invention to provide a method for manufacturing a flow quantity valve to enable easy and accurate adjusting of the distance from the position where a motor shaft is pulled most into the stepper motor side to one end of a valve shaft when a body is at the fully closed position at a separate-type flow quantity valve.

It is a twenty-sixth object of the invention to provide a method for manufacturing a flow quantity valve to enable easy adjusting of a stepper motor phase when a motor shaft is pulled most into the stepper motor side at an integral-type flow quantity valve.

It is a twenty-seventh object of the invention to provide a method for manufacturing a flow quantity valve to enable easy adjusting of a stepper motor phase when a motor shaft is pulled most into the stepper motor side at a separate-type flow quantity valve.

It is a twenty-eighth object of the invention to provide a method for manufacturing a flow quantity valve to enable easy adjusting of a stepper motor phase when a motor shaft is at a predetermined position at an integral-type or separate-type flow quantity valve.

The flow quantity valve controller according to the invention comprises means for positioning so that a phase of the stepper motor becomes a predetermined phase when the motor shaft is pulled most into the stepper motor side. When the motor shaft is pulled most into the stepper motor side, the stepper motor drive signal is changed to a drive signal corresponding to a predetermined phase. Thus, the flow quantity valve controller can perform accurate initialization.

The flow quantity valve controller according to the invention comprises the positioning means made of a spacer member provided between the motor case and the valve body or the shaft length of the motor shaft at an integral-type flow quantity valve.

The flow quantity valve controller according to the invention comprises the positioning means made up of lock members formed on the rotor and the motor shaft at a separate-type flow quantity valve.

The flow quantity valve controller according to the invention comprises first adjustment means for adjusting an interval between a position of the motor shaft when it is pulled most into the stepper motor side and the other end of the valve shaft at the fully closed position to a predetermined distance at a separate-type flow quantity valve.

The flow quantity valve controller according to the invention comprises the first adjustment means made of a spacer member stacked between the motor case and the valve body at a separate-type flow quantity valve.

The flow quantity valve controller according to the invention comprises the first adjustment means made up of a screw groove formed at the a tip of one end of the motor shaft on the valve shaft side and a screw member threadedly engaging the screw groove at a separate-type flow quantity valve.

The flow quantity valve controller according to the invention comprises first drive method change means for changing the drive method of the stepper motor when initialization is executed at a position where the motor shaft is pulled most into the stepper motor side.

The flow quantity valve controller according to the invention comprises the first drive method change means for lessening the drive signal frequency as compared with normal control time.

The flow quantity valve controller according to the invention comprises the first drive method change means for lessening the travel distance of the stepper motor for each drive signal as compared with normal control time.

The flow quantity valve controller according to the invention comprises the first drive method change means for driving the stepper motor by a PWM signal.

The flow quantity valve controller according to the invention comprises the first drive method change means for lessening a driving force of the stepper motor as compared with normal control time.

The flow quantity valve controller according to the invention comprises the first adjustment means for adjusting the distance between the position where the motor shaft is pulled most into the stepper motor side and the other end of the valve shaft at the fully closed position to less than a distance at which the motor shaft moves the number of steps twice the number of phases of the stepper motor.

The flow quantity valve controller according to the invention comprises second drive method change means for changing the drive method of the stepper motor when the driving direction of the stepper motor is changed.

The flow quantity valve controller according to the invention comprises the second drive method change means for lessening the drive signal frequency as compared with normal control time.

The flow quantity valve controller according to the invention comprises the second drive method change means for changing the drive direction after once holding the stepper motor.

The flow quantity valve controller according to the invention comprises the second drive method change means for lessening the travel distance of the stepper motor for each drive signal as compared with normal control time.

The flow quantity valve controller according to the invention comprises the second drive method change means for driving the stepper motor by a PWM signal.

The flow quantity valve controller according to the invention comprises means for detecting a specific run condition and performs initialization only once whenever the specific run condition detection means detects a specific run condition.

The flow quantity valve controller according to the invention sets the specific run condition to a run condition in which initialization may be executed.

The flow quantity valve controller according to the invention comprises specific target position detection means for detecting the target position being a predetermined specific target position and performs initialization when the specific target position detection means detects a specific target position.

The flow quantity valve controller according to the invention comprises flow quantity valve control means, when the motor shaft is pulled most into the stepper motor side, for giving a predetermined drive signal to the stepper motor in sequence before initialization. The position of the motor shaft after the drive signal is given in sequence is adjusted to the other end of the valve shaft by second adjustment means.

The flow quantity valve controller according to the invention drives the stepper motor by a drive signal of a frequency at which out-of-adjustment does not occur in a no-load condition and occurs when the motor shaft abuts against the other end of the valve shaft and executes initialization after the stepper motor moves out of adjustment.

The flow quantity valve controller according to the invention drives the stepper motor by a drive signal of a frequency more than a frequency that can be followed up by the stepper motor and executes initialization after the body abuts against the valve seat.

The method for manufacturing a flow quantity valve according to the invention comprises the step of adjusting the interval between the position of a motor shaft when the motor shaft is pulled most into the stepper motor side and the other end of a valve shaft at the fully closed position to a predetermined distance by means of a spacer member.

The method for manufacturing a flow quantity valve according to the invention comprises the step of adjusting the interval between the position of a motor shaft when the motor shaft is pulled most into the stepper motor side and the other end of a valve shaft at the fully closed position to a predetermined distance by means of a screw member threadedly engaging a screw groove formed on the motor shaft.

The method for manufacturing a flow quantity valve according to the invention comprises the step of stacking a spacer member between a motor case and a valve body for adjusting so that a phase of a stepper motor becomes a predetermined phase when a motor shaft is pulled most into the stepper motor side or providing a plurality of motor shafts different in shaft length and selecting one motor shaft from among them for adjusting.

The method for manufacturing a flow quantity valve according to the invention comprises the steps of providing a plurality of rotors or motor shafts different in position of positioning means and selecting one rotor or motor shaft from among them so that a phase of a stepper motor becomes a predetermined phase when the motor shaft is pulled most into the stepper motor side.

The method for manufacturing a flow quantity valve according to the invention comprises the step of changing signal lines of drive signal of a stepper motor so that the stepper motor phase when a motor shaft is at a predetermined position becomes a predetermined phase.

In the flow quantity valve controller thus configured, the stepper motor phase when the motor shaft is pulled most into the stepper motor side is defined by the positioning means, and the stepper motor drive signal is changed to a drive signal corresponding to a predetermined phase.

The positioning is performed by means of the spacer member provided between the motor case and the valve body or the shaft length of the motor shaft if the flow quantity valve is of integral type.

The positioning is performed by means of the lock members formed on the rotor and the motor shaft if the flow quantity valve is of separate type.

The first adjustment means adjusts the interval between the position of the motor shaft when it is pulled most into the stepper motor side and the other end of the valve shaft at the fully closed position to a predetermined distance at a separate-type flow quantity valve.

The spacer member as the first adjustment means adjusts the interval between the position of the motor shaft when it is pulled most into the stepper motor side and the other end of the valve shaft at the fully closed position to a predetermined distance at a separate-type flow quantity valve.

The screw groove and screw member as the first adjustment means adjust the interval between the position of the motor shaft when it is pulled most into the stepper motor side and the other end of the valve shaft at the fully closed position to a predetermined distance at a separate-type flow quantity valve.

The first drive method change means changes the drive method of the stepper motor when initialization is executed at a position where the motor shaft is pulled most into the stepper motor side.

The first drive method change means lessens the drive signal frequency as compared with normal control time.

The first drive method change means lessens the travel distance of the stepper motor for each drive signal as compared with normal control time.

The first drive method change means drives the stepper motor by a PWM signal.

The first drive method change means lessens a driving force of the stepper motor as compared with normal control time.

The first adjustment means suppresses out-of-adjustment of the stepper motor to less than a predetermined amount.

The second drive method change means changes the drive method of the stepper motor when the driving direction of the stepper motor is changed.

The second drive method change means lessens the drive signal frequency as compared with normal control time.

The second drive method change means changes the drive direction after once holding the stepper motor.

The second drive method change means lessens the travel distance of the stepper motor for each drive signal as compared with normal control time.

The second drive method change means drives the stepper motor by a PWM signal.

The quantity flow valve control means performs initialization only once whenever the specific run condition detection means detects a specific run condition.

The quantity flow valve control means performs initialization in a run condition in which initialization may be executed.

The quantity flow valve control means performs initialization when the specific target position detection means detects a specific target position.

When the motor shaft is pulled most into the stepper motor side, the flow quantity valve control means gives a predetermined drive signal to the stepper motor in sequence before initialization. The second adjustment means adjusts the position of the motor shaft after the drive signal is given in sequence to the valve open point.

The quantity flow valve control means drives the stepper motor by a drive signal of a frequency at which out-of-adjustment does not occur in a no-load condition and occurs when the motor shaft abuts against the other end of the valve shaft and executes initialization after the stepper motor moves out of adjustment.

The quantity flow valve control means drives the stepper motor by a drive signal of a frequency more than a frequency that can be followed up by the stepper motor and executes initialization after the body abuts against the valve seat.

The spacer member adjusts the interval between the position of the motor shaft when the motor shaft is pulled most into the stepper motor side and the other end of the valve shaft at the fully closed position to a predetermined distance.

The screw member threadedly engaging the screw groove formed on the motor shaft adjusts the interval between the position of the motor shaft when the motor shaft is pulled most into the stepper motor side and the other end of the valve shaft at the fully closed position to a predetermined distance.

The spacer member between the motor case and the valve body or one of motor shafts different in shaft length adjusts so that the stepper motor phase becomes a predetermined phase when the motor shaft is pulled most into the stepper motor side or providing a plurality of and selecting one motor shaft from among them for adjusting.

One is selected from among rotors or motor shafts different in position of positioning means so that the stepper motor phase becomes a predetermined phase when the motor shaft is pulled most into the stepper motor side.

The stepper motor phase when the motor shaft is at a predetermined position is set to a predetermined phase by changing signal lines of drive signal of the stepper motor.

The above and other objects and features of the present invention will be more apparent from the following description taken in conjunction with the accompanying drawings.

DETAILED DESCRIPTION OF THE PREFERRED EMBODIMENTS

Referring now to the accompanying drawings, there are shown preferred embodiments of the invention.

Embodiment 1

Figure 1:
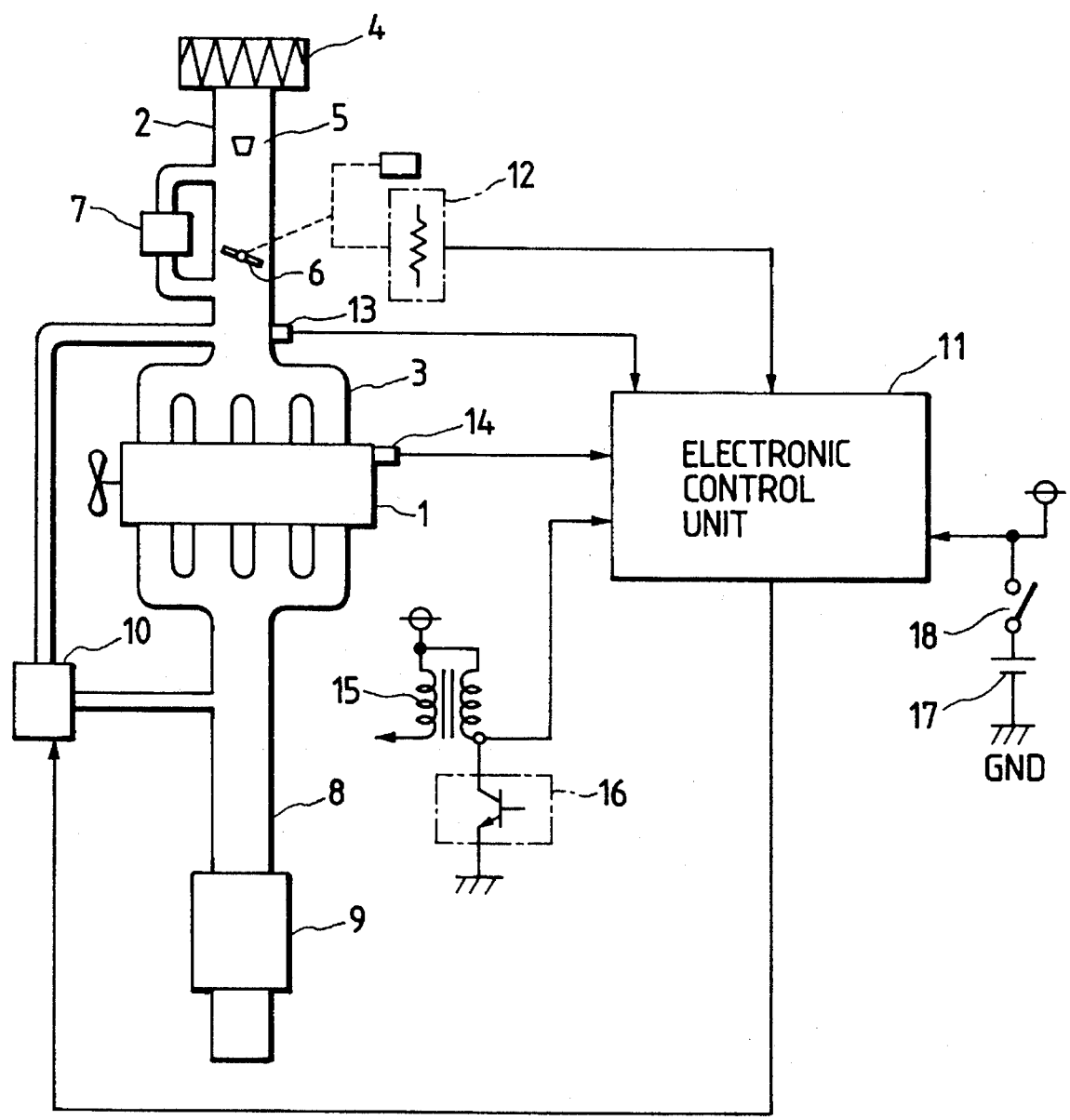
FIG. 1 is a block diagram showing a general exhaust gas recirculation controller.

In embodiment 1, when a motor shaft is at a position where it is pulled most into the stepper motor side, which will be hereinafter referred to as the motor end, the stepper motor phase becomes a predetermined phase. FIG. 1 is a block diagram showing a general exhaust gas recirculation controller.

In FIG. 1, numeral 1 is an internal combustion engine, numeral 2 is an inlet pipe for circulating air inhaled into the engine 1, numeral 3 is an intake manifold branching from the inlet pipe 2 for circulating air in cylinders, numeral 4 is an air cleaner provided upstream from the inlet pipe 2, and numeral 5 is an injector provided in the inlet pipe 2 for injecting a fuel. The air flowing through the air cleaner 4 into the inlet pipe 2 is inhaled into the engine 1 together with the fuel supplied by the injector 5. Numeral 6 is a throttle valve for changing the amount of gas inhaled into the engine 1 and numeral 7 is an idle rotation speed control valve located on a bypass passage, a flow path for bypassing the throttle valve 6. The air-fuel mixture inhaled into the engine 1 is burnt by an ignition plug (not shown) and the resultant exhaust gas is passed through an exhaust pipe 8 and is purified by a purifier 9 consisting of a three way catalyst before it is discharged into the atmosphere. Numeral 10 is an EGR valve, a flow quantity valve of a stepper motor type disposed on an exhaust gas recirculation path of a flow path for controlling the flow quantity of exhaust gas in the flow path. Numeral 11 is an electronic control unit which has target position calculation means for calculating the target position of the EGR valve 10 based on information provided by run condition detection means of a throttle opening sensor 12 for detecting the opening of the throttle valve 6, a pressure sensor 13 for detecting pressure in the inlet pipe, a water temperature sensor for detecting a cooling water temperature of the engine 1, an ignition consisting of an ignition coil 15 and an igniter 16, etc., assumed position calculation means for calculating the assumed position of the ERG valve 10, and flow quantity valve control means for generating a drive signal to control the EGR valve 10 to the target position based on the calculation results of the target position calculation means and the assumed position calculation means. Numeral 17 is a battery for supplying electric power to the electronic control unit 11 and numeral 18 is a key switch located between the electronic control unit 11 and the battery 17.

Figure 2:
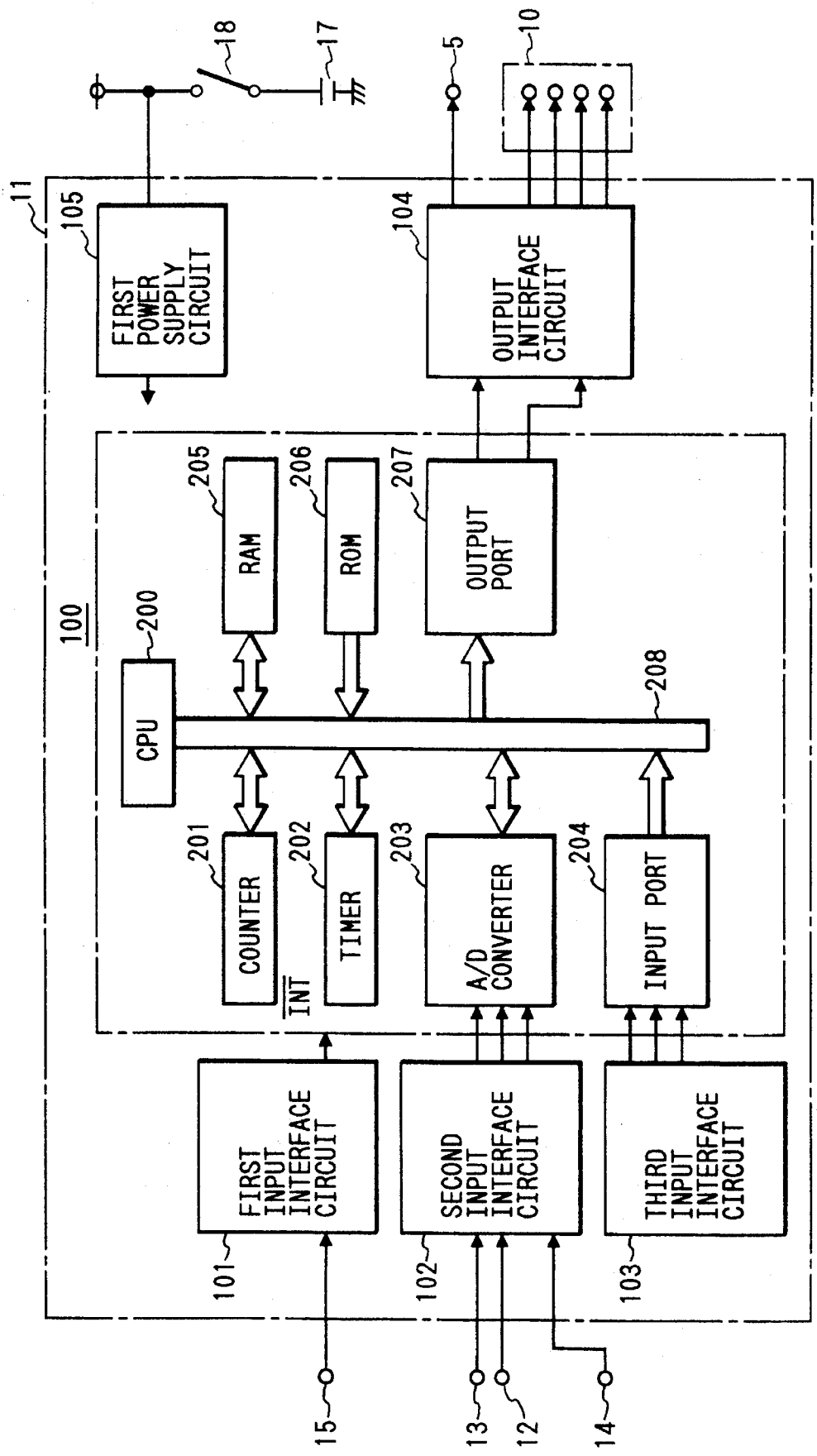
FIG. 2 is a block diagram of an electronic control unit.

FIG. 2 is a detailed block diagram of the electronic control unit 11, wherein numeral 100 is a microcomputer. Numeral 101 is a first input interface circuit for shaping the waveform of a primary ignition signal of the ignition coil 15 for generating an interrupt signal, numeral 102 is a second input interface circuit for inputting signals of the throttle opening sensor 12, the pressure sensor 13, and the water temperature sensor 14, and numeral 103 is a third input interface circuit for inputting other signals not shown. The signals input through the first to third input interface circuits are fed into the microcomputer 100. Numeral 104 is an output interface circuit for outputting a drive signal generated by the microcomputer 100 to the EGR valve 10 and numeral 105 is a first power supply circuit for receiving power of the battery 17 and providing a power supply to the microcomputer 100. The microcomputer 100 has a CPU 200 which calculates control, etc., of the ERG valve 10 in accordance with a predetermined program, a free-running counter 201 for measuring the rotation period of the engine 1, a timer 202 for giving timings for control, an A/D converter 203 for converting an analog input signal to a digital signal, an input port 204 for inputting signals from the third input interface circuit 103, a RAM 205 used as a work memory, a ROM 206 in which programs are stored, an output port 207 for outputting signals, and a common bus 208 for connecting the components.

Figure 3:
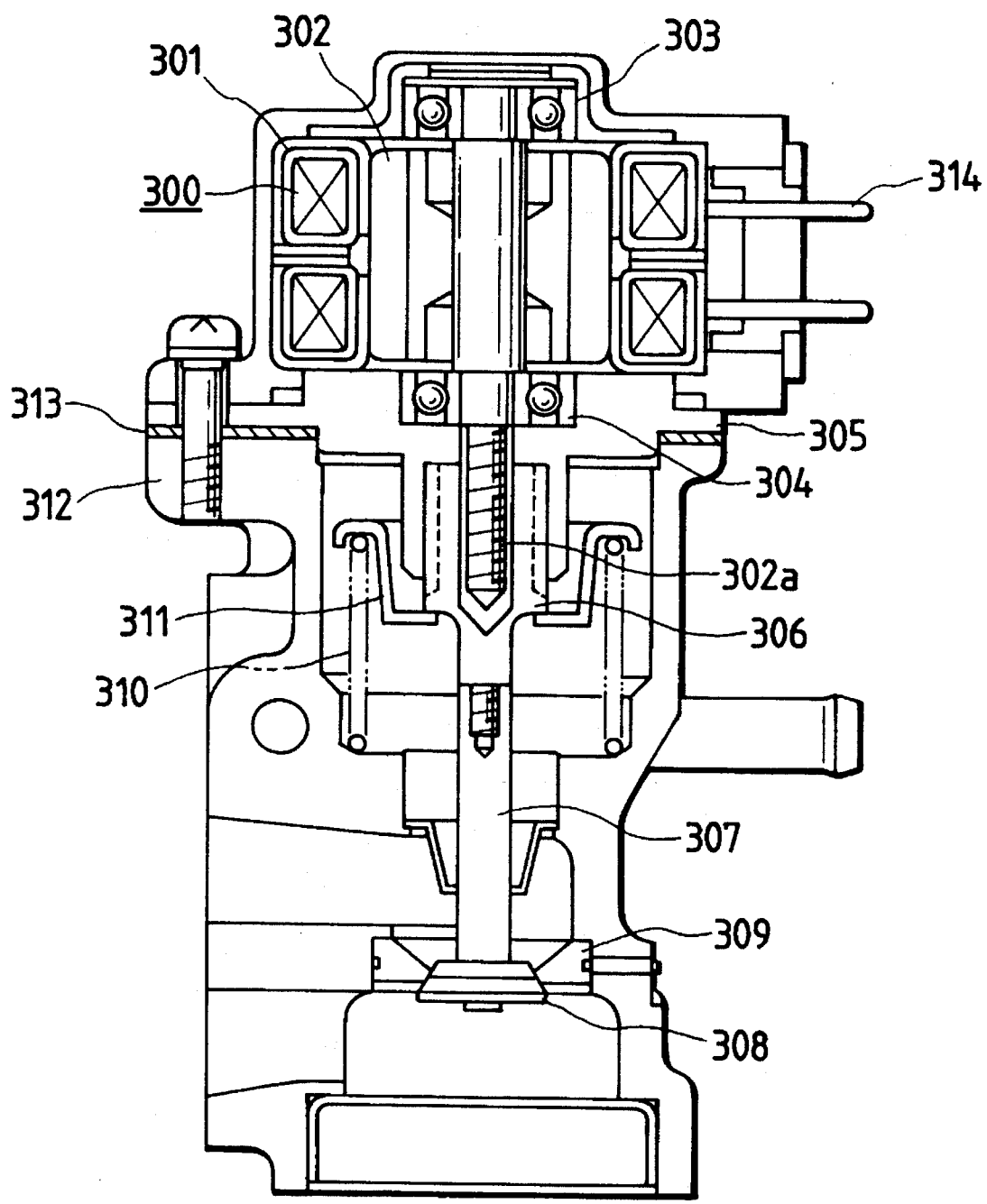
FIG. 3 is a sectional view of an integral-type EGR valve.

FIG. 3 is a sectional view of the EGR valve 10; it shows an integral-type EGR valve of combination motor shaft and valve shaft described below. The EGR valve is driven by a four-phase stepper motor 300 which comprises a stator 301, a rotor 302, and bearings 303 and 304 for pivotally supporting the rotor 302, and is housed in a motor case 305. A male screw is formed at a tip 302a of the rotor 302. Numeral 306 is a motor shaft containing a female screw threadedly engaging the male screw; the motor shaft 306 makes a linear move axially with rotation of the rotor 302. Numeral 307 is a valve shaft integral with the motor shaft 306; the valve shaft 307 has a body 308 on one end. The body 308 abuts against a valve seat 309 for closing the EGR valve 10. Numeral 310 is a compression coil spring for energizing the body 308 in the valve closing direction and numeral 311 is a spring holder for holding the compression coil spring 310. The parts such as the motor shaft 306 and the valve shaft 307 described above are stacked with the motor case 305 and are housed and placed in a valve body 312 forming the outer walls of the EGR valve 10 together with the motor case 305. Numeral 313 is a spacer stacked between the motor case 305 and the valve body 312; the spacer is set to the same thickness (0.1 mm) as the travel distance of the motor shaft 306 per drive signal of the stepper motor 300, which will be hereinafter referred to as one step. Numeral 314 is a lead wire of signal line for transferring a drive signal from the electronic control unit 11 to the stepper motor 300.

Next, initialization of the exhaust gas recirculation controller thus configured will be described.

The basic technical concept of embodiment 1 is as follows: First, the motor phase when the body 308 is moved to a fully closed position is adjusted so as to become a predetermined phase, for example, phase 0. In initialization, the body 308 is placed at the fully closed position. Then, a drive signal of the stepper motor 300 is changed to a drive signal corresponding to phase 0. Under these conditions, a mismatch between the motor phase and drive signal does not occur in initialization; accurate initialization can be carried out.

Next, adjustment of the motor phase of the stepper motor 300 when body 308 is at the fully closed position will be discussed specifically.

At the integral-type EGR valve as shown in FIG. 3, the position where the motor shaft 306 is pulled most into the side of the stepper motor 300 is a position at which the body is pulled in and abuts against the valve seat 309, corresponding to the valve open point of the EGR valve, namely, the point where the valve starts to open.

The motor phase of the stepper motor 300 at the valve open point is set by means of the spacer 313, which is positioning means. First, when the spacer 313 does not exist, the EGR valve 10 is set to the valve open point. The motor phase of the stepper motor 300 at the valve open point is checked. At the time, if the motor phase is a phase to be predetermined, for example, phase 0, no adjustment is required. If it is, for example, phase 1, adjustment is required. In this case, the stepper motor 300 needs only to be rotated by another step in the valve open direction. Then, one spacer 313 should be stacked between the motor case 305 and the valve body 312 and secured by screws, whereby the travel distance of the body 308 is lengthened by one step and the stepper motor can be rotated by another step in the valve open direction. Thus, the motor phase at the valve open point, which was phase 1 before adjustment, becomes phase 0 after adjustment.

If the motor phase of the stepper motor 300 at the valve open point is phase 2 or 3, the number of spacers 313 to be stacked may be changed. Alternatively, a number of spacers different in thickness, for example, those for adjustment by two and three steps, may be provided, from among which a spacer having proper thickness can be selected.

Instead of the spacers 313, a number of motor shafts 306 different in axial length (shaft length) may be provided, from among which an appropriate motor can be selected. In this case, the motor shaft 306 is integrally molded with the valve shaft 307 and therefore the axial or shaft length of the motor shaft as the positioning means is the total of the shaft length of the motor shaft 306 and that of the valve shaft 307, needless to say.

As many spacers or motor shafts as the number of phases of the stepper motor to be used, for example, four if it is a four-phase stepper motor, may be provided for selection.

Thus, the motor phase of the stepper motor 300 when the body 308 is at the fully closed position can be set.

Next, processing of the electronic control unit 11 will be discussed.

Before processing of the electronic control unit 11 is discussed in detail, the basic technical concept is described.

Figure 4:
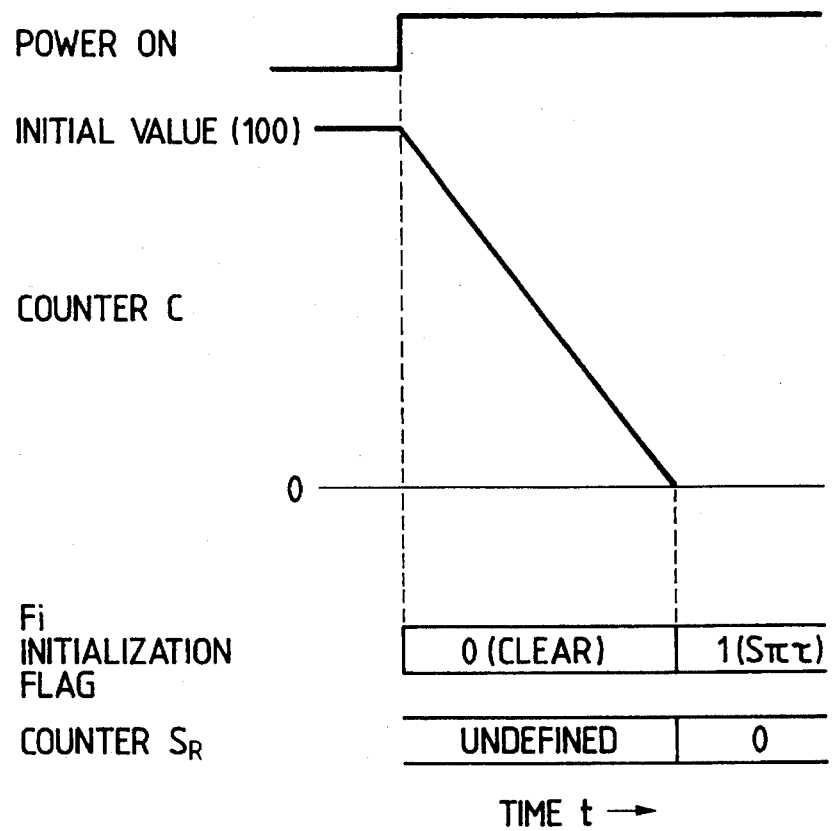
FIG. 4 is a timing chart showing initialization according to the invention.

FIG. 4 is a timing chart when the integral-type EGR valve is initialized at power on. In the figure, counter C is a counter which is set to 100 in initialization preparation process, Fi is an initialization flag indicating whether or not initialization is complete, and counter SR is a counter for counting the current opening of the EGR valve, namely, assumed position. Here, the counter SR provides the assumed position calculation means.

When the power is turned on, the counter C is set to the initial value 100 and the initialization flag Fi is set to 0. At the time, the counter SR is not yet initialized and the current opening of the EGR valve is unknown; the value of the counter SR is undefined. After this, when the stepper motor is driven 100 times in the valve closing direction and the counter C reaches 0, the EGR valve is assumed to be fully closed. Then, the counter SR is set to 0, the initialization flag Fi is set to 1, and the initialization is terminated. At the time, the stepper motor drive signal is changed to a drive signal corresponding to a predetermined motor phase.

Figure 5:
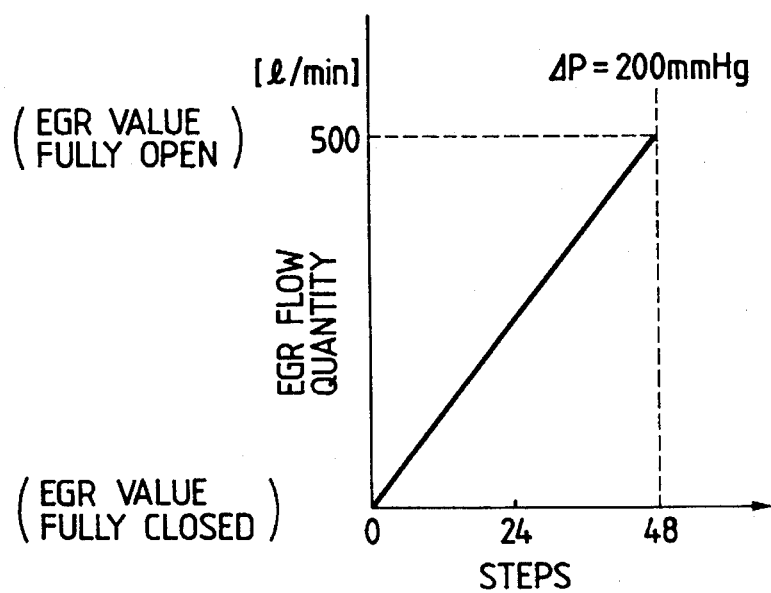
FIG. 5 is a flow quantity characteristic chart of the EGR value.

FIG. 5 shows the number of steps of the stepper motor and the flow quantity of the exhaust gas recirculation path when the pressure difference at the inlet and outlet of the exhaust gas recirculation path, $\Delta P$, is 200 mmHg. When the number of steps is 0, the EGR valve is at the fully closed position and when the number of steps is 48, at the fully open position. Therefore, it is seen that the initial value of the counter C, 100, is a sufficient value to move the EGR valve to the fully closed position even if the EGR valve is at any position. Of course, the initial value of the counter C may be a predetermined value other than 100.

Figure 6:
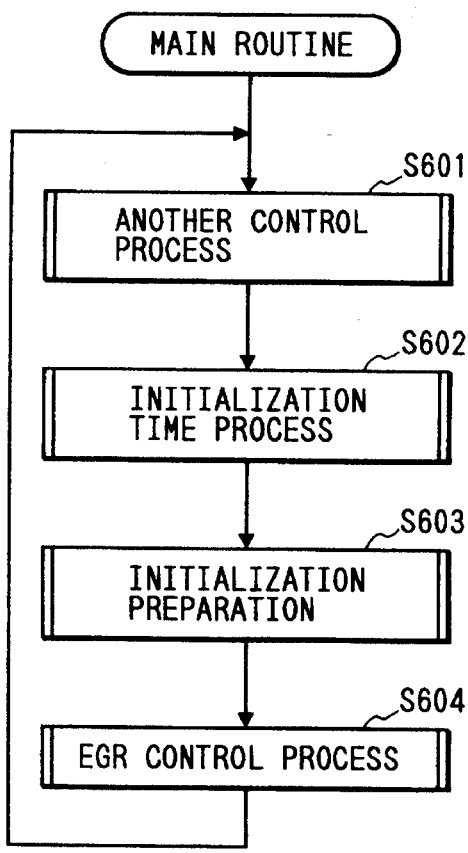
FIG. 6 is a flowchart showing a main routine according to the invention.

Processing of the electronic control unit 11 will be described in detail below:

FIG. 6 shows process of the main routine.

At step S601, another control process other than EGR control process is performed; it will not be described in detail. Step S602 is initialization time process for checking to see if an initialization time flag is set to 1 for determining the initialization time, which will be described in detail. Step S603 is initialization preparation process for making preparations for initialization. Step S604 is EGR control process for performing EGR control.

In the main routine, steps 601 to 604 are repeatedly executed for controlling the engine.

Figure 7:
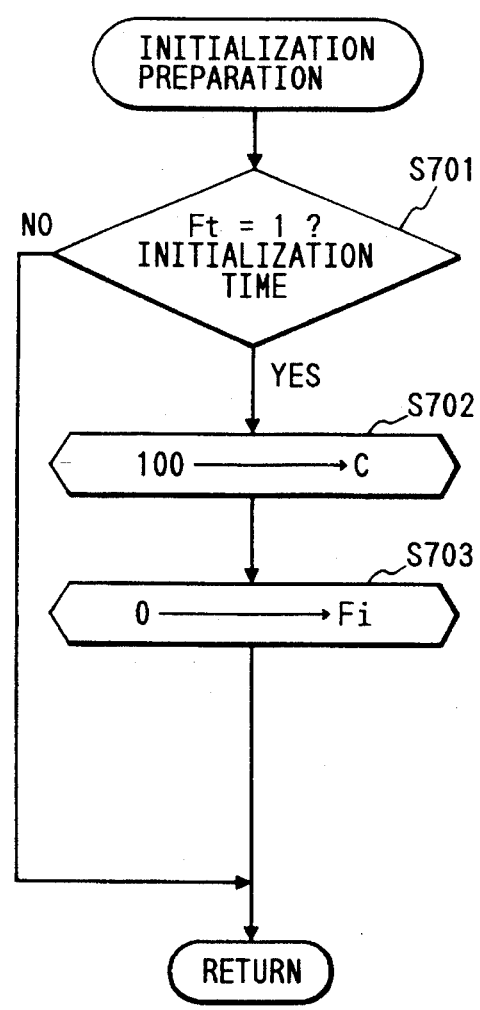
FIG. 7 is a detailed flowchart of initialization preparation process according to the invention.

FIG. 7 shows details of the initialization preparation process at step S603. Step S701 is a step at which whether or not the initialization time flag Ft described below is 1 is determined. If the flag Ft is 1, it indicates the initialization time and the following initialization preparation process is performed. If the flag Ft is 0, no operation is performed and the process is terminated. If the flag Ft is 1, the counter C is set to the initial value 100 at step S702 and the initialization flag Fi is cleared to 0 at step S703, then the initialization preparation process is terminated.

Figure 8:
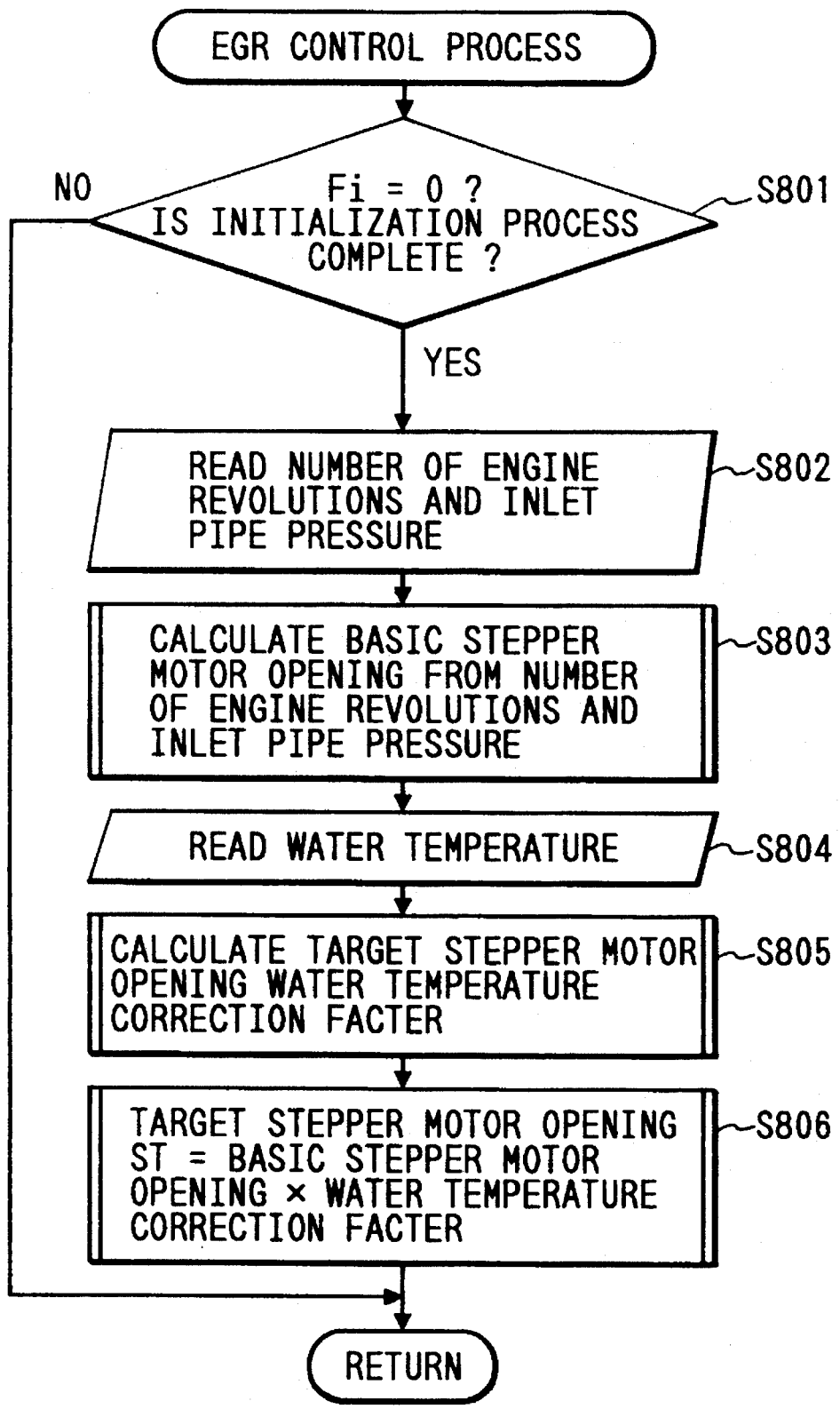
FIG. 8 is a detailed flowchart of EGR control process according to the invention.

FIG. 8 shows details of EGR control process at step S604 of the main routine. Step S801 is a step at which whether or not initialization is complete is determined depending on whether or not the initialization flag Fi is 0. If initialization is not complete, the current opening of the EGR valve is unknown and EGR control cannot be performed, in which case no operation is performed and the process is terminated.

On the other hand, if initialization is complete and the current opening of the EGR valve is known, EGR control can be performed and the following steps are executed for calculating the target position of the EGR valve.

At step S802, the number of engine revolutions and inlet pipe pressure are read. At step S803, predetermined basic stepper motor opening is calculated based on the data read at step S802. It can be calculated, for example, by previously storing the number of engine revolutions and inlet pipe pressure in a two-dimensional map having them as parameters. If interpolation operation is performed at the time, accuracy can be more improved.

At step S804, a water temperature is read and at step S805, a water temperature correction factor is calculated based on the water temperature. The water temperature correction factor is used to correct the warm-up condition of the engine; it functions so that the lower the water temperature, the less opened the EGR valve.

At step S806, the basic stepper motor opening found at step S803 is corrected with the water temperature correction factor found at step S805 for calculating target stepper motor opening ST, target position, and the process is terminated. Steps S802 to S806 provides the target position calculation means.

Thus, initialization preparation process is performed and the target position is set.

Next, the initialization process will be described.

Figure 9:
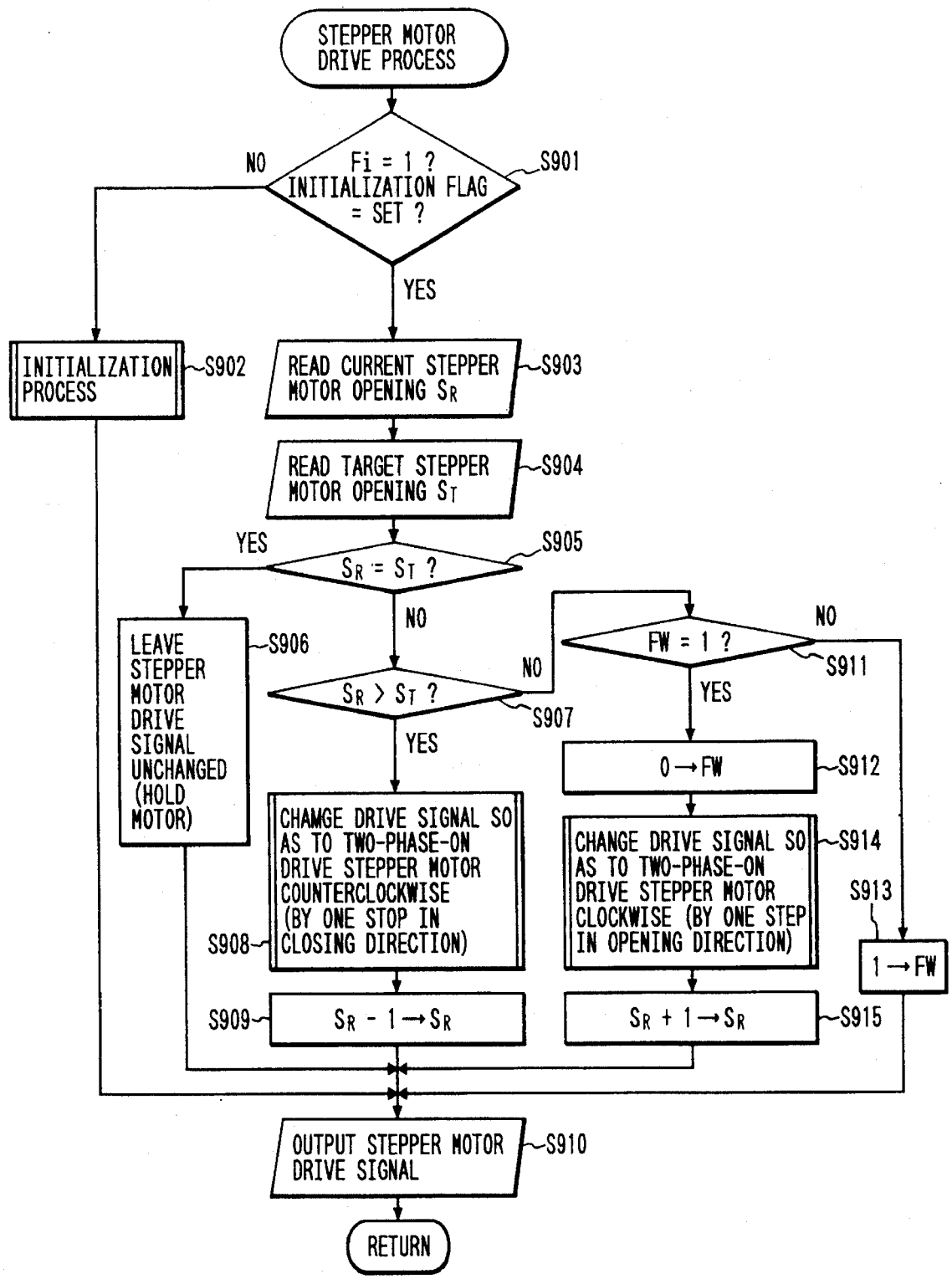
FIG. 9 is a flowchart showing drive process of a stepper motor according to the invention.
Figure 10:
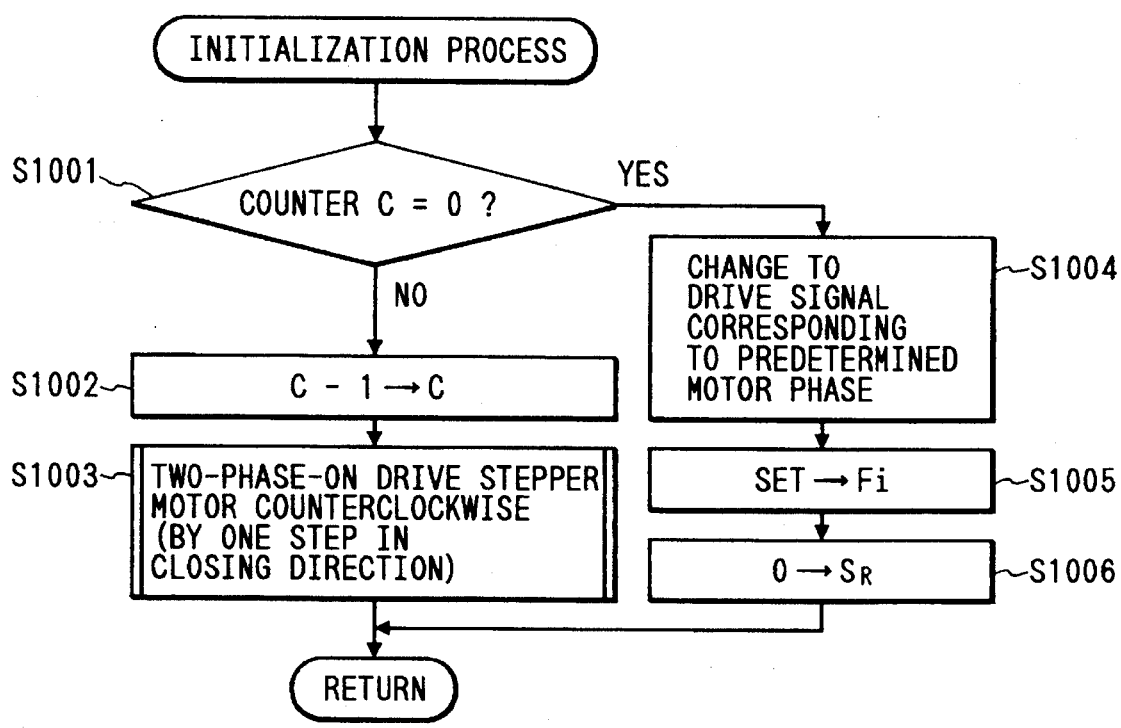
FIG. 10 is a detailed flowchart of initialization process according to the invention.

Initialization is performed on a flowchart of drive process of the stepper motor interrupted every given time, for example, every 5 ms, shown in FIG. 9. Step S901 is a step at which whether or not initialization is complete is determined depending on whether or not the initialization flag Fi is 1, as at step S801. If initialization is not yet performed, control goes to step S902 at which initialization process is executed, as shown in FIG. 10 in detail.

At step S1001, whether or not the counter C set to the initial value 100 becomes 0 is determined. If the counter C is not 0, control goes to step S1002 and 1 is subtracted from the counter C. At step S1003, the drive signal is changed so as to drive the stepper motor 300 by one step in the valve closing direction. The drive signal is output to the stepper motor at step S910 in FIG. 9 for driving the stepper motor by one step in the valve closing direction.

The process is repeated a number of times until it is determined that the counter C is 0 at step S1001. At the time, the EGR valve is considered to be at the fully closed position, and the following steps are executed. At step S1004, to make a predetermined motor phase and the drive signal match, the drive signal is changed to a drive signal corresponding to the predetermined motor phase. At step S1005, the initialization flag Fi is set to 1 to indicate that the initialization is complete. At step S1006, the counter SR is set to 0 for indicating that the current EGR valve opening is at the fully closed position, and the initialization is completed.

Upon completion of the initialization, calculation of the target position at step S802 and later in FIG. 8 is enabled and EGR control at step S903 and later in FIG. 9 is started.

At step S903, the counter SR indicating the current EGR valve opening is read. At step S904, the target stepper motor opening ST found at step S806 is read and at step S905, SR is compared with ST. If they match, the stepper motor is set to the target stepper motor opening. In this case, control goes to step S906 and the current stepper motor drive signal is left unchanged, whereby the stepper motor is held the target stepper motor opening. On the other hand, if SR and ST do not match, control advances to step S907 at which whether or not SR is greater than ST is determined to determine whether the stepper motor should be driven in the valve opening or closing direction to control the EGR valve to the target stepper motor opening.

If the counter SR indicating the current EGR valve opening is greater than the target stepper motor opening ST, control goes to step S908 and the drive signal is changed so as to drive the stepper motor by one step in the valve closing direction. At step S909, 1 is subtracted from the counter SR indicating the current EGR valve opening and at step S910, the stepper motor is driven in the valve closing direction.

In contrast, if the target stepper motor opening ST is greater than SR, control advances to steps S911 and later. At step S914, the drive signal is changed so as to drive the stepper motor by one step in the valve opening direction. At step S915, 1 is added to the counter SR and at step S910, the stepper motor is driven in the valve opening direction. Steps S911 to S913 are executed to change the speed depending on which of the valve opening and closing directions the EGR valve is driven in. At the steps, to drive the stepper motor in the valve opening direction, the stepper motor is driven once every twice the interrupt process in FIG. 9.

Since the interrupt process in FIG. 9 occurs every 5 ms, the motor is driven in the valve closing direction at 200 PPS (pulses per second); it is driven in the opening direction at 100 PPS because the motor is driven every 10 ms.

The flowcharts of FIGS. 8 and 9 provide the flow quantity valve control means.

Embodiment 2

In embodiment 1, the integral-type EGR valve comprising the motor shaft 306 integrally molded with the valve shaft 307 has been discussed. In embodiment 2, a separate-type EGR valve comprising a motor shaft separate from a valve shaft will be discussed.

Figure 11:
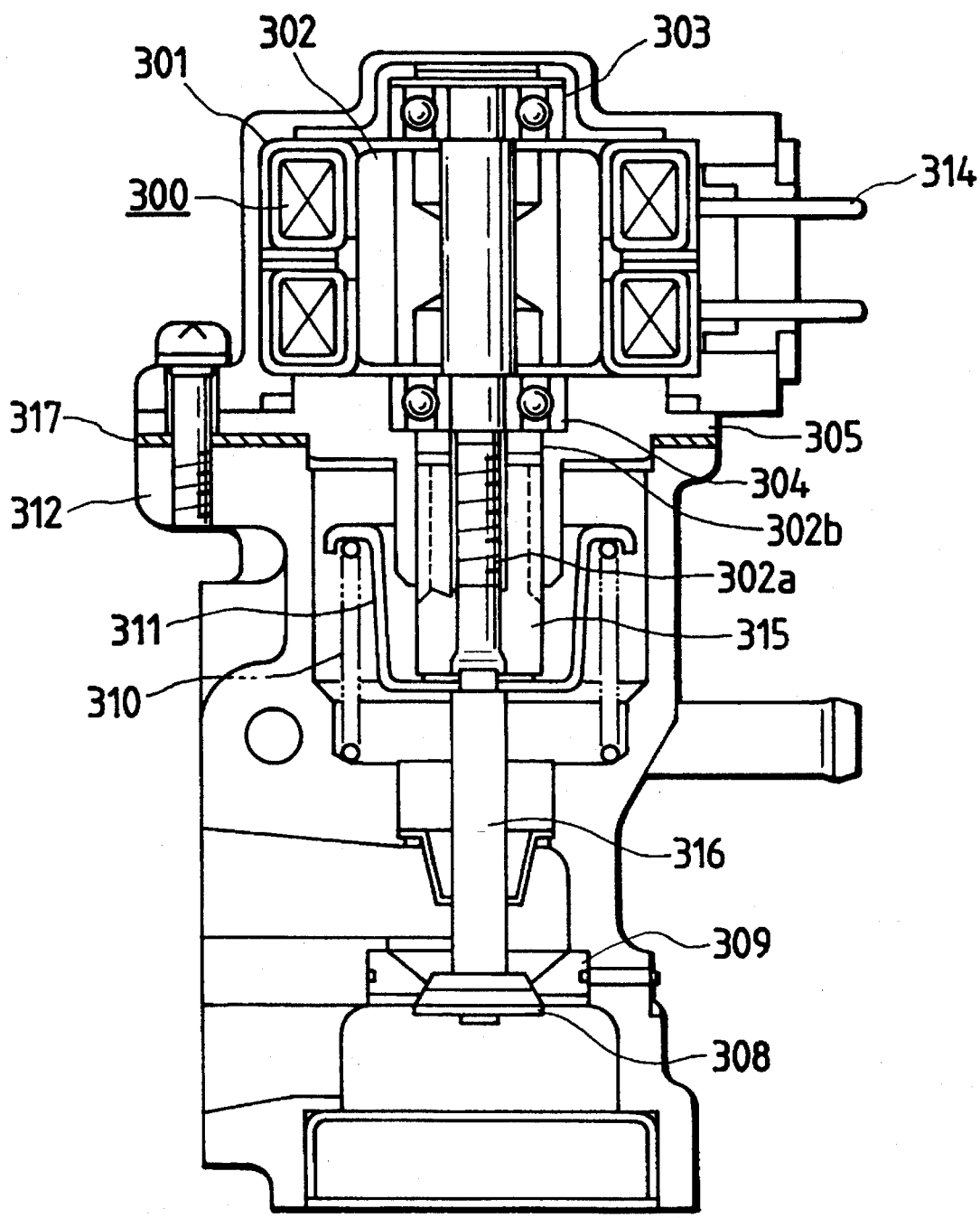
FIG. 11 is a sectional view of a separate-type EGR valve.

FIG. 11 is a sectional view of a separate-type EGR valve. Parts identical with or similar to those previously described with reference to FIG. 3 are denoted by the same reference numerals in FIG. 11.

In FIG. 11, numeral 315 is a motor shaft which threadedly engages a male screw provided at a tip 302a of a rotor 302 and makes a linear move axially with rotation of a stepper motor 300, and numeral 316 is a valve shaft which has a body 308 on one end and has the other end abutting against the motor shaft 315 for being linearly moved in the axial direction and energized in the valve closing direction by a compression spring 310. The motor shaft 315 and the valve shaft 316 are separated from each other at the part of a spring holder 311. Numeral 317 is a spacer similar to the spacer 313 described above.

When the stepper motor 300 is driven in the valve closing direction at the separate-type EGR valve, the body 308 abuts against a valve seat 309. The motor shaft position at the time is referred to as the valve open point, as described above. By the way, at the separate-type EGR valve, the motor shaft 315 is pulled into the side of the stepper motor 300 exceeding the valve open point. That is, the motor shaft 315 is separated from the other end of the valve shaft 316 at the valve open point. The stepper motor 300 continues to turn in the valve closing direction. When the motor shaft 315 abuts against a rotor stopper 302, the stepper motor 300 stops. Hereinafter, the position at which the motor shaft is pulled most into the stepper motor side will be referred to as the motor end.

As supplementary information on the integral-type EGR valve described above, the motor end and the valve open point are the same position at the integral-type EGR valve, because the motor shaft 306 and the valve shaft 307 are not separated and the valve shaft will not be pulled into the side of the stepper motor 300 exceeding the fully closed position, namely, the valve open point, so that the motor shaft 306 is also fixed.

Embodiment 1 needs to be somewhat changed for the separate-type EGR valve where the motor end and the valve open point are different positions. In embodiment 1, if the stepper motor is driven 100 times in the valve closing position, the motor shaft reaches the valve open point. By executing initialization, the counter SR indicating the current EGR valve opening can be set to 0 when the valve is at the valve open point. However, if the stepper motor is driven 100 times in the valve closing direction at the separate-type EGR valve, the motor shaft is positioned at the motor end rather than the valve open point. Therefore, under the condition, initialization cannot be executed at the valve open point.

To solve this problem, in embodiment 2, first a lock member is provided for positioning so that the motor phase when the stepper motor 300 is at the motor end becomes a predetermined phase.

Also, first adjustment means is provided for adjustment so that the travel distance of the motor shaft from the motor end to the valve open point becomes a predetermined number of steps, for example, three steps.

The operation of the embodiment will be simply discussed with reference to FIG. 12. In the figure, counter C, initialization flag Fi, and counter SR indicating the current EGR valve opening are similar to those described in embodiment 1, and Fm is a motor end position flag indicating that the motor shaft 315 is positioned at the motor end.

As in embodiment 1, the counter C is set to 100 at time t0 and the stepper motor 300 is driven 100 times in the valve closing direction. At the time, the motor shaft 315 is at the position where it is pulled most into the stepper motor side, namely, at the motor end, and the motor end position flag Fm is set to 1. The motor phase is set to, for example, phase 0 by means of the lock member described below. At the same time, the stepper motor drive signal is changed to a drive signal corresponding to phase 0, and the stepper motor is driven by three steps in the valve opening direction. The position of the valve open point is adjusted so as to become a position where the stepper motor is driven by three steps in the valve opening direction from the motor end by the first adjustment means described below, whereby the motor shaft 315 matches the valve open point. At the time, the initialization flag Fi is set to 1 and the counter SR is set to 0 indicating the fully closed position.

Figure 13:
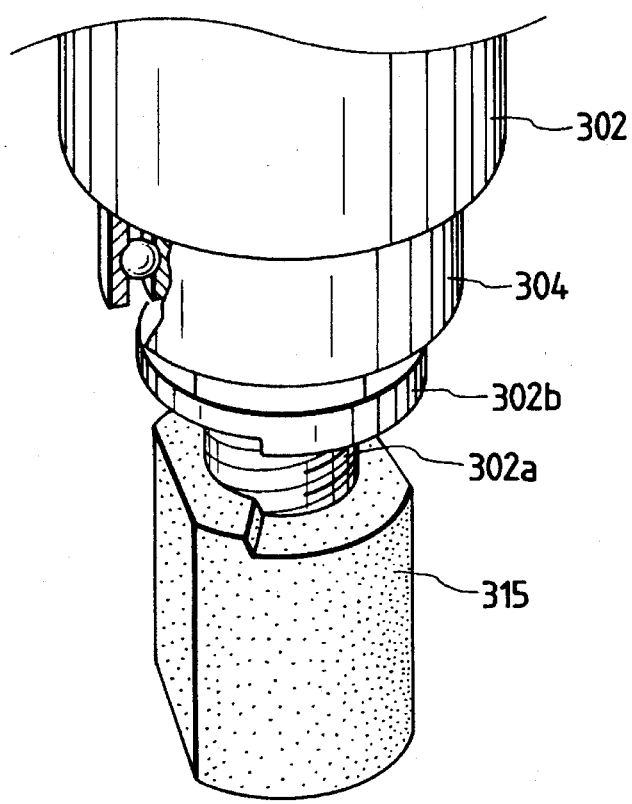
FIG. 13 is a perspective view of a lock member according to the invention.

FIG. 13 is a perspective view of the lock member for determining the motor phase of the stepper motor 300 at the motor end. In the figure, a rotor stopper 302b and a protrusion formed on the motor shaft 315 make up the lock member.

In FIG. 13, the rotor stopper 302b rotates as the rotor 302 rotates in the valve closing direction, whereby the motor shaft 315 is pulled into the side of the stepper motor 300. When the motor shaft 315 moves to the motor end, the protrusion of the motor shaft 315 abuts against the protrusion of the rotor stopper 302b, disabling more rotation of the rotor 302 for positioning.

The motor shaft 306 in embodiment 1 and the motor shaft 315 have a form of cutting away of a part of a column, as shown in FIG. 13. The plane portion and valve body 305 are adapted to lock rotation of the motor shaft.

Figure 14:
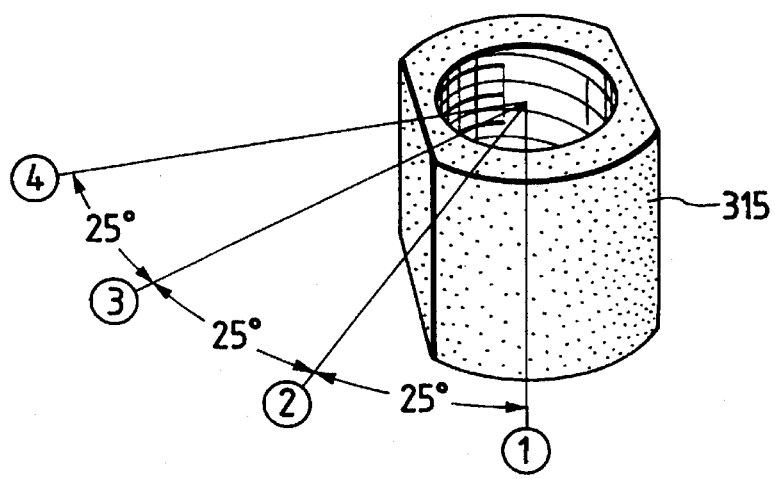
FIG. 14 is a perspective view of a motor shaft according to the invention.

The motor phase at the motor end is adjusted according to the position of the protrusion of the motor shaft 315 shown in FIG. 14. That is, if a four-phase stepper motor is used, for example, four types of motor shafts different in protrusion formation position each 7.5 degrees. The numeric value 7.5 (degrees) results from dividing 360 (degrees) by 48 steps described above, namely, is an angle at which the stepper motor moves one step.

Therefore, to adjust the motor phase, the motor phase when the motor shaft 315 is positioned at the motor end is checked and one motor shaft may be selected from among the four types of motor shafts so that the motor phase becomes a predetermined motor phase, for example, phase 0.

The motor phase of the stepper motor 300 at the motor end can also be adjusted by changing wiring to the stepper motor 300 without using the lock member.

Figure 15:
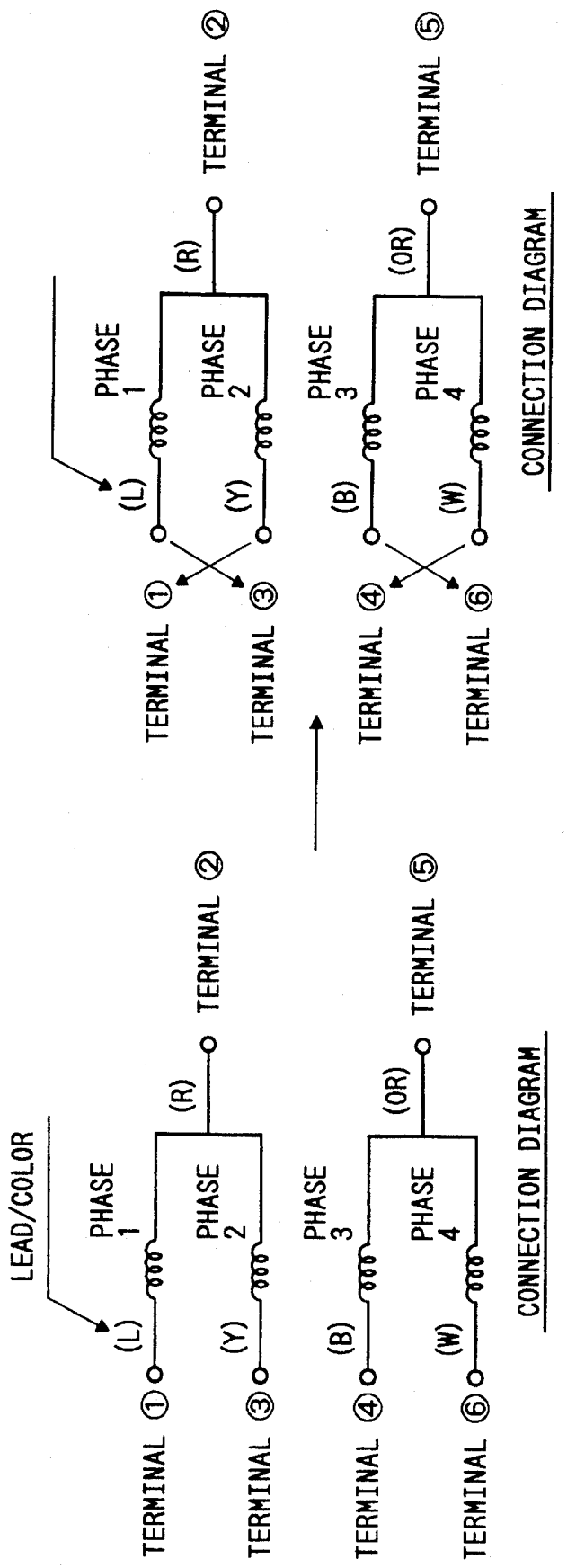
FIG. 15 is a connection diagram of signal lines of a stepper motor according to the invention.

That is, if the motor phase of the stepper motor at the motor end is not a predetermined phase, the wiring to the stepper motor 300 is changed so as to generate a signal corresponding to the predetermined phase, as shown in FIG. 15.

On the other hand, in FIG. 11, the spacer 317 functions as the first adjustment means for adjusting so that the travel distance of the motor shaft from the motor end to the valve open point becomes a predetermined number of steps, for example, three steps. That is, to set the interval from the motor end to the valve open point to three steps, the spacer 317 should be stacked between a motor case and valve body.

Like the spacer 313 in embodiment 1, a number of spacers different in thickness may be provided.

Figure 16:
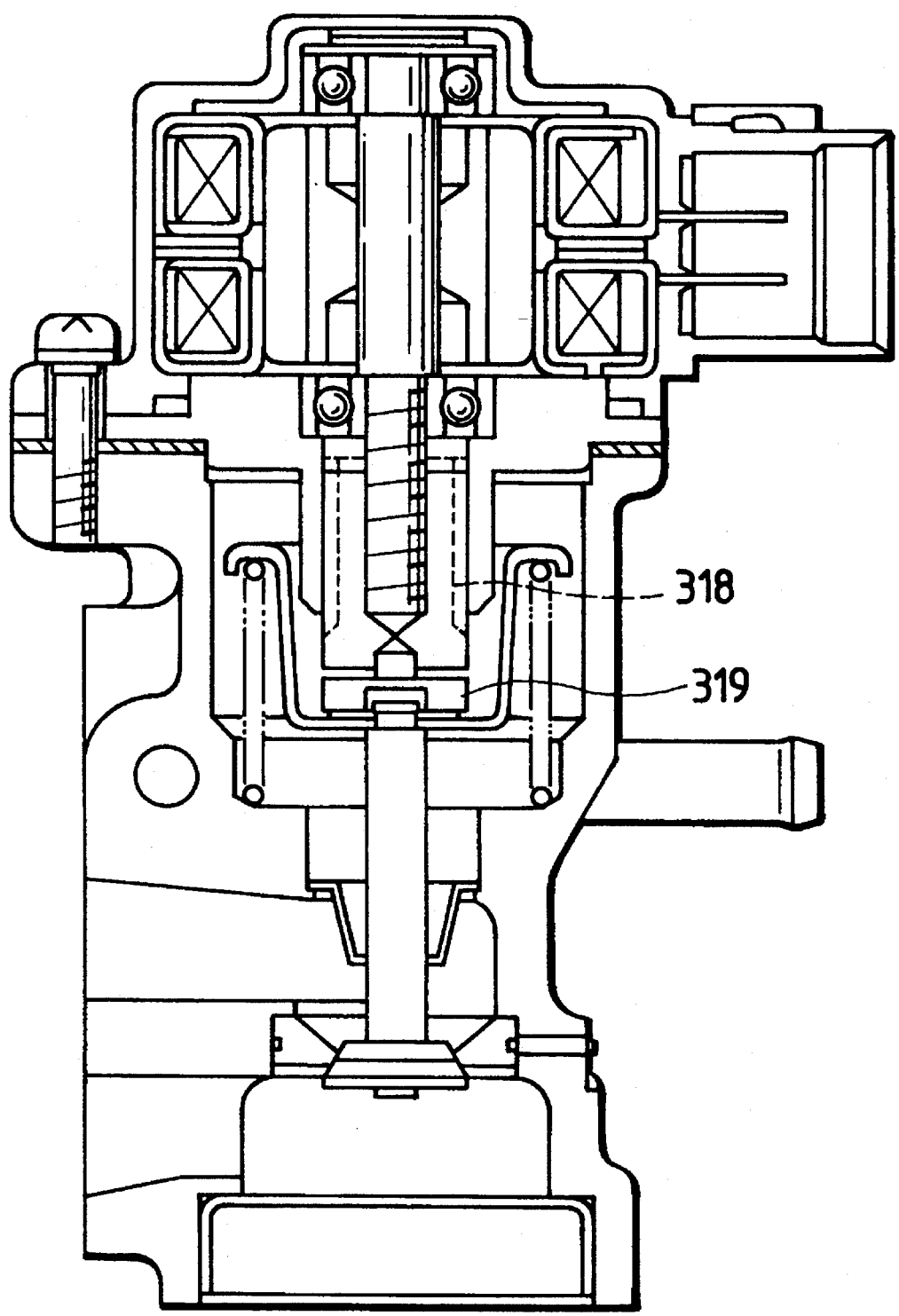
FIG. 16 is a sectional view of a separate-type EGR valve showing first adjustment means according to the invention.

FIG. 16 shows another first adjustment means. The ERG valve shown in the figure is the same as that in FIG. 11 except that it is formed with a motor shaft 318 having female screw grooves at the tip of the side of the body 308 and a male screw member 319 threadedly engaging the screw grooves in place of the spacer 317. The first adjustment means is made up of the screw grooves formed at the tip of the motor shaft 318 and the screw member 319.

The interval from the motor end to the valve open point can be adjusted continuously by screwing in or loosening the screw member 319. After adjustment is complete, preferably the motor shaft 318 and the screw member 319 are fixed by fixing means such as an adhesive.

Although the female screw grooves are formed on the inside of the tip of the motor shaft 318 in FIG. 16, screw grooves may be formed on the outside of the tip and female screw grooves may be formed on the inside of the screw member 319.

Next, initialization process of the separate-type EGR valve adjusted as described above will be described.

The technical concept of initialization in embodiment 2 is already described and therefore only points different from embodiment 1 will be discussed. The program in embodiment 2 is the same as that in embodiment 1 except for initialization preparation process or initialization process.

Figure 17:
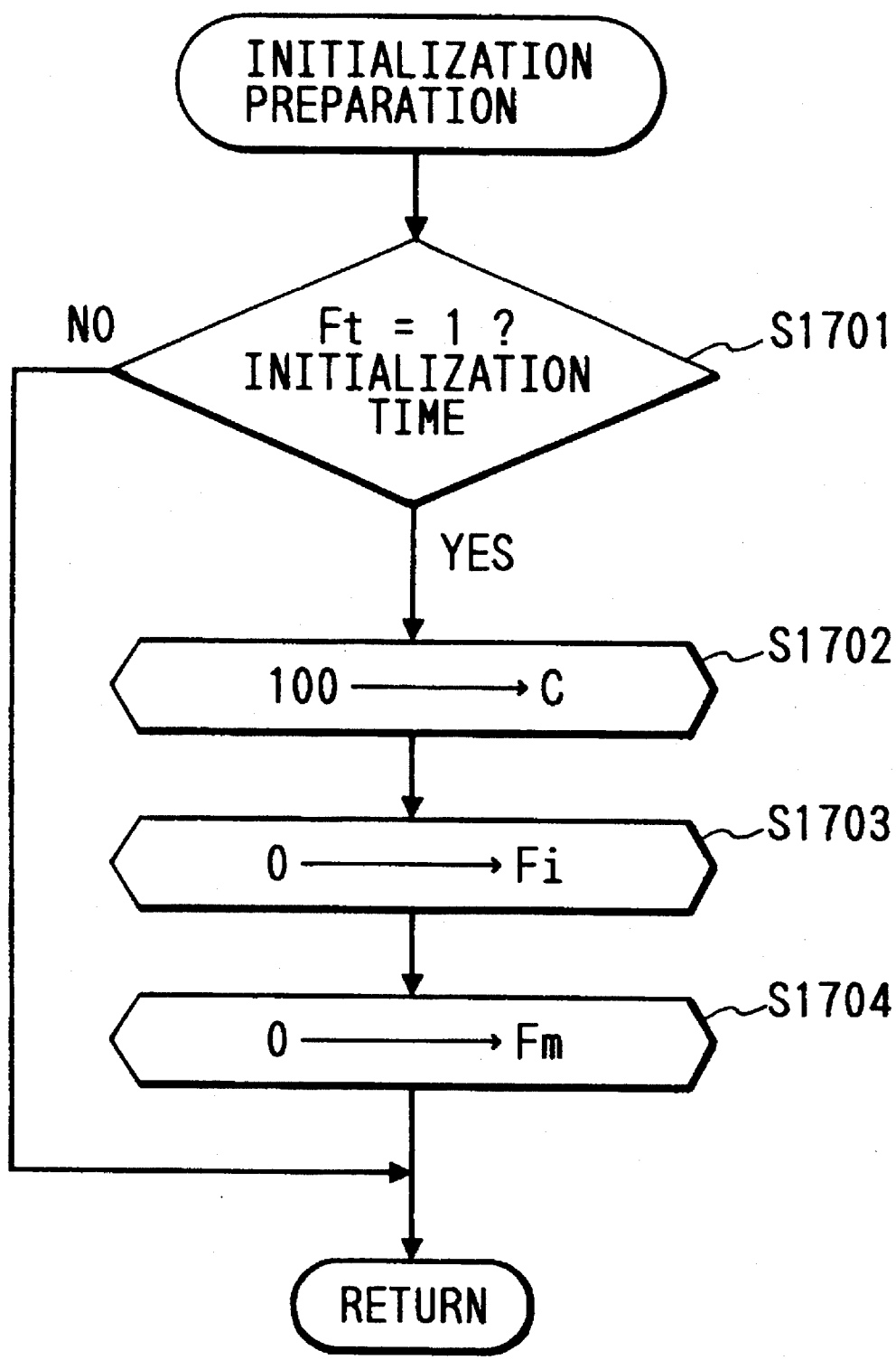
FIG. 17 is a detailed flowchart of initialization preparation process according to the invention.

FIG. 17 is a detailed flowchart of initialization preparation process of the separate-type EGR valve. In the figure, steps S1701 to S1703 correspond to steps S701 to S703 in FIG. 7; the flowchart differs from that of FIG. 7 only in addition of step S1704.

Step S1704 is a step at which the motor end position flag Fm is set to 0 before initialization is complete, as described above.

Figure 18:
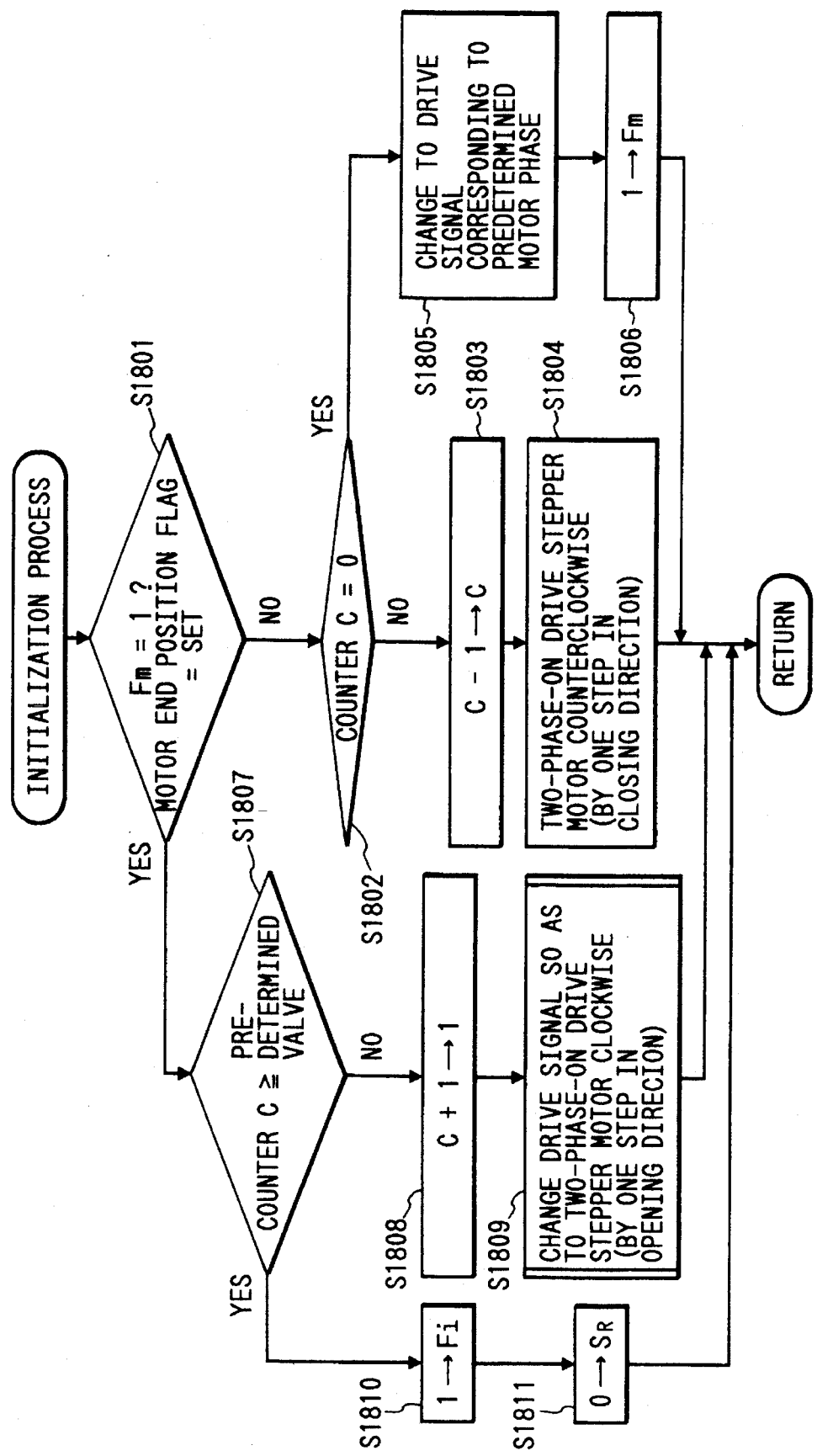
FIG. 18 is a detailed flowchart of initialization process according to the invention.

FIG. 18 is a flowchart of initialization process of the separate-type EGR valve.

At step S1801, whether or not the motor end position flag Fm is set to 1 is determined. If initialization is not complete, the motor end position flag Fm is 0, in which case control goes to step S1802. At step S1802, whether or not the stepper motor 300 has been driven a predetermined number of times (100 times) in the valve closing direction, namely, the counter C is 0 is determined. If the motor is not driven the predetermined number of times, the counter C is not 0. Then, control goes to step S1803 at which 1 is subtracted from the counter C. Then, at step S1804, the drive signal is changed to a drive signal for driving the stepper motor by one step in the valve closing direction. This drive signal is given to the stepper motor 300 at step S910 in FIG. 9 for pulling the motor shaft 315 into the side of the stepper motor 300 by one step.

The operation is repeated until the counter C reaches 0. At the time, the motor shaft 315 is positioned at the motor end. In this case, control advances to step S1805 from step S1802. At step S1805, the drive signal of the stepper motor 300 is changed to a drive signal corresponding to a predetermined phase and at step S1806, the motor end position flag Fm is set to 1.

Now, the motor phase at the motor end and the drive signal match.

This is at the time t1 in FIG. 9.

At step S1801 at the next time, the motor end position flag Fm is set to 1. Then, control advances to step S1807. The following operation is performed from time t1 to time t2 in FIG. 12.

At step S1807, whether or not the counter C becomes a predetermined value, for example, three, is determined. If it is less than three, control goes to step S1808 at which 1 is added to the counter C. At step S1809, the drive signal is changed to a drive signal for driving the stepper motor by one step in the valve open direction. This drive signal is given to the stepper motor 300 at step S910 in FIG. 9 for moving the motor shaft 315 by one step in the valve open direction.

When the operation is repeated three times, the value of the counter C becomes three and control advances to step S1810 from step S1807. When the counter C reaches three, the motor shaft 315 is positioned at the valve open point (time t2).

At step S1811, the counter SR is set to 0 for initializing the current stepper motor opening to 0, and the process is terminated.

Figure 12:
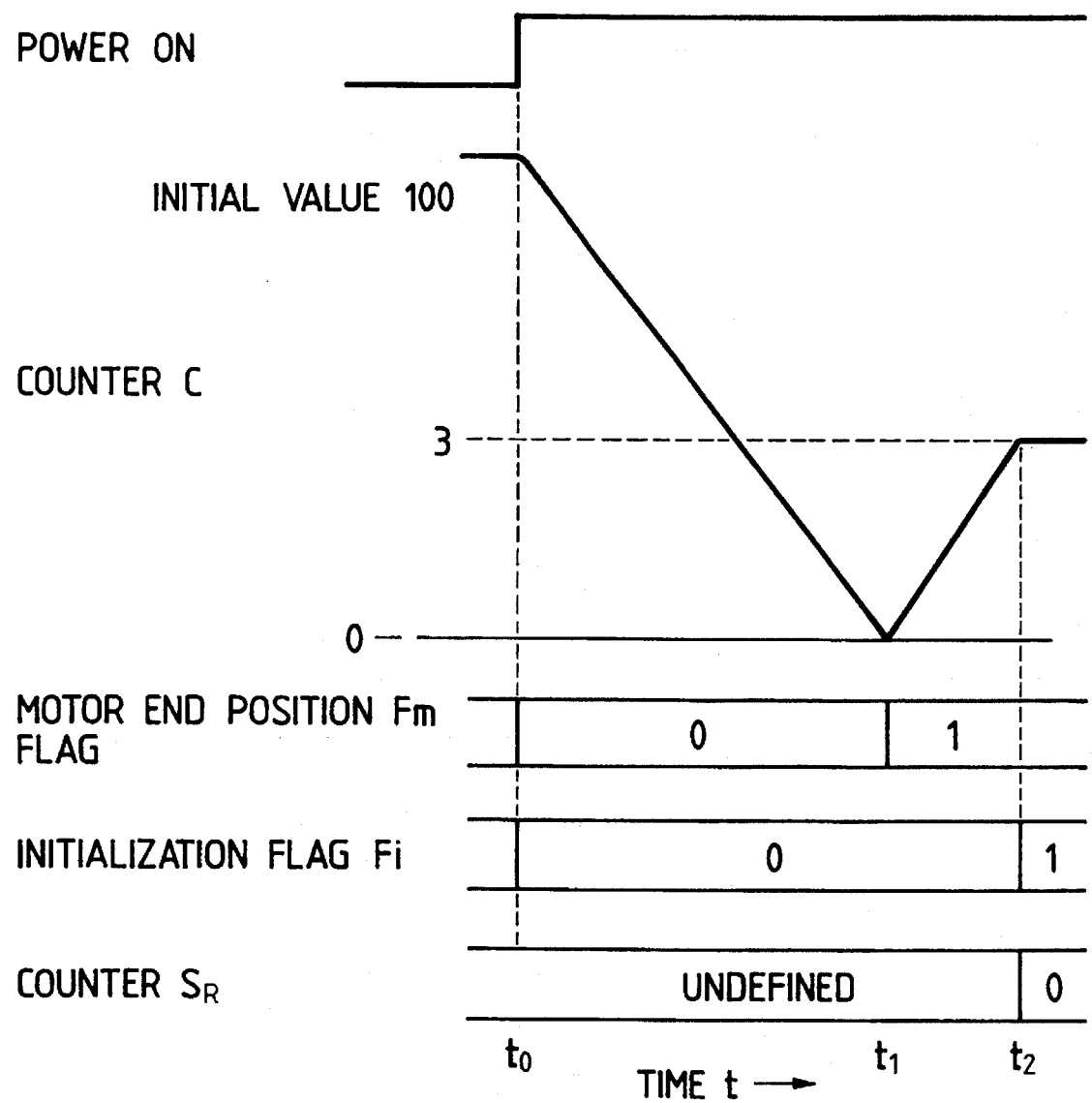
FIG. 12 is a timing chart showing initialization according to the invention.

Although the initialization is executed at the valve open point (time t2 in FIG. 12) in embodiment 2, it may be executed at the motor end (time t1 in FIG. 12). In this case, it is necessary to consider that the actual ERG valve opening shifts by three steps in the valve closing direction as compared with the opening indicated by the counter SR.

Embodiment 3

Embodiment 3 prevents a stepper motor from moving out of adjustment when a motor shaft is pulled most into the stepper motor side, namely, at the valve open point for an integral-type EGR valve or at the motor end for a separate-type EGR valve, for accurate initialization.

Out-of-adjustment of a stepper motor occurring when a motor shaft is pulled most into the stepper motor side and a malfunction caused by it will be described with reference to FIG. 19.

Figure 19:
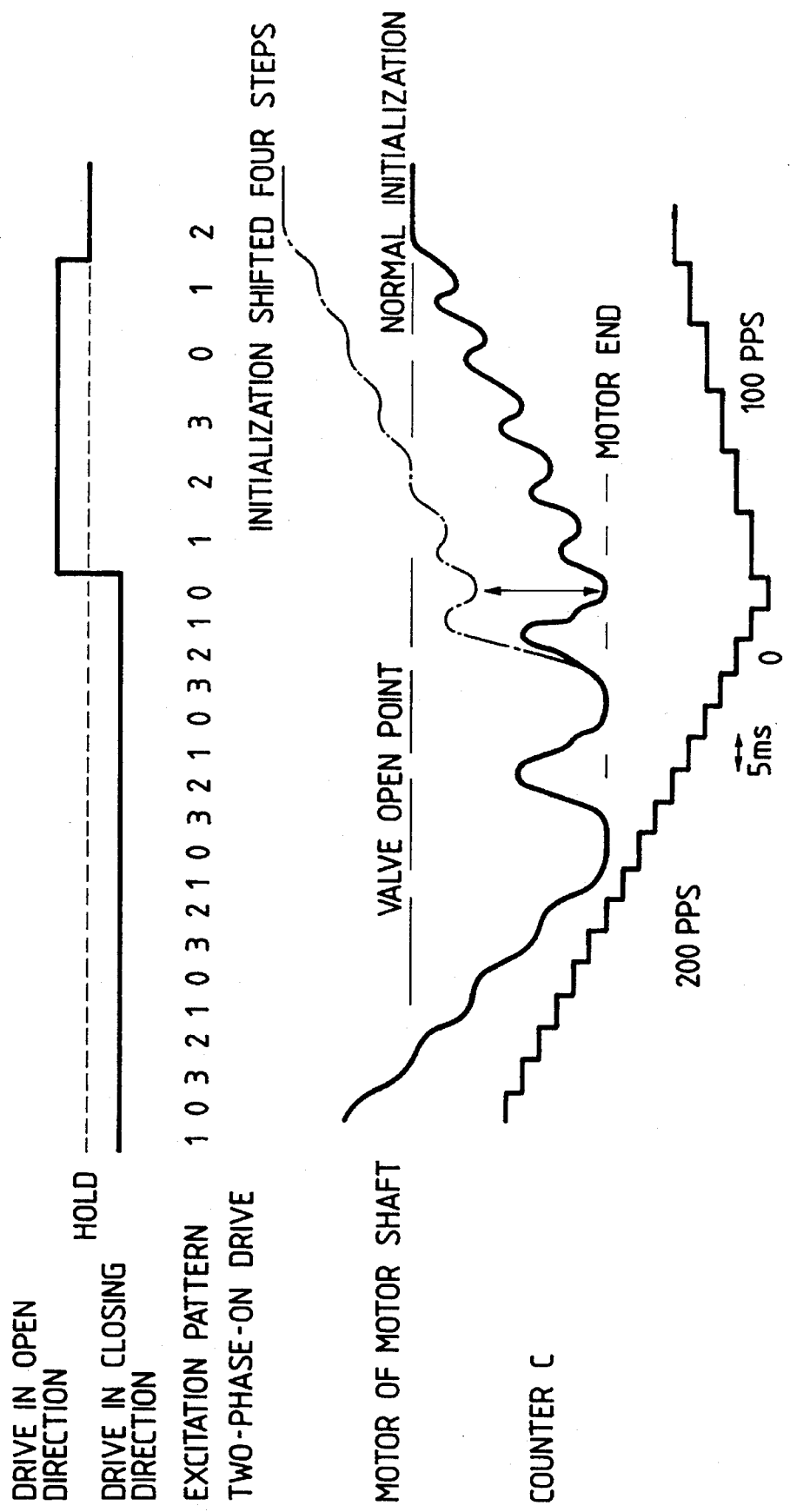
FIG. 19 is a timing chart showing out-of-adjustment of a stepper motor at initialization.

FIG. 19 shows motion of a motor shaft when a four-phase stepper motor is initialized at 200 PPS by a two-phase-on drive, which is full step drive. FIG. 19 is applied to a separate-type EGR valve; the spacing between the motor end and the valve open point is adjusted to six steps.

If driving the stepper motor in the valve closing direction is continued at initialization, the motor shaft abuts against the motor end before a counter C becomes 0. Since the counter C does not yet becomes 0, an electronic control unit 11 outputs a drive signal to furthermore drive the stepper motor in the valve closing direction. Thus, a collision between the motor shaft and the motor end occurs, causing the stepper motor to move out of adjustment, as indicated by the broken line in FIG. 19. In the out-of-adjustment, a shift occurs by as many steps as proportional to the number of phases of the stepper motor. For a four-phase stepper motor, a shift occurs by four, eight, or 12 steps in the valve open direction.

In FIG. 19, the separate-type EGR valve is taken as an example, but a similar malfunction also occurs in an integral-type EGR valve.

Therefore, if the stepper motor moves out of adjustment when the value of the counter C is, for example, three, the stepper motor cannot be driven to the motor end by the time the counter C becomes 0, and is initialized with the motor shaft placed out of position as shown in the figure; accurate EGR control cannot be performed.

This may be caused by the fact that the rotor of the stepper motor oscillates. It is possible as one source that although the natural oscillation frequency of the rotor is about 150 Hz, the stepper motor is driven at 200 PPS (200 Hz) by a drive signal having a frequency higher than that frequency.

Then, in embodiment 3, the frequency of the drive signal of the stepper motor at initialization is lessened and the stepper motor is driven after oscillation of the rotor stops.

Figure 20:
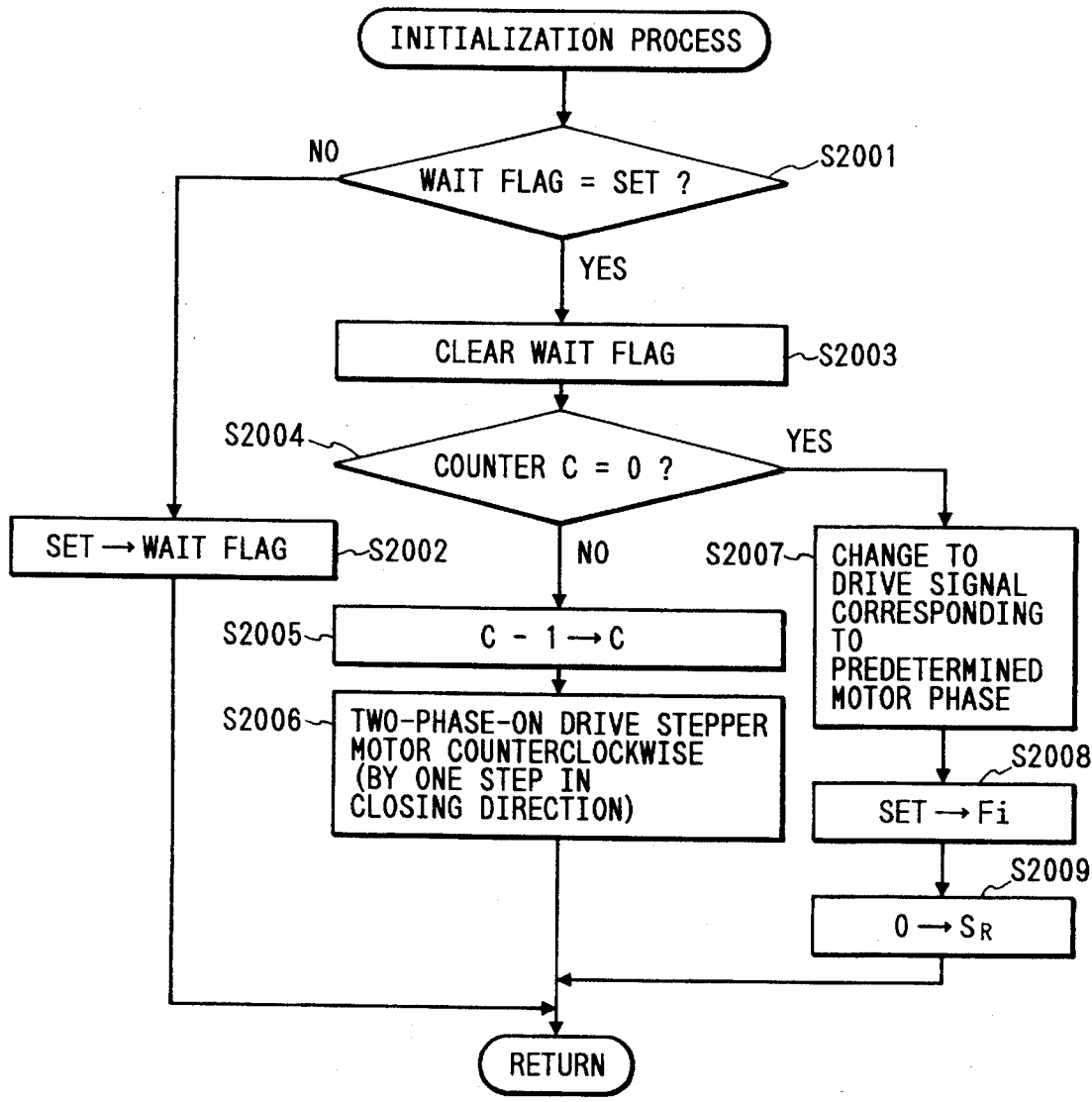
FIG. 20 is a detailed flowchart of initialization process according to the invention.

FIG. 20 is a flowchart for setting the drive signal frequency at initialization to 100 PPS, specifically, for driving the stepper motor once every twice interrupt processing.

In FIG. 20, at step S2001, whether or not a wait flag is set is determined. If the wait flag is not set, control goes to step S2002 and the wait flag is set, then the process is terminated.

If the wait flag is set at step S2001, the wait flag is cleared at step S2003 and control goes to steps S2004 and later for executing initialization. Steps S2004 to S2009 correspond to S1001 to S1006 in FIG. 10 and will not be discussed again.

Therefore, in embodiment 3, initialization process is performed only once every twice the interrupt process executed every 5 ms at steps S2001 to S2003, and the stepper motor is driven at 100 PPS.

Steps S2001 to S2003 provide first drive method change means.

Thus, oscillation is suppressed before the stepper motor is driven, enabling out-of-adjustment to be prevented from occurring when the motor shaft is pulled most into the stepper motor side.

Although the stepper motor drive signal is changed from 200 PPS to 100 PPS in embodiment 3, if the frequency is furthermore lessened to 50 or 20 PPS, for example, a greater effect can be produced, needless to say.

In embodiment 3, the flowchart only for the integral-type EGR valve is shown, but steps S2001 to S2003 may be added to the flowchart of FIG. 18 as shown in FIG. 20 for the separate-type EGR valve.

Figure 21:
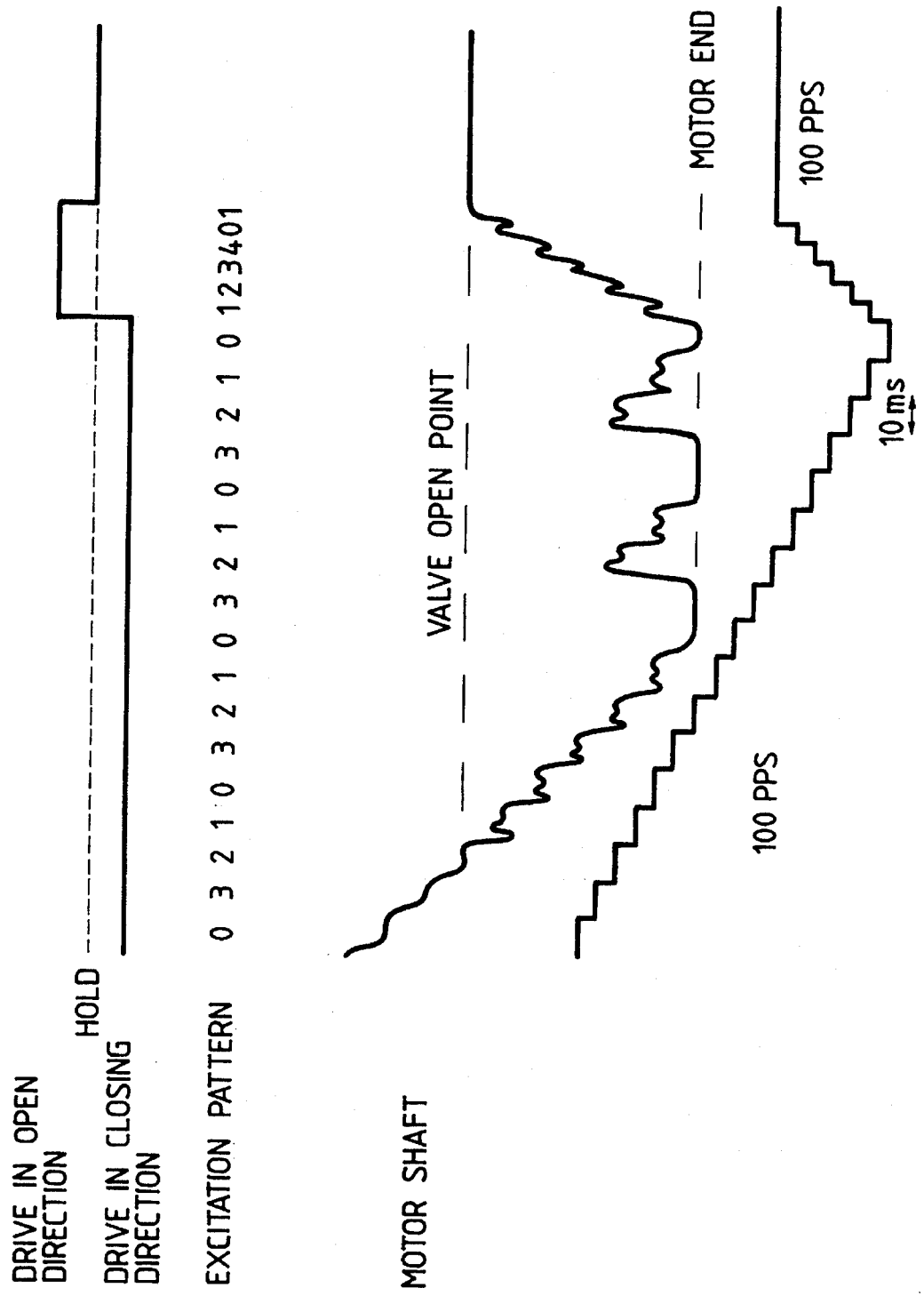
FIG. 21 is a timing chart showing initialization according to the invention.

FIG. 21 shows motion of the motor shaft when initialization is executed by a 100-PPS drive signal.

The figure indicates that out-of-adjustment by as many steps as an integral multiple of the number of stepper motor phases as in FIG. 19 does not occur any more.

Embodiment 4

Although the stepper motor is driven after oscillation of the rotor stops in embodiment 3, the travel distance of the stepper motor per drive signal may be lessened to suppress oscillation.

Specifically, if a four-phase stepper motor is driven by two-phase-on drive, the stepper motor moves by one step in response to one drive signal (full step).

In contrast, the stepper motor is driven by one-two-phase-on drive, it moves only 0.5 step in response to one drive signal (half step). If the travel distance per drive signal lessens, oscillation also lessens, of course, making out-of-adjustment hard to occur.

Figure 22:
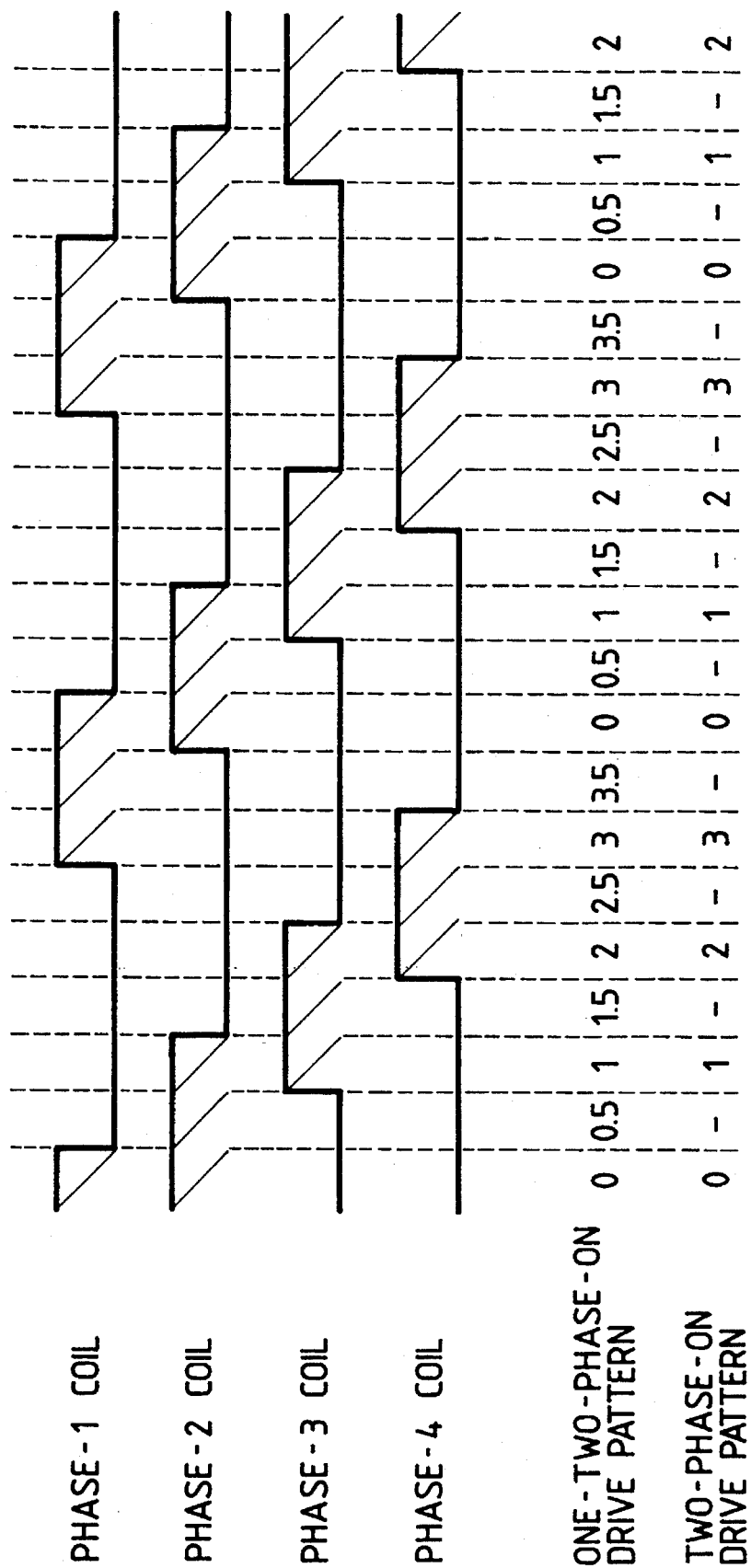
FIG. 22 is a drive characteristic chart at a general four-phase stepper motor.

FIG. 22 shows drive signals of two-phase-on drive and one-two-phase-on drive and their travel distances.

To move from phase 0 to 1, namely, move one step in the valve opening direction by the two-phase-on drive at the left end of FIG. 22, the drive signals to phase-1 to phase-4 coils are changed from HHLL to LHHL. To move from phase 0 to 0.5, namely, move 0.5 step in the valve opening direction by the one-two-phase-on drive, the drive signals to phase-1 to phase-4 coils should be changed from HHLL to LHLL.

The drive system is generally known and therefore will not be discussed here.

Figure 23:
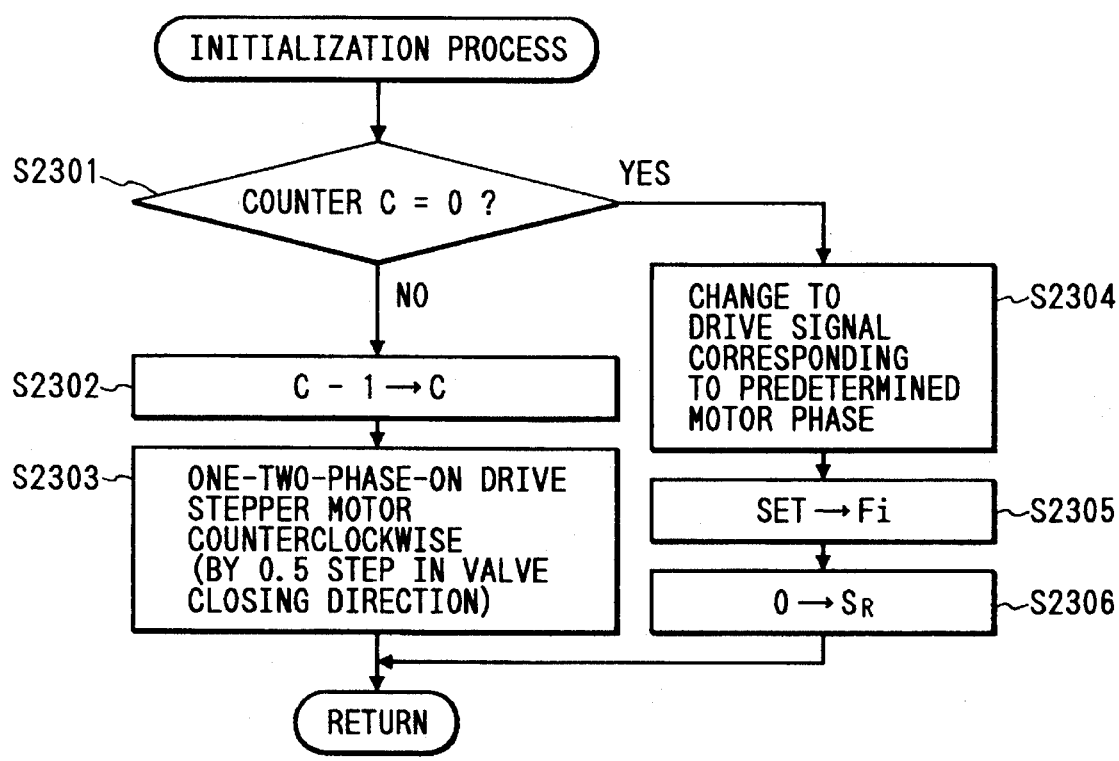
FIG. 23 is a detailed flowchart of initialization process according to the invention.

FIG. 23 is a flowchart of embodiment 4. In the figure, steps S2301, S2302, and S2304 to S2306 correspond to steps S1001, S1002, and S1004 to S1006 in FIG. 10. Although the stepper motor is driven one step in the valve closing direction by the two-phase-on drive at step S1003 in FIG. 10, the stepper motor is driven 0.5 step in the valve closing direction by the one-two-phase-on drive at step S2303 in FIG. 23.

In embodiment 4, the travel distance per drive signal lessens. Therefore, note that the initial value of the counter C must be increased so that the motor shaft returns to the position at which it is pulled most into the stepper motor side at initialization.

FIG. 23 is a flowchart applied when the integral-type EGR valve is used; to use the separate-type EGR valve, step S1809 in FIG. 18 should be changed to step S2303 in FIG. 23.

Step S2303 provides first drive method change means in embodiment 4.

Figure 24:
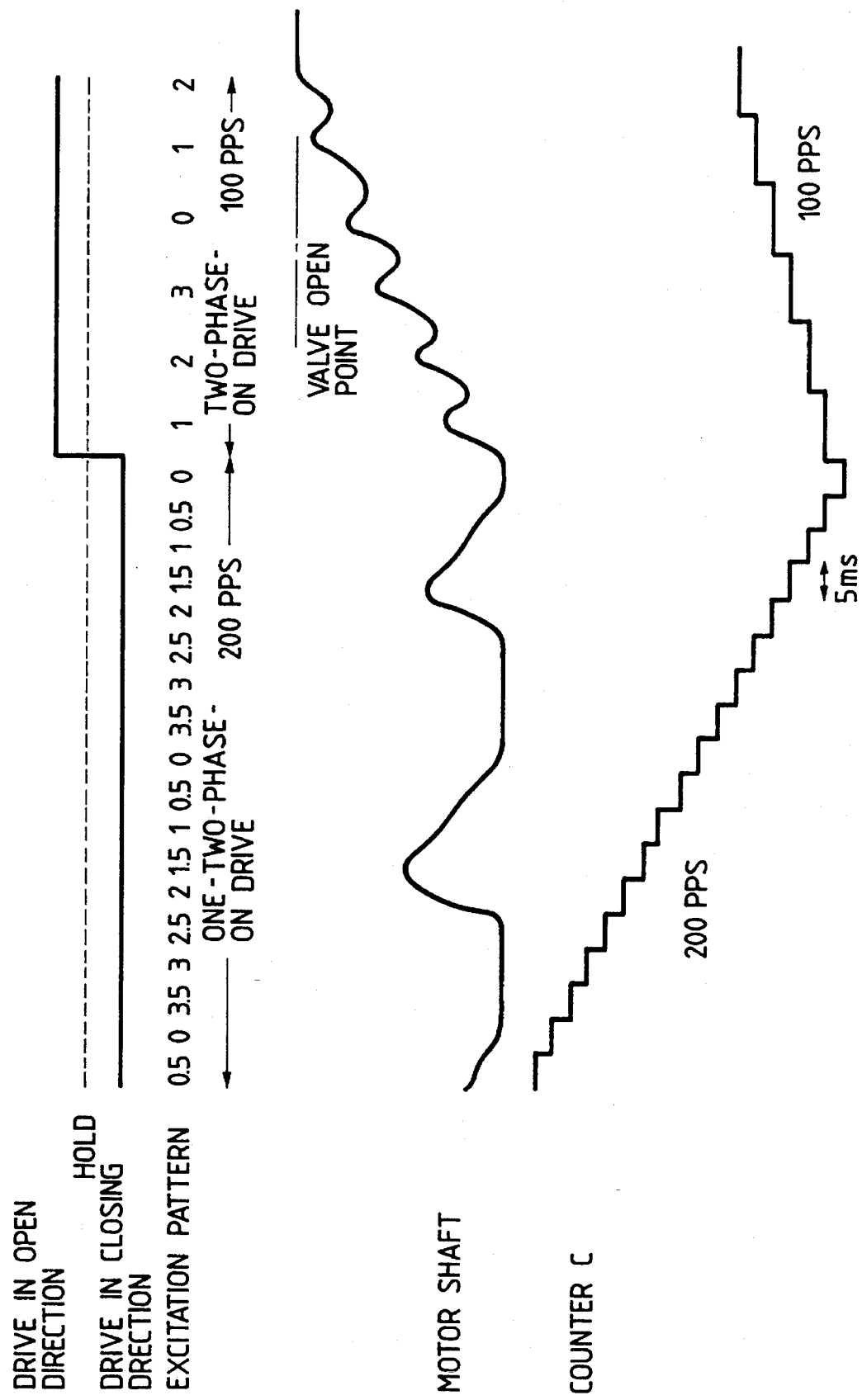
FIG. 24 is a timing chart showing initialization according to the invention.

FIG. 24 is a timing chart when embodiment 4 is applied to the separate-type EGR valve.

Referring to the figure, the stepper motor is driven by the one-two-phase-on drive until the counter C become 0, and after this, it is driven by the two-phase-on drive at the normal control time. FIG. 24 also indicates that out-of-adjustment by as many steps as an integral multiple of the number of stepper motor phases as in FIG. 19 does not occur any more.

Since shock at a collision between the motor shaft and rotor stopper or between the body and valve seat is lessened by the above-mentioned processing, durability of the EGR valve is improved.

Embodiment 5

Although rotor oscillation is suppressed by changing the travel distance of the stepper motor per drive signal from a full step to a half step in embodiment 4, the stepper motor can also be microstep-driven as means for suppressing rotor vibration.

The microstep drive is a method to drive a stepper motor by sine wave current, for example; the stepper motor moves very smoothly or almost linearly.

Figure 25:
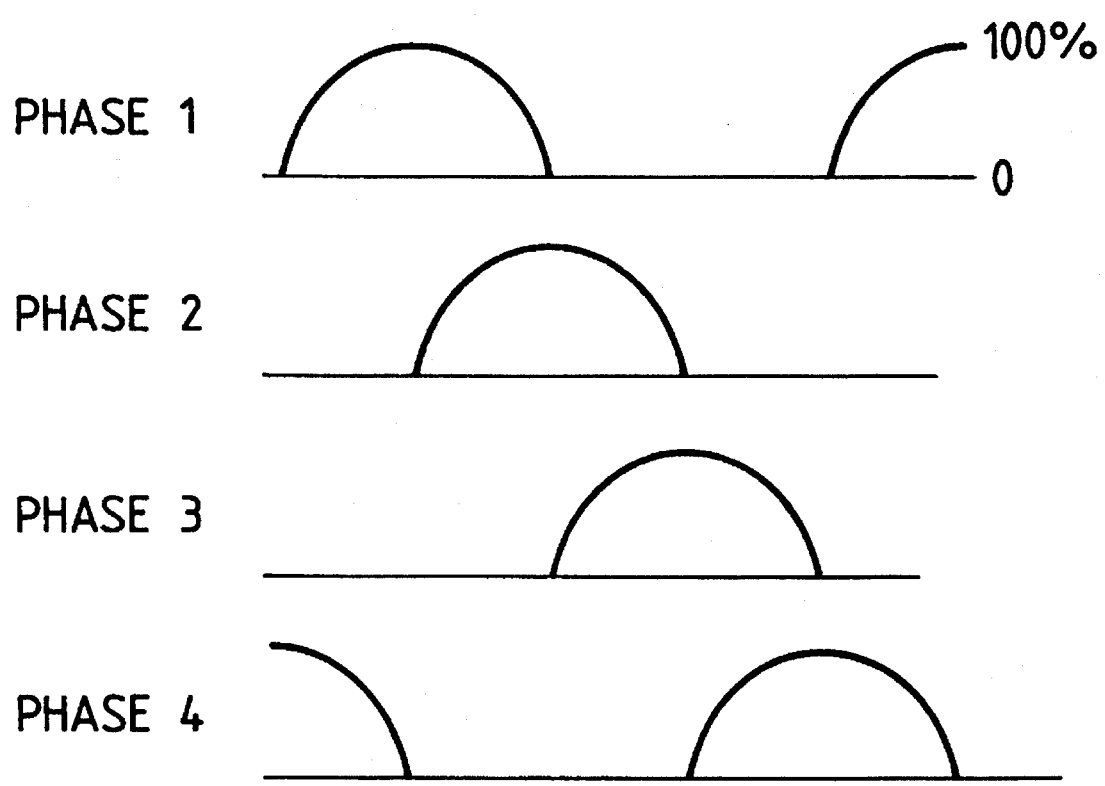
FIG. 25 is a waveform chart of drive signals in general microstep drive.

FIG. 25 shows one example of drive signals to coils for microstep driving. The drive signals may be triangular waves or trapezoid waves, for example, rather than sine waves.

The signals to the coils in FIG. 25 are drawn as continuous sine wave signals; in fact, they are signals made analogous to sine waves by a PWM (pulse width modulation) signal.

The microstep drive is also a generally known drive method and therefore will not be discussed in detail.

A flowchart of embodiment 5 is not provided. To implement embodiment 5, for the integral-type EGR valve, step S2303 in FIG. 23 is changed to a step at which the stepper motor is driven in the valve closing direction by the microstep drive rather than the one-two-phase-on drive; for the separate-type EGR valve, step S1809 in FIG. 18 should be changed to a step at which the stepper motor is driven in the valve closing direction by the microstep drive rather than the two-phase-on drive.

The new steps provide first drive method change means in embodiment 5.

Figure 26:
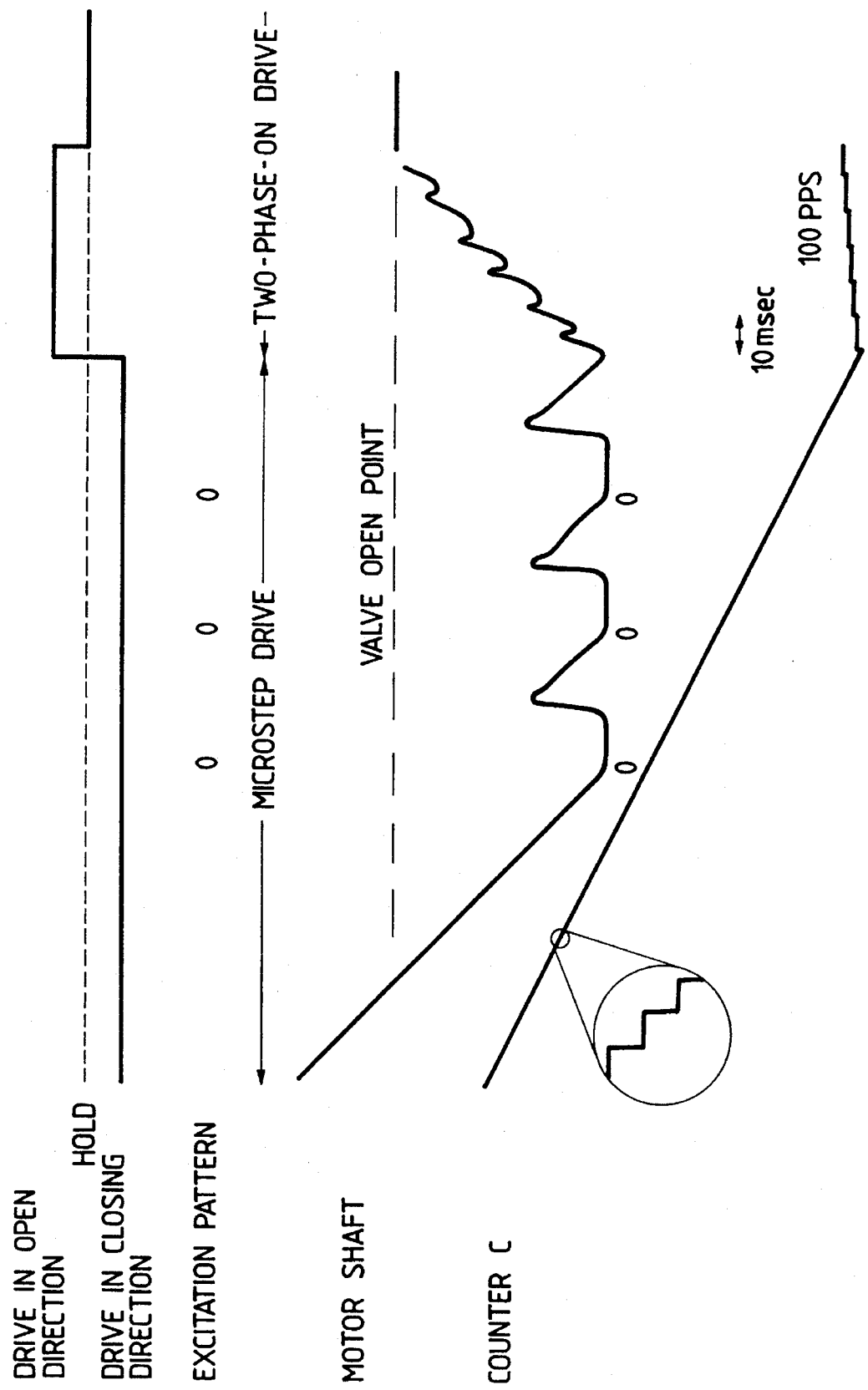
FIG. 26 is a timing chart showing initialization according to the invention.

FIG. 26 is a timing chart showing motion of a motor shaft when initialization is executed by the microstep drive. The figure indicates that motion of the motor shaft in the valve closing direction at initialization is almost linear. Further, FIG. 26 also indicates that out-of-adjustment by as many steps as an integral multiple of the number of stepper motor phases as in FIG. 19 does not occur any more.

As in embodiment 4, the initial value of the counter C is also set to a greater predetermined value in embodiment 5. The predetermined value is determined by how many times the microstep drive should be executed in the valve closing direction to securely pull the motor shaft most into the stepper motor side.

According to embodiment 5, the travel distance of the stepper motor per drive signal further lessens, so that durability of the EGR valve is further improved.

Embodiment 6

Although the travel distance of the stepper motor per drive signal is lessened to suppress vibration of the stepper motor in the above-mentioned embodiments, vibration of a stepper motor may be suppressed by lessening a driving force of the stepper motor.

Generally at a four-phase stepper motor, the fact that the one-phase-on drive provides a smaller driving force as compared with the two-phase-on drive is known. Therefore, if the stepper motor drive system is changed from the two-phase-on drive to one-phase-on drive at initialization, when a collision occurs between a body and valve seat for an integral-type EGR valve or between a rotor stopper and motor shaft for a separate-type EGR valve, physical repulsion lessens and the stepper motor can be prevented from moving largely out of adjustment.

In embodiment 6, the characteristic is used to prevent the stepper motor from moving out of adjustment when the motor shaft is pulled most into the stepper motor side.

In embodiment 6, a flowchart is not provided either. To implement embodiment 6, for the integral-type EGR valve, step S2303 in FIG. 23 is changed to a step at which the stepper motor is driven in the valve closing direction by the one-phase-on drive rather than the one-two-phase-on drive; for the separate-type EGR valve, step S1809 in FIG. 18 should changed to a step at which the stepper motor is driven in the valve closing direction by the one-phase-on drive rather than the two-phase-on drive.

The new steps provide first drive method change means in embodiment 6.

Figure 27:
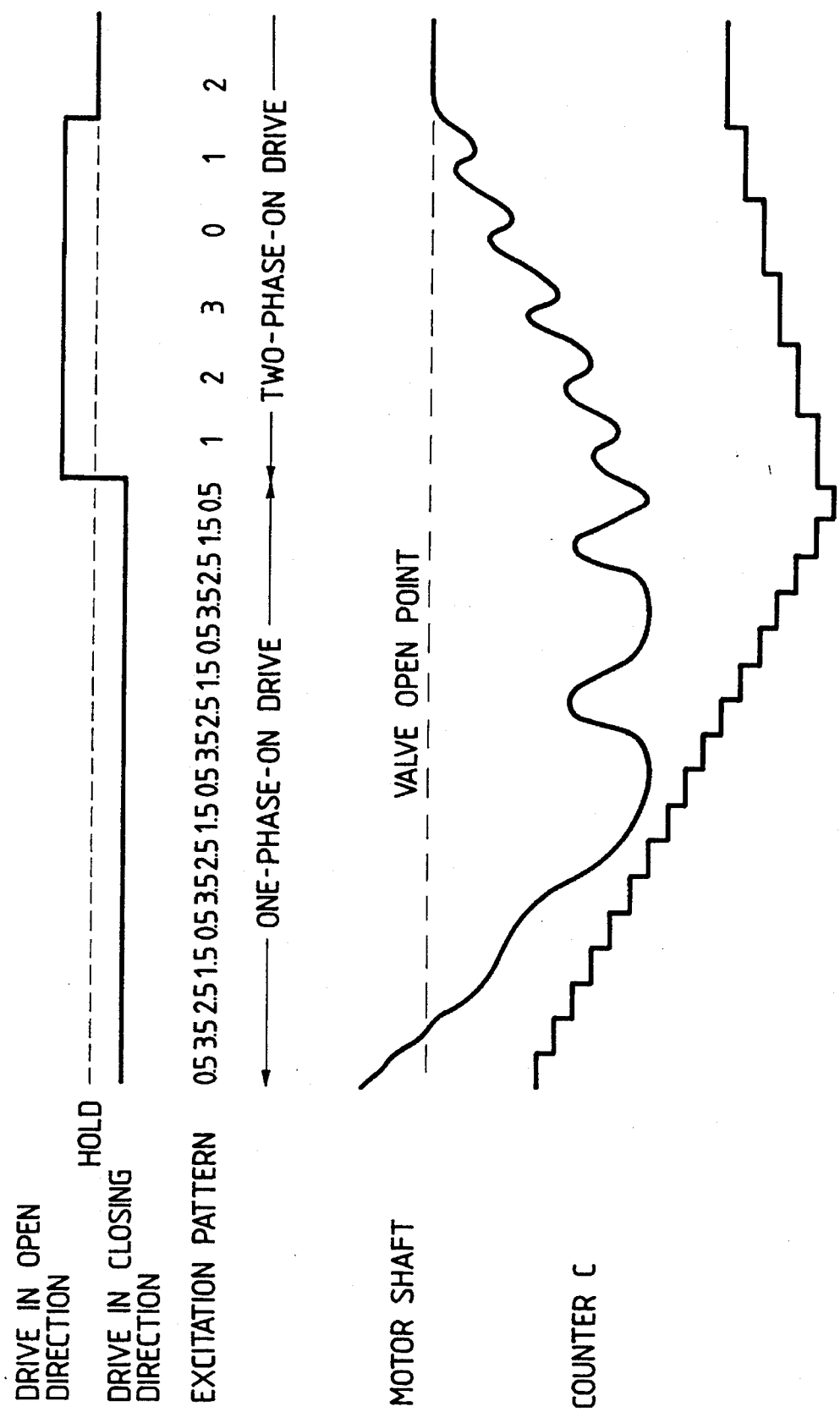
FIG. 27 is a timing chart showing initialization according to the invention.

FIG. 27 is a timing chart showing motion of a motor shaft when initialization is executed by the one-phase-on drive. The figure also indicates that out-of-adjustment by as many steps as an integral multiple of the number of stepper motor phases as in FIG. 19 does not occur any more.

According to embodiment 6, stepper motor driving force lessens, thus shock at the above-mentioned collision lessens and durability of the EGR valve is improved.

Figure 28:
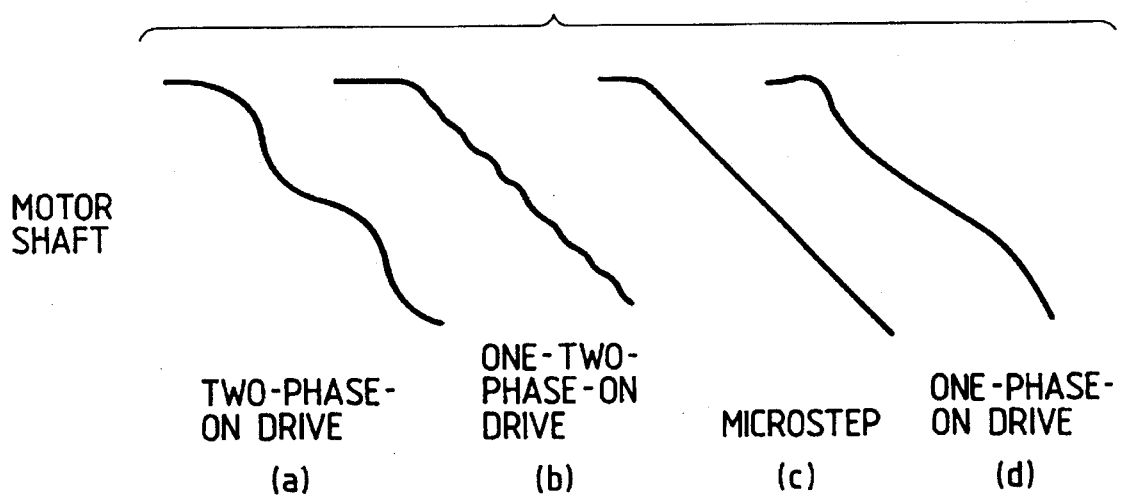
FIG. 28 is a characteristic chart showing the operation of a general four-phase stepper motor when the drive system is changed at the stepper motor.

For reference, FIG. 28 shows motion of the motor shaft in the drive systems.

Embodiment 7

Unlike the above-discussed embodiments, embodiment 7 is adapted to physically suppress out-of-adjustment of a stepper motor caused by a collision between a motor shaft and rotor stopper.

Embodiment 7 is applied to a separate-type EGR valve.

Figure 29:
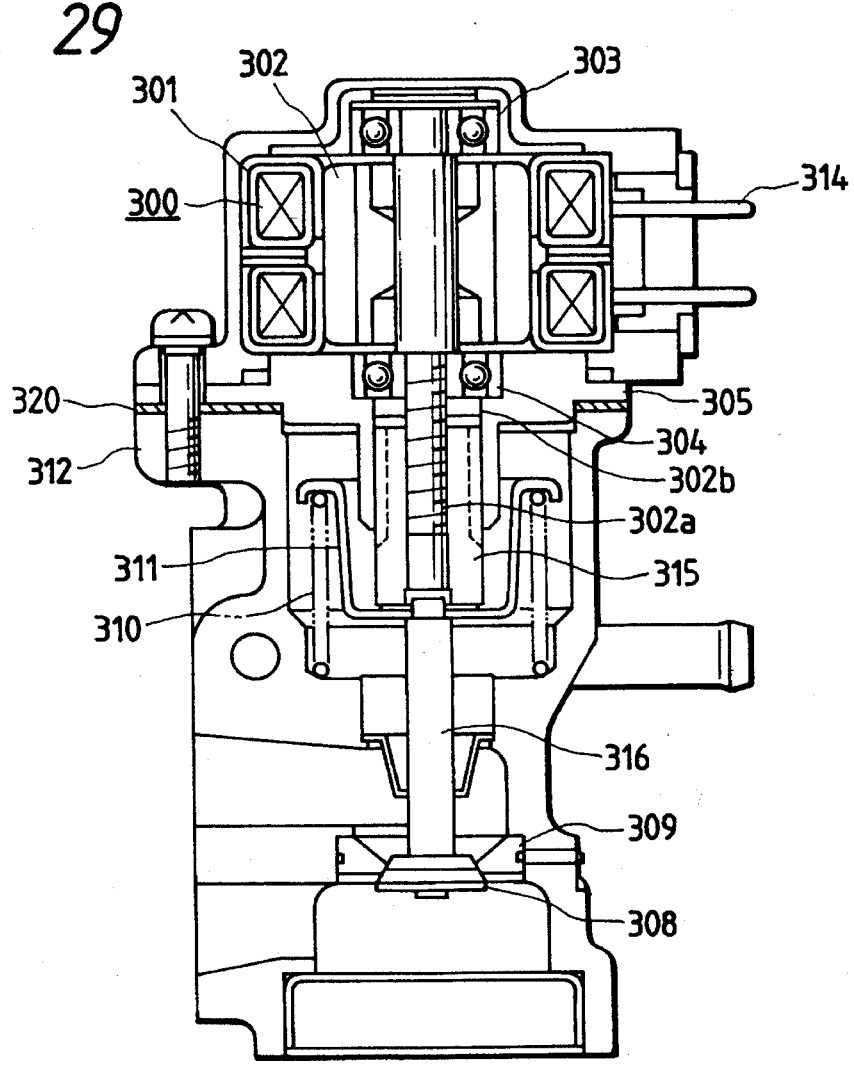
FIG. 29 is a sectional view-of a separate-type EGR valve showing first adjustment means according to the invention.

FIG. 29 is a sectional view of a separate-type EGR valve to which embodiment 7 is applied. In FIG. 29, the spacer 317 in FIG. 11 is changed to a spacer 320, which is first adjustment means; parts identical with those previously described with reference to FIG. 11 are denoted by the same reference numerals in FIG. 29.

When a collision occurs between a rotor stopper 302b and a motor shaft 315, the spacer 320 in embodiment 7 functions so as to prevent a stepper motor 300 from moving out of adjustment and the motor shaft 315 from greatly shifting.

The function of the spacer 320 will be discussed. FIG. 29 shows a state when a body 308 and a valve seat 309 abut against each other at the separate-type EGR valve, namely, a state of a valve open point. With the separate-type EGR valve, the motor shaft 315 leaves a valve shaft 316 at the valve open point and is furthermore pulled into the side of the stepper motor 300 until it abuts against the rotor stopper 302b.

The thinner the spacer 320, the larger is the spacing 5 between the end of the motor shaft 315 on the valve shaft side (downward in FIG. 29) and the end of the valve shaft 316 on the motor shaft side (upward in FIG. 29). In contrast, the thicker the spacer 320, the smaller the spacing.

Therefore, the spacing when the motor shaft of the separate-type EGR valve is at the motor end may be adjusted to, for example, four steps by means of the spacer 320. In this case, the range in which the motor shaft 315 moves out of adjustment is physically regulated by the rotor stopper 302b and the end of the valve shaft 316 on the motor shaft side (upward in FIG. 29), whereby even if the stepper motor 300 moves out of adjustment, a shift by as many steps as an integer multiple of the number of stepper motor phases will not occur.

Figure 30:
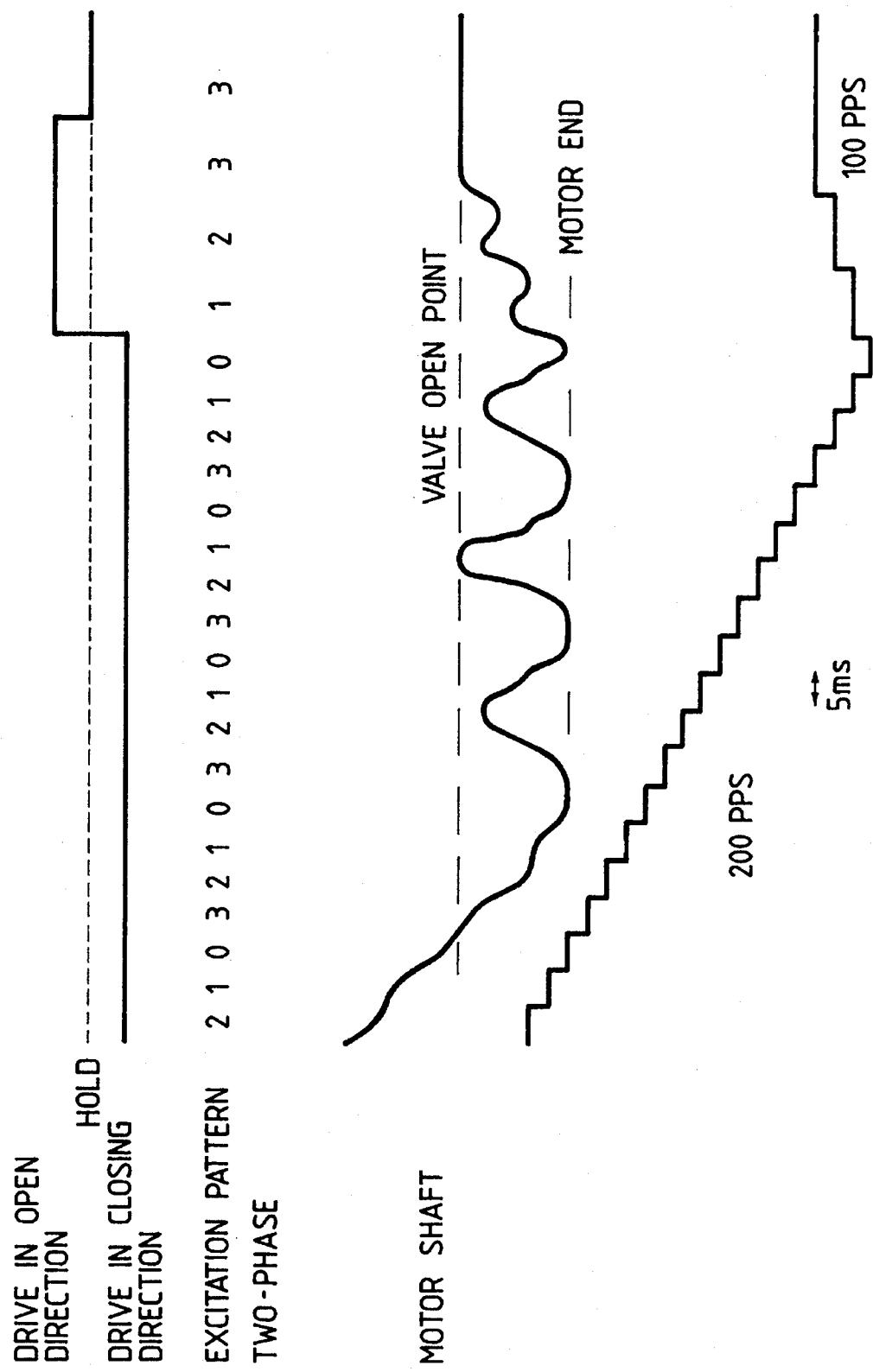
FIG. 30 is a timing chart showing initialization according to the invention.

FIG. 30 is a timing chart showing motion of the motor shaft when embodiment 7 is applied to the separate-type EGR valve.

As seen in the figure, the stepper motor 300 moves out of adjustment in the center of FIG. 30, but the motor shaft 315 collides with the valve shaft 316 at the valve open point, thereby preventing the stepper motor 300 from more moving out of adjustment.

The first adjustment means is not limited to the spacer and may be made of the above-mentioned screw groove and screw member.

Embodiment 8

According to the embodiments discussed above, accurate initialization is enabled. However, if a stepper motor frequently moves out of adjustment during EGR control, precise EGR control cannot be desired no matter how accurately initialization is executed.

Embodiment 8 deals with the problem and prevents a stepper motor from moving out of adjustment during EGR control.

Figure 31:
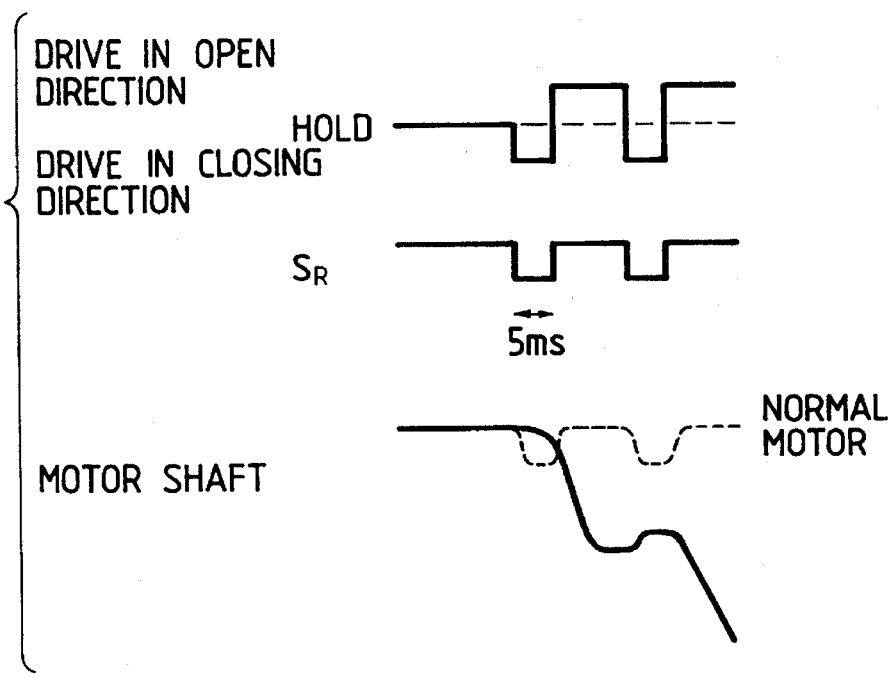
FIG. 31 is a timing chart showing an out-of-adjustment example when the stepper motor driving direction changes.
Figure 32:
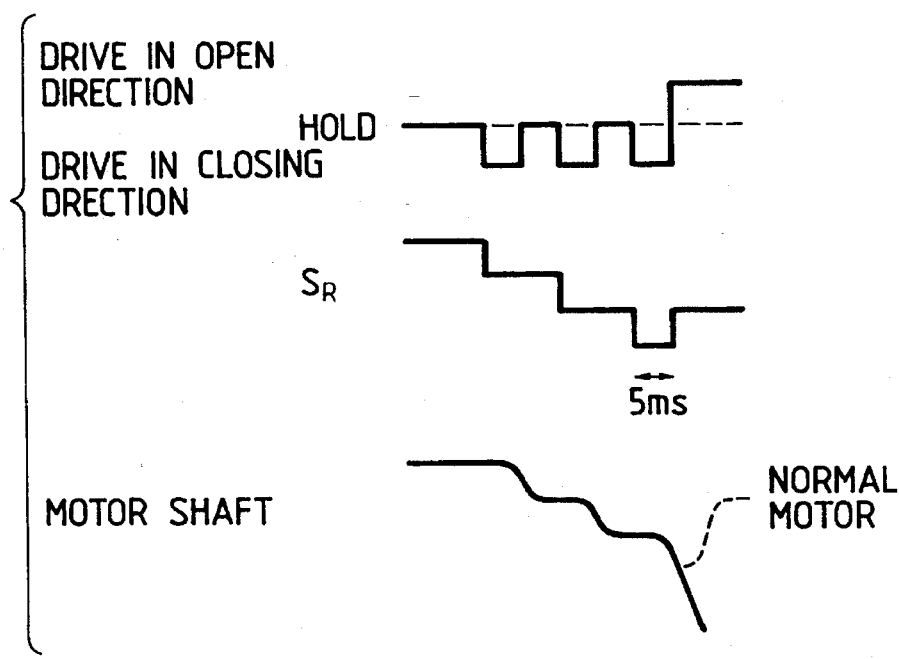
FIG. 32 is a timing chart showing an out-of-adjustment example when the stepper motor driving direction changes.

FIGS. 31 and 32 show examples in which a stepper motor moves out of adjustment during EGR control. In the figures, control must be performed as indicated by the broken lines, but actual control is as indicated by the solid lines due to out-of-adjustment of the stepper motor.

The inventors and associates find by experiment that the out-of-adjustment frequently occurs when the stepper motor driving direction is changed, particularly when an attempt is made to reverse the rotation direction of the stepper motor to drive the stepper motor in the valve opening direction while the stepper motor is driven in the valve closing direction.

It is considered that the out-of-adjustment is mainly caused by a compression coil spring 310 for energizing in the valve closing direction. To drive the stepper motor in the valve closing direction, it is easily driven with the aid of energy of the compression coil spring 10. However, if an attempt is made to rapidly reverse the rotation direction to drive the stepper motor in the valve opening direction, the energy of the compression coil spring 310 must be opposed. If the driving force is weak, the driving direction cannot be reversed, causing the stepper motor to move out of adjustment.

The out-of-adjustment is caused not only by the weak driving force, but also by vibration of the rotor of the stepper motor described above.

To solve the problem, in embodiment 8, the stepper motor driving direction is changed smoothly.

Specifically, when the stepper motor driving direction is changed, a drive signal frequency is lessened.

As an example of lessening the drive signal frequency when the stepper motor driving direction is changed, a method of once holding the stepper motor before the rotation direction is reversed is possible when the preceding driving direction is opposite to the current driving direction.

Figure 33:
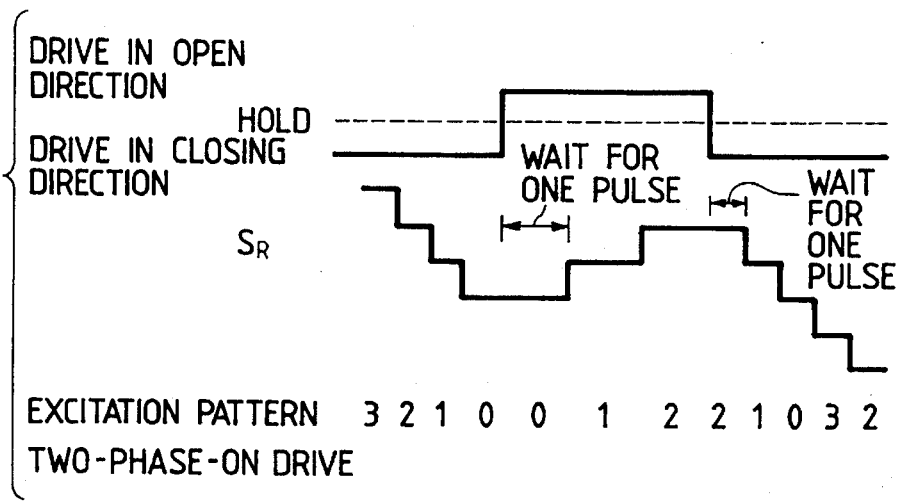
FIG. 33 is a timing chart showing the operation of second drive method change means according to the invention.

FIG. 33 is a timing chart showing EGR valve control to which embodiment 8 is applied. As seen in the figure, to change the stepper motor driving direction from the valve closing direction to opening direction or vice versa, the stepper motor is once held before the driving direction is changed.

Thus, the stepper motor driving direction is not rapidly changed and is smoothly reversed, preventing the stepper motor from moving out of adjustment.

Figure 34:
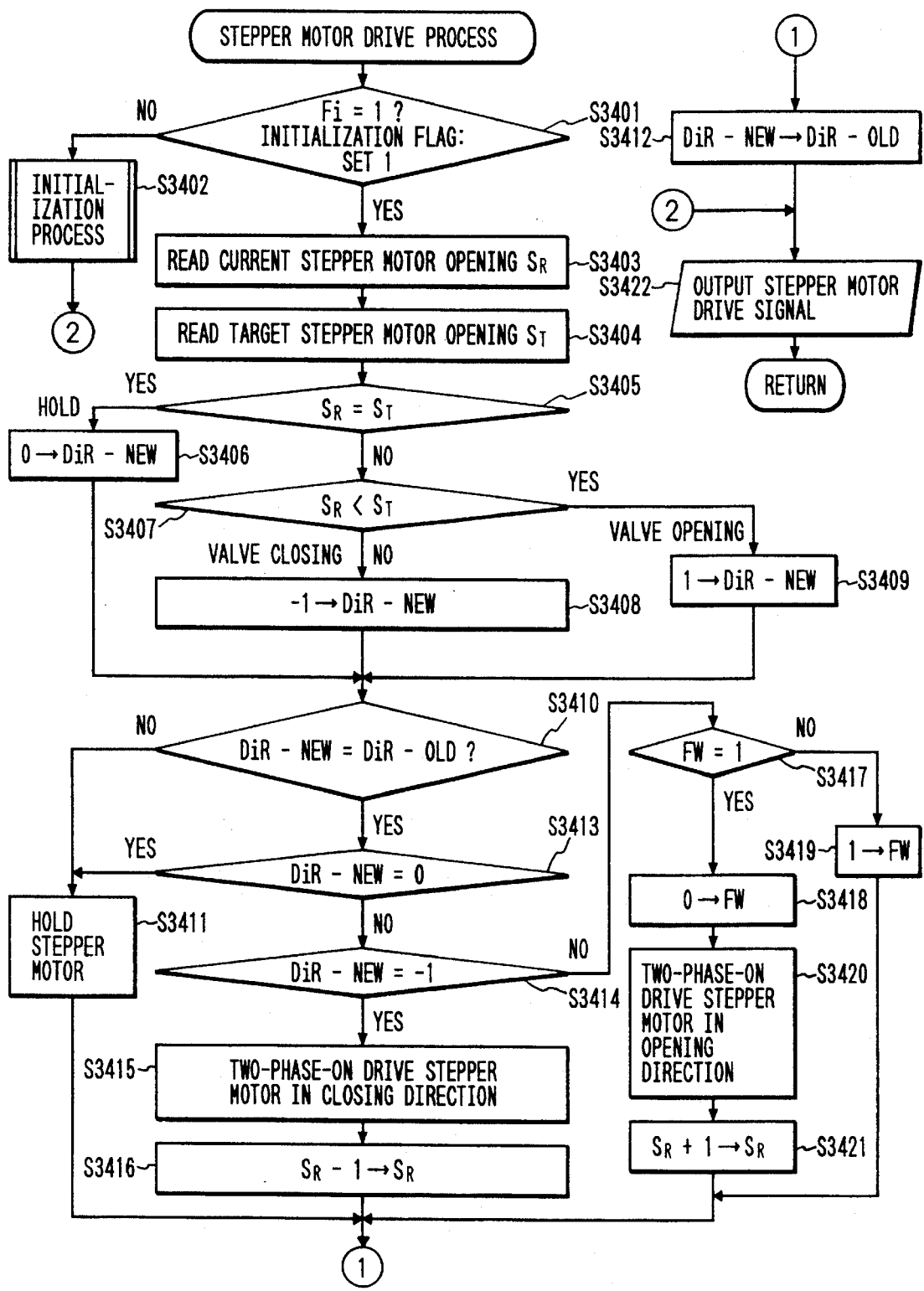
FIG. 34 is a flowchart showing stepper motor drive process according to the invention.

FIG. 34 is a flowchart for implementing embodiment 8.

Like FIG. 9, FIG. 34 is also interrupt process performed every predetermined time, for example, every 5 ms.

At step S3401, whether or not initialization is complete is determined depending on whether or not an initialization flag Fi is 1. If initialization is not complete, control goes to step S3402 at which initialization is executed. If initialization is complete, control advances to steps S3403 and S3404 at which a counter SR indicating the current EGR valve opening and target stepper motor opening ST are read.

Steps 3405 to 3409 are steps at which the current stepper motor driving direction is determined (valve opening or closing direction or hold). At step S3405, whether or not the counter SR indicating the current EGR valve opening equals the target stepper motor opening ST is determined. If they equal each other, the stepper motor need not be driven and the driving direction is judged hold, and at step S3406, 0 meaning hold is set in current driving direction Dir-NEW. If they do not equal at step S3405, control advances to step S3407 at which the stepper motor driving direction is determined. If the current EGR valve opening SR is greater than the target stepper motor opening ST at step S3407, the stepper motor must be driven in the valve closing direction. In this case, control goes to S3408 at which −1 indicating the valve closing direction is set in DiR-NEW. If the target stepper motor opening ST is greater than the current EGR valve opening SR at step S3407, control advances to step S3409 at which 1 indicating the valve opening direction is set in DiR-NEW.

Thus, if the contents set in DiR-NEW are checked, the current stepper motor driving direction is known.

At step S3410, the preceding driving direction DiR-OLD is compared with the current driving direction DiR-NEW. If they differ, it is judged that the stepper motor driving direction changes. At step S3411, a drive signal for once holding the stepper motor is generated.

Steps S3410 and S3411 provide second drive method change means.

At step S3412, the contents set in the current driving direction DiR-NEW are set in the preceding driving direction DiR-OLD for the next control.

If it is judged at step S3410 that the preceding and current driving directions are the same, control advances to step S3413. In this case, drive in the valve opening or closing direction or hold is possible for both the preceding and current driving directions. At step S3413, whether or not the current driving direction is 0 indicating hold is determined. If it is 0, it means hold. Then, control goes to step S3411 and the same process sequence as described above is executed. If it is not 0, control advances to step S3414 at which whether the driving direction is the valve opening or closing direction is determined according to the contents set in the current driving direction DiR-NEW.

If the contents set in the current driving direction are −1, it indicates drive in the valve closing direction. Then, control goes to step S3415 at which a drive signal for driving the stepper motor by one step in the valve closing direction is generated. At step S3416, the counter SR indicating the current EGR valve opening is decremented by one and at step S3412, the contents set in the current driving direction DiR-NEW are set in the preceding driving direction DiR-OLD.

If the contents set in the current driving direction are 1 at step S3414, it indicates drive in the valve opening direction. Then, control goes to steps S3415 and later at which the drive signal is changed to drive the stepper motor by one step in the valve opening direction. Steps S3417 to S3419 are steps to drive the stepper motor in the valve opening direction at 100 PPS (drive once every twice interrupt processing), as described in the above-mentioned embodiments.

At step S3420, the drive signal is changed to a drive signal for driving the stepper motor by one step in the valve opening direction. At step S3421, the counter SR is incremented by one and at step S3412, the contents set in the current driving direction DiR-NEW are set in the preceding driving direction DiR-OLD.

At step S3422, the drive signal set at step S3411, S3415, or S3420 is given to the stepper motor and the process is terminated.

Embodiment 9

When the stepper motor driving direction is changed, the stepper motor is once held for smoothing the reversal operation in embodiment 8, but the travel distance of the stepper motor at the reversal operation can also be lessened for smoothing the reversal operation.

For example, when the normal control is performed, the stepper motor is driven by two-phase-on drive (full step), and at reversal, the two-phase-on drive is switched to one-two-phase-on drive (half step).

Figure 35:
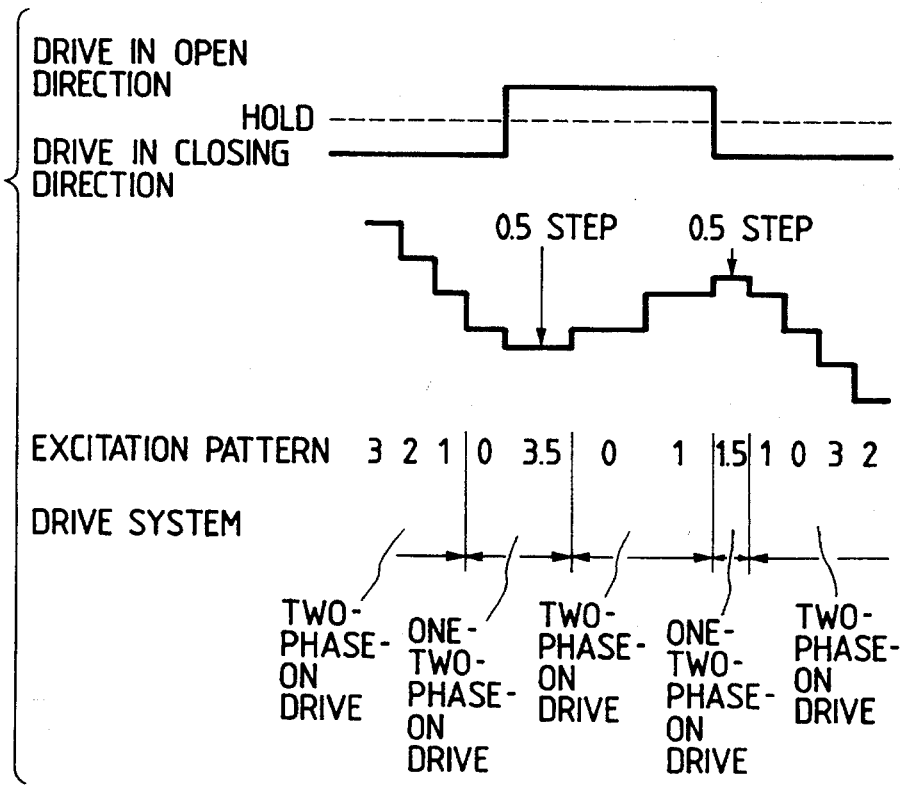
FIG. 35 is a timing chart showing the operation of second drive method change means according to the invention.

FIG. 35 is a timing chart for switching the stepper motor drive system from two-phase-on drive to one-two-phase-on drive at reversal.

Here, when the stepper motor driving direction changes from the valve closing direction to opening direction, the stepper motor is not immediately reversed, and first is driven by a half step in the valve closing direction, then driven in the opening direction. This also applies to the case where the driving direction changes from the valve opening direction to closing direction.

Figure 36:
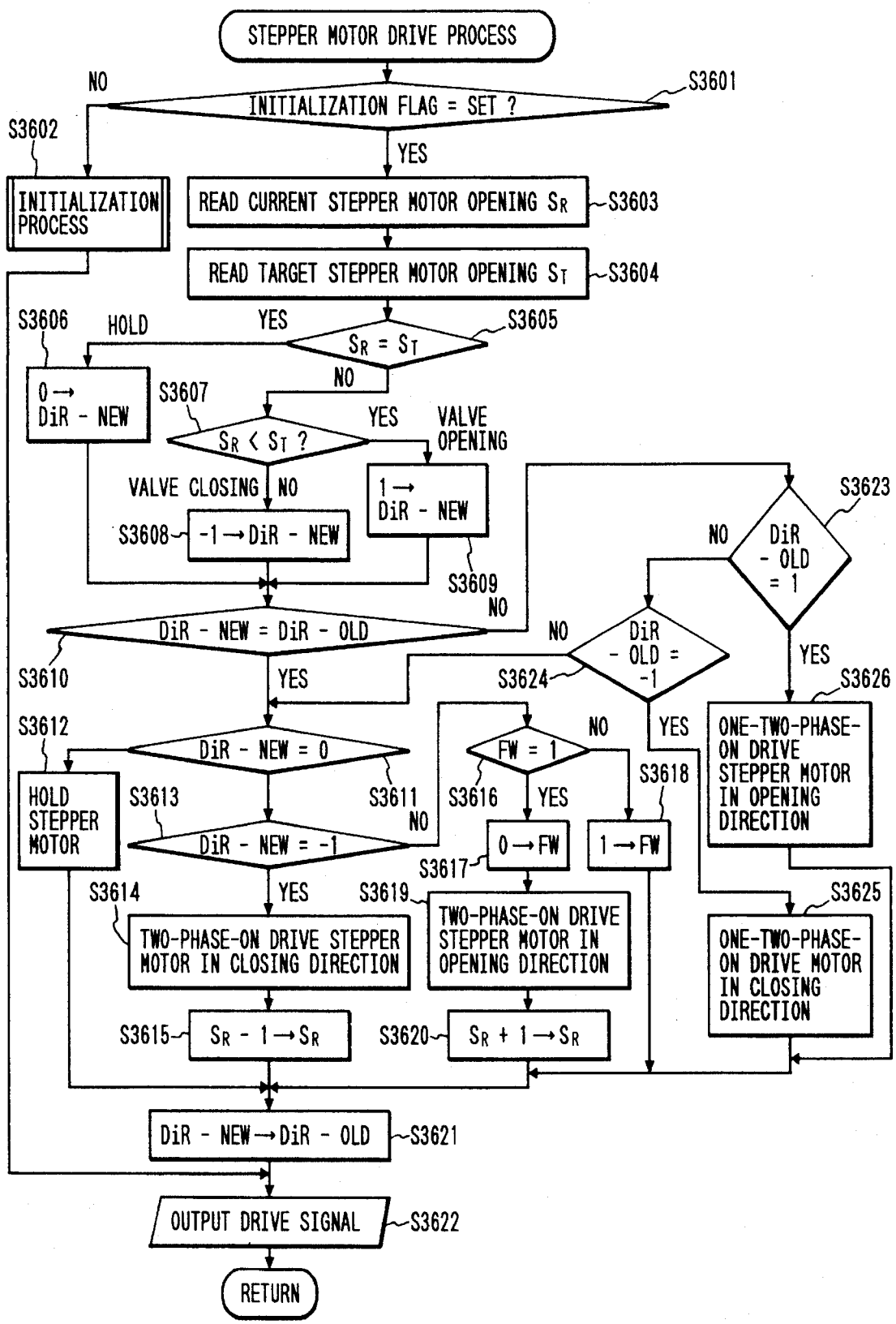
FIG. 36 is a flowchart showing stepper motor drive process according to the invention.

FIG. 36 shows an example of a flowchart to implement the timing chart of FIG. 35.

Like FIG. 34, FIG. 36 is also interrupt process performed every predetermined time, for example, every 5 ms. Steps S3601 to S3609 in FIG. 36 are similar to steps S3401 to S3409 in FIG. 34 and therefore will not be discussed here.

At step S3610, whether or not the preceding stepper motor driving direction differs from the current one is determined. If they differ, the stepper motor drive system need not be changed. Then, control goes to steps S3611 and later at which valve opening or closing or hold process is executed. At step S3611, whether or not current driving direction DiR-NEW is 0 indicating hold is determined. If hold is indicated, the drive signal is held at step S3612. If the current driving direction is not 0 at step S3611, drive in the valve opening or closing direction is indicated. Then, control advances to steps S3613 and later at which the stepper motor drive signal is changed to a drive signal for driving the stepper motor by one step in the valve opening or closing direction by the two-phase-on drive.

Steps S3613 to S3620 are similar to steps in embodiment 8 and therefore will not be discussed.

At step S3621, the contents set in the current driving direction DiR-NEW are set in the preceding driving direction DiR-OLD for the next interrupt process. At step S3622, the drive signal set at step S3612, S3614, or S3619 is output to the stepper motor for driving the stepper motor.

Next, process when the driving direction is changed will be described.

If it is judged that the preceding and current driving directions are not the same at step S3610, control advances to step S3623 at which whether or not the preceding driving direction is 1, namely, the valve opening direction is determined. If it is not the valve opening direction, control goes to step S3624 at which whether or not the preceding driving direction is the valve closing direction is determined. If it is not the valve closing direction, the preceding driving direction indicates hold. To switch from hold to valve opening or closing, care need not be used to avoid out-of-adjustment. Then, control goes to step S3611 at which the operation of valve opening or closing or hold is performed by the two-phase-on drive.

On the other hand, if the decision is YES at step S3624, the preceding driving direction is the valve closing direction and changes. This is indicated by the rising edge when the driving direction is changed from the valve closing direction to opening direction in FIG. 35. At the time, to smooth the reversal operation, the drive system is switched to the one-two-phase-on drive at step S3625 for driving the stepper motor by a half step in the valve closing direction.

After this, control goes to step S3621 at which the preceding driving direction is again set to 1. At step S3622, the drive signal is given to the stepper motor.

In the next interrupt process in FIG. 34, both the preceding and current driving directions are set to 1.

Therefore, by the process in FIG. 36 at the next time, the drive signal for driving the stepper motor in the valve opening direction by the two-phase-on drive is given to the stepper motor.

Referring to FIG. 35, the drive system is switched from the one-two-phase-on drive to two-phase-on drive by the next interrupt process, however, the drive signal is changed so that the excitation pattern is switched from the 3.5 pattern of the one-two-phase-on drive to 0 pattern of the two-phase-on drive.

Therefore, in fact, when the stepper motor driving direction is switched, the stepper motor is driven twice a half step, as shown in FIG. 35. This is very effective for smoothing the reversal operation.

If the preceding driving direction is 1, namely, the valve opening direction at step S3623, control advances to step S3626 at which the drive system is switched to the one-two-phase-on drive for driving the stepper motor by 0.5 step in the valve opening direction.

The following steps are similar to those discussed above in drive in the valve closing direction and therefore will not be described again.

In the embodiment, if the driving direction changes, the stepper motor is driven by 0.5 step in the preceding driving direction and then the driving direction is changed, as shown in FIG. 35.

Figure 37:
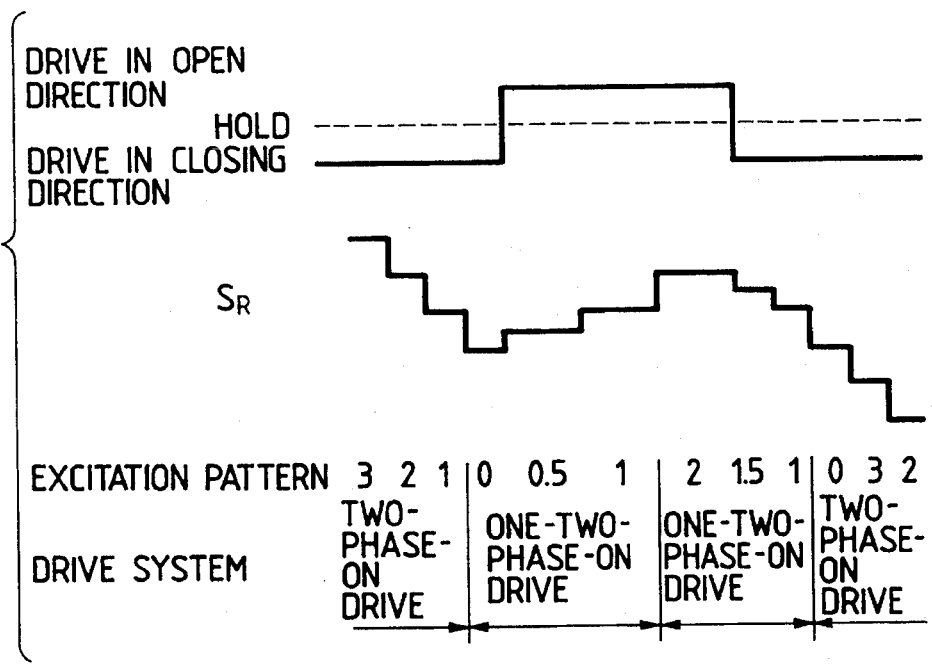
FIG. 37 is a timing chart showing the operation of second drive method change means according to the invention.

However, the method for embodying the invention is not limited to it. For example, if the driving direction changes, the stepper motor is immediately driven in the change direction, but the travel distance is 0.5 step, as shown in FIG. 37.

In this case, the driving direction is promptly switched and EGR control responsivity can be improved.

Steps S3610 and S3623 to S3626 provide second drive method change means.

Although not discussed with reference to accompanying drawings, the above-described microstep drive system may be used from the two-phase-on drive to smooth the reversal operation. In this case, since the travel distance per drive signal is minute, if microstep drive is performed only once at the reversal operation, it is meaningless. Therefore, note that microstep drive should be performed continuously a number of times to smooth the reversal operation.

Thus, the reversal operation is extremely smoothed and the stepper motor can be more reliably prevented from moving out of adjustment.

Embodiment 10

We have discussed the embodiments in which accurate initialization is executed or in which the stepper motor is prevented from moving out of adjustment during EGR control so as not to waste the accurately executed initialization. However, it is extremely difficult to completely prevent the stepper motor from moving out of adjustment during EGR control.

Then, in embodiment 10, initialization frequency is increased so as to enable initialization to be executed immediately when the stepper motor moves out of adjustment.

The basic technical concept of embodiment 10 is to execute initialization only once whenever a specific run condition is entered in which a predetermined or more power supply, for example, 10 V, is provided without the need for EGR control. The initialization is executed so that the motor phase at the motor end or valve open point becomes a predetermined phase, as described above.

Examples of the specific run condition include an idling condition, engine start completion (end of cracking or complete combustion of engine), or a condition within a predetermined time after engine stop. The reason why initialization is executed after the engine stop is that the EGR valve is fully closed by initializing when the engine stops, thereby improving the operability when the engine is again started.

Figure 38:
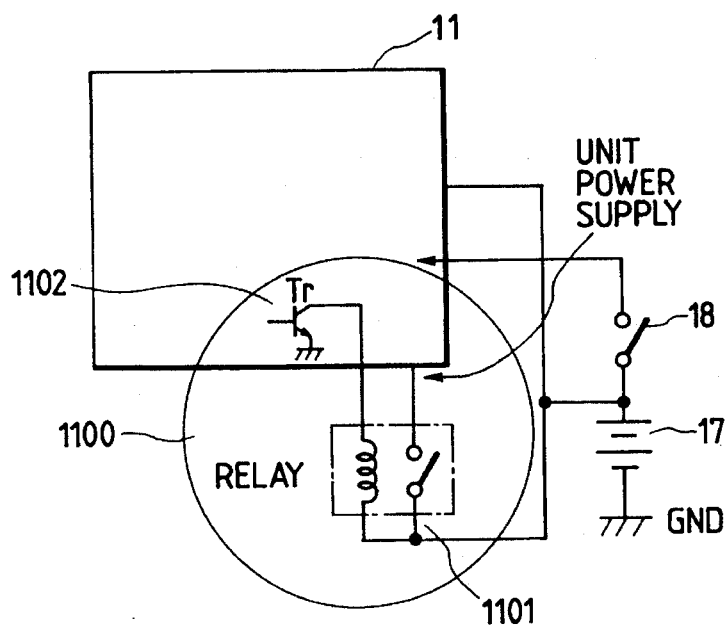
FIG. 38 is a block diagram of an electronic control unit having a power holding circuit.
Figure 39:
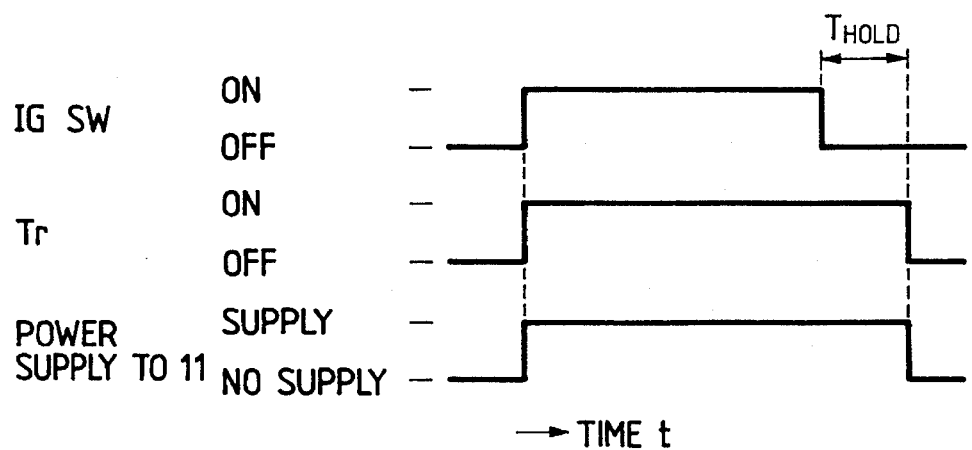
FIG. 39 is a timing chart showing the operation of the power holding circuit.

By the way, a power holding circuit 1100 shown in FIG. 38 is added for providing a power supply voltage after an engine stops. In FIG. 38, numeral 1001 is a relay and numeral 1002 is a transistor. The power holding circuit 1100 is provided to supply power to an electronic control unit 11 only for a predetermined time if a key switch 18 is opened as shown in FIG. 39.

Figure 40:
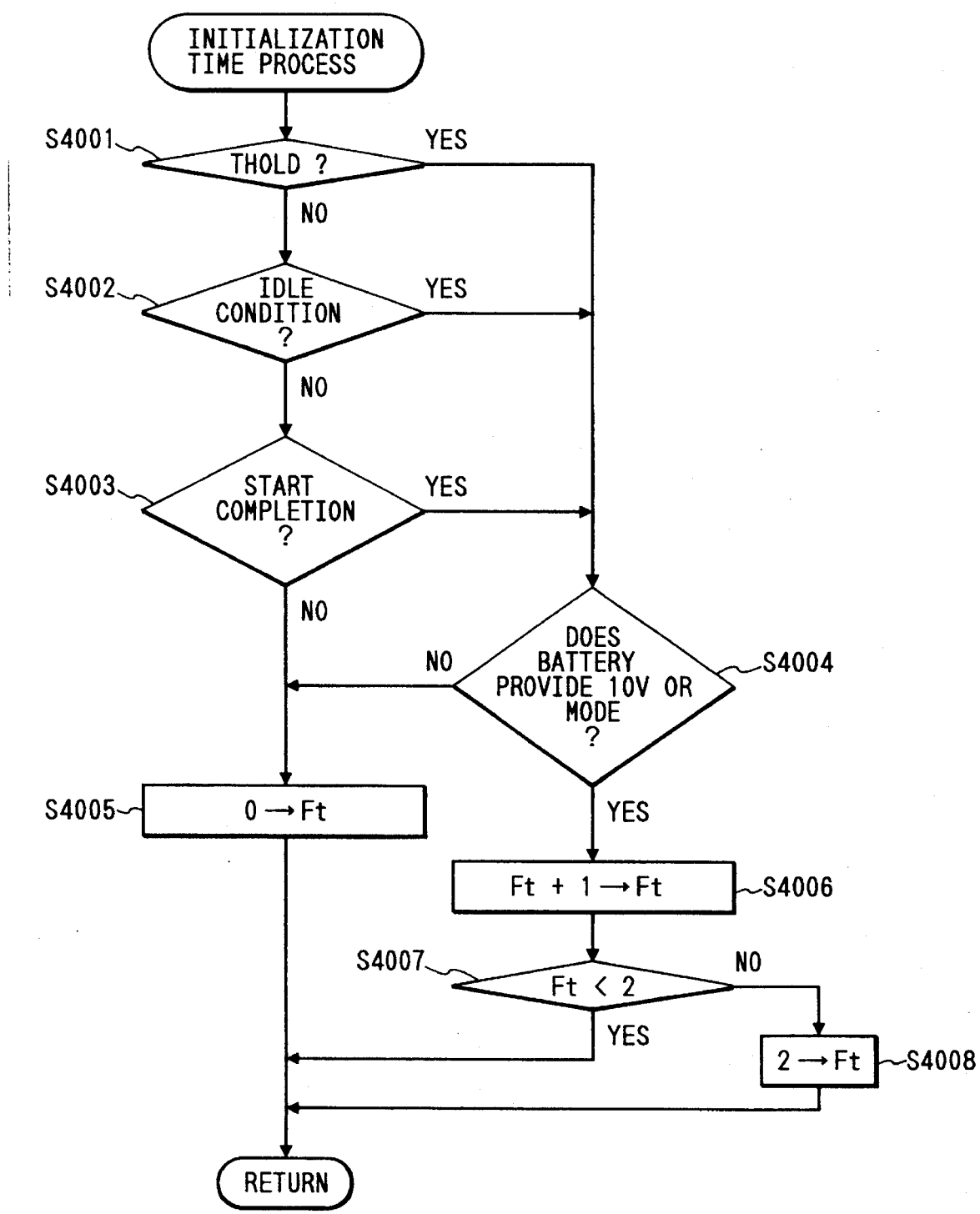
FIG. 40 is a detailed flowchart showing initialization time process according to the invention.

FIG. 40 is a flowchart of embodiment 10.

FIG. 40 is initialization time process not discussed above. Referring again to FIG. 6, another control process is executed at step S601 and whether or not the time is when initialization may be executed is determined at step S602. If so, initialization preparation is performed at step S603 and EGR control process is executed at step S604.

Now, referring to FIG. 40, the operation of the embodiment will be discussed.

At step S4001, whether or not the time is HOLD shown in FIG. 39 is determined by using a timer or counter for determining whether or not a predetermined time has elapsed since the key switch 18 was turned off. At step S4002, whether or not the engine is in an idle condition is determined and at step S4003, whether or not the time is the start completion time is determined from detection signals of detectors. If any run condition is applied at steps S4001 to S4003, whether or not a power supply is provided is determined at step S4004.

If no run conditions are applied at step S4001 to S4003 or no power supply is provided at step S4004, the time is not appropriate for initialization. To disable initialization, an initialization time flag Ft is set to 0 at step S4005 and the process is terminated.

If a run condition to allow initialization to be executed is applied and a power supply is provided, then one is added to the preceding initialization time flag Ft setup value at step S4006.

Steps S4001 to S4004 provide specific run condition detection means.

Steps S4006 to S4008 are steps for initializing only once when a specific run condition is entered.

That is, the process in FIG. 40, which is built in the main routine, is repeated several times in a specific run condition. Since initialization needs to be executed only once in the specific run condition, only when control first passes through step S4006, the initialization time flag Ft is set to 1, enabling initialization, and at the second or later time, the initialization time flag Ft is set to 2 at steps S4007 and S4008, disabling more than one initialization in the same run condition.

Although the initialization time flag Ft is set to 2, the initialization time flag Ft is set to 0 at step S4005 when the specific run condition is exited. Therefore, if a specific run condition is again entered, the initialization time flag Ft is set to 1 and initialization is executed.

Thus, initialization is frequently executed during engine control and even if the stepper motor moves out of adjustment, immediately a correction can be made.

Embodiment 11

In embodiment 11, initialization is executed even during EGR control. For example, if target stepper motor opening ST is fully closed, initialization is executed at the same time, thereby increasing initialization frequency.

Figure 41:
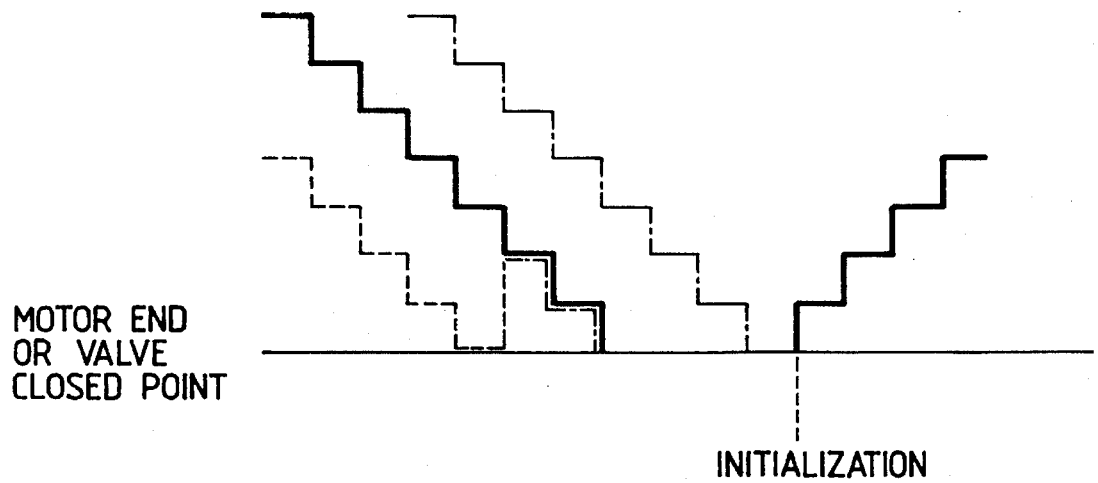
FIG. 41 is a timing chart showing initialization according to the invention.

In FIG. 41, the solid line indicates natural EGR valve motion, the broken line indicates motion when out-of-adjustment occurs in the valve closing direction, and the dot-dash line indicates motion when out-of-adjustment occurs in the valve opening direction.

Embodiment 11 is provided with specific target position detection means for detecting a specific target position by detecting the calculation value of the target stepper motor opening ST being 0. In this case, the specific target position is 0, namely, the valve open point of an EGR valve.

A specific flowchart of embodiment 11 is not provided here; as an example method, the value of the target stepper motor opening ST is checked and if ST=0, initialization time flag Fi is set to 1.

According to embodiment 11, control for fully closing the EGR valve and initialization are executed together, thus initialization can be executed without impairing the EGR control, and control precision and reliability can be improved.

Embodiment 12

Although the embodiment discussed above are the same in initialization method, embodiment 12 provides a simpler initialization method.

Specifically, embodiment 12 provides an EGR valve controller which enables accurate initialization without means for positioning the motor phase of a stepper motor at the motor end at a separate-type EGR valve.

Even if a separate-type EGR valve is not provided with positioning means such as a rotor stopper, the motor phase of a stepper motor at the motor end is defined as a certain motor phase. The motor phase is physically determined by mechanical dimensions, etc., and always becomes the same. At the time, a predetermined drive signal is given three times in sequence so as to drive the stepper motor three steps in the valve opening direction from phase 0, for example. If the motor phase at the motor end happens to be phase 0, the motor shaft moves three steps in the valve opening direction. If it is a different motor phase, the motor shaft may only move by one step in the valve opening direction, for example. However, even if it is a different motor phase, when the same drive signal (for driving the stepper motor three steps in the valve opening direction from phase 0) is given at each time at the motor end, resultantly the motor shaft stop position (point moving one step in the valve opening direction from the motor end) becomes the same at each time.

Embodiment 12 uses this characteristic; when initialization is executed, first the motor shaft is moved to the motor end, then a predetermined drive signal is given to the stepper motor in sequence and initialization is executed at the position where the motor shaft finally stops.

When the predetermined drive signal is given in sequence at the motor end, the position at which the motor shaft finally stops is previously checked, and may be adjusted to the valve open point by means of a spacer or screw member, etc., as second adjustment means.

Further, the motor phase at the valve open point is previously checked, and at initialization, is changed to a drive signal corresponding to the motor phase.

By the way, even if the motor phase at the valve open point is checked, it is a demanding task to change a program so that the drive signal corresponding to a predetermined phase in the program becomes a drive signal corresponding to the actually checked motor phase. For example, wiring to the stepper motor may be changed, as described in FIG. 15.

Thus, accurate initialization can be executed to the predetermined motor phase at the valve open point without means for positioning the motor phase at the motor end.

Embodiment 13

Embodiment 12 eliminates the need for the means for positioning the motor phase at the motor end, but involves the second adjustment means for adjusting the position at which the motor shaft finally stops to the valve open point of the EGR valve.

Embodiment 13 provides an EGR valve controller which eliminates the need for the second adjustment means as well as the positioning means and enables accurate initialization.

Embodiment 13 is applied to a separate-type EGR valve; when initialization is executed, first the motor shaft is pulled into the motor end.

Next, stepper motor is driven in the valve open direction by a drive signal of a frequency to cause the stepper motor to move out of adjustment when the motor shaft strikes against the valve shaft and is loaded although out-of-adjustment does not occur in a no-load condition. Then, the motor shaft is driven in the valve open direction until it strikes against the other end of the valve shaft. When it strikes against the valve shaft, a load is applied to the motor shaft and the stepper motor moves out of adjustment and the motor shaft stops.

The position at which the stepper motor moves out of adjustment and the motor shaft stops is the position at which the motor shaft strikes against the valve shaft, namely, the valve open point.

Therefore, if the drive signal is changed to a drive signal corresponding to a predetermined phase at the position, neither the positioning means nor second adjustment means is required.

Like embodiment 12, embodiment 13 also involves check of the motor phase of a stepper motor at the valve open point and adjustment (change of a program conforming to the motor phase at the valve open point or change of wiring to the stepper motor).

The drive frequency at which a stepper motor in a no-load condition moves out of adjustment is 300 Hz. The drive frequency at which a stepper motor moves out of adjustment when spring load 2 Kgf of a compression coil spring 310 is applied is 200 Hz. Therefore, the stepper motor may be driven by a drive signal having a frequency of 200–300 Hz in the embodiment.

Further, whether or not the motor shaft abuts against the other end of the valve shaft may be determined depending on whether or not a predetermined time has elapsed since the stepper motor was driven.

Embodiment 14

Embodiment 14 provides an EGR valve controller which enables accurate initialization without the positioning means or second adjustment means and is applicable to both an integral-type and separate-type EGR valves.

In embodiment 14, at initialization, the valve position of an EGR valve is once moved in the valve opening direction and then the valve is driven in the valve closing direction at a frequency that cannot be followed up by a stepper motor (400 Hz if the drive frequency that can be followed up is 300 Hz).

The stepper motor, which cannot follow up the drive signal, moves out of adjustment, and goes into a freewheeling condition (turns free). Compression coil spring 310 causes body 308 to move in the valve closing direction. Thus, the motor shaft and stepper motor 300 are pushed back in the valve closing direction. This continues until the body 308 sit in valve seat 309.

Therefore, the motor shaft is pushed back to the valve open point regardless of the integral type or separate type. After the motor shaft is pushed back to the valve open point, the drive signal is changed to a drive signal corresponding to a predetermined phase.

Like embodiment 12, embodiment 14 also involves check of the motor phase of a stepper motor at the valve open point and adjustment (change of a program conforming to the motor phase at the valve open point or change of wiring to the stepper motor).

Further, whether or not the motor shaft is pushed back to the valve open point may be determined depending on whether or not a predetermined time has elapsed since the stepper motor was driven.

Although the program or stepper motor wiring is changed when the motor phase is adjusted in embodiments 13 and 14, the above-mentioned first adjustment means may be used for adjustment, needless to say.

By the way, we have discussed embodiment 14 with the EGR valve; if embodiment 14 is applied to an idle rotation speed control valve, the body is moved in the valve closing direction rather than the opening direction and then the valve is driven at a high frequency.

This is because the idle rotation speed control valve generally is initialized at the fully open position.

The embodiments have been discussed for the EGR valves, but are applicable to general flow quantity valves using a stepper motor, such as idle rotation speed control valves.

Effects of the Invention

According to the invention, the following effects are produced:

The flow quantity valve controller according to claim 1 comprises means for positioning so that a phase of the stepper motor becomes a predetermined phase when the motor shaft is pulled most into the stepper motor side. When the motor shaft is pulled most into the stepper motor side, the stepper motor drive signal is changed to a drive signal corresponding to a predetermined phase. Thus, the flow quantity valve controller can perform accurate initialization.

The flow quantity valve controller according to claim 2 comprises the positioning means made of a spacer member provided between the motor case and the valve body or the shaft length of the motor shaft at an integral-type flow quantity valve. Thus, the stepper motor phase at initialization can be easily positioned to a predetermined phase.

The flow quantity valve controller according to claim 3 comprises the positioning means made up of lock members formed on the rotor and the motor shaft at a separate-type flow quantity valve. Thus, the stepper motor phase at initialization can be easily positioned to a predetermined phase.

The flow quantity valve controller according to claim 4 comprises first adjustment means for adjusting an interval between a position of the motor shaft when it is pulled most into the stepper motor side and the other end of the valve shaft at the fully closed position to a predetermined distance at a separate-type flow quantity valve. Thus, the interval between the motor shaft and the valve shaft is adjusted for improving control precision.

The flow quantity valve controller according to claim 5 comprises the first adjustment means made of a spacer member stacked between the motor case and the valve body at a separate-type flow quantity valve. Thus, the interval between the motor shaft and the valve shaft can be easily adjusted The flow quantity valve controller according to claim 6 comprises the first adjustment means made up of a screw groove formed at the a tip of one end of the motor shaft on the valve shaft side and a screw member threadedly engaging the screw groove at a separate-type flow quantity valve. Thus, the interval between the motor shaft and the valve shaft can be accurately and easily adjusted.

The flow quantity valve controller according to claim 7 comprises first drive method change means for changing the drive method of the stepper motor when initialization is executed at a position where the motor shaft is pulled most into the stepper motor side. Thus, it can prevent the stepper motor from moving out of adjustment at initialization.

The flow quantity valve controller according to claim 8 comprises the first drive method change means for lessening the drive signal frequency as compared with normal control time. Thus, it can prevent the stepper motor from moving out of adjustment at initialization.

The flow quantity valve controller according to claim 9 comprises the first drive method change means for lessening the travel distance of the stepper motor for each drive signal as compared with normal control time. Thus, it can prevent the stepper motor from moving out of adjustment at initialization.

The flow quantity valve controller according to claim 10 comprises the first drive method change means for driving the stepper motor by a PWM signal. Thus, it can more reliably prevent the stepper motor from moving out of adjustment at initialization.

The flow quantity valve controller according to claim 11 comprises the first drive method change means for lessening a driving force of the stepper motor as compared with normal control time. Thus, it can prevent the stepper motor from moving out of adjustment at initialization.

The flow quantity valve controller according to claim 12 comprises the first adjustment means for adjusting the distance between the position where the motor shaft is pulled most into the stepper motor side and the other end of the valve shaft at the fully closed position to less than a distance at which the motor shaft moves the number of steps twice the number of phases of the stepper motor. Thus, it can reliably suppress out-of-adjustment of the stepper motor at initialization to a predetermined amount or less.

The flow quantity valve controller according to claim 13 comprises second drive method change means for changing the drive method of the stepper motor when the driving direction of the stepper motor is changed. Thus, it can prevent the stepper motor from moving out of adjustment during control.

The flow quantity valve controller according to claim 14 comprises the second drive method change means for lessening the drive signal frequency as compared with normal control time. Thus, it can prevent the stepper motor from moving out of adjustment during control.

The flow quantity valve controller according to claim 15 comprises the second drive method change means for changing the drive direction after once holding the stepper motor. Thus, it can prevent the stepper motor from moving out of adjustment during control.

The flow quantity valve controller according to claim 16 comprises the second drive method change means for lessening the travel distance of the stepper motor for each drive signal as compared with normal control time. Thus, it can prevent the stepper motor from moving out of adjustment during control.

The flow quantity valve controller according to claim 17 comprises the second drive method change means for driving the stepper motor by a PWM signal. Thus, it can more reliably prevent the stepper motor from moving out of adjustment during control.

The flow quantity valve controller according to claim 18 comprises means for detecting a specific run condition and performs initialization only once whenever the specific run condition detection means detects a specific run condition. Thus, initialization frequency can be increased for improving control precision.

The flow quantity valve controller according to claim 19 sets the specific run condition to a run condition in which initialization may be executed. Thus, flow quantity valve control is not affected.

The flow quantity valve controller according to claim 20 comprises specific target position detection means for detecting the target position being a predetermined specific target position and performs initialization when the specific target position detection means detects a specific target position. Thus, even if flow quantity valve control is being performed, initialization can be executed without affecting the flow quantity valve control.

The flow quantity valve controller according to claim 21 comprises flow quantity valve control means, when the motor shaft is pulled most into the stepper motor side, for giving a predetermined drive signal to the stepper motor in sequence before initialization. The position of the motor shaft after the drive signal is given in sequence is adjusted to the other end of the valve shaft by second adjustment means. Thus, accurate initialization can be performed in a simple configuration.

The flow quantity valve controller according to claim 22 drives the stepper motor by a drive signal of a frequency at which out-of-adjustment does not occur in a no-load condition and occurs when the motor shaft abuts against the other end of the valve shaft and executes initialization after the stepper motor moves out of adjustment. Thus, accurate initialization can be performed in a simple configuration.

The flow quantity valve controller according to claim 23 drives the stepper motor by a drive signal of a frequency more than a frequency that can be followed up by the stepper motor and executes initialization after the body abuts against the valve seat. Thus, accurate initialization can be performed in a simple configuration.

The method for manufacturing a flow quantity valve according to claim 24 comprises the step of adjusting the interval between the position of a motor shaft when the motor shaft is pulled most into the stepper motor side and the other end of a valve shaft at the fully closed position to a predetermined distance by means of a spacer member. Thus, easy adjustment can be made.

The method for manufacturing a flow quantity valve according to claim 25 comprises the step of adjusting the interval between the position of a motor shaft when the motor shaft is pulled most into the stepper motor side and the other end of a valve shaft at the fully closed position to a predetermined distance by means of a screw member threadedly engaging a screw groove formed on the motor shaft. Thus, accurate adjustment can be easily made.

The method for manufacturing a flow quantity valve according to claim 26 comprises the step of stacking a spacer member between a motor case and a valve body for adjusting so that a phase of a stepper motor becomes a predetermined phase when a motor shaft is pulled most into the stepper motor side or providing a plurality of motor shafts different in shaft length and selecting one motor shaft from among them for adjusting. Thus, easy adjustment can be made.

The method for manufacturing a flow quantity valve according to claim 27 comprises the steps of providing a plurality of rotors or motor shafts different in position of positioning means and selecting one rotor or motor shaft from among them so that a phase of a stepper motor becomes a predetermined phase when the motor shaft is pulled most into the stepper motor side. Thus, easy adjustment can be made.

The method for manufacturing a flow quantity valve according to claim 28 comprises the step of changing signal lines of drive signal of a stepper motor so that the stepper motor phase when a motor shaft is at a predetermined position becomes a predetermined phase. Thus, easy adjustment can be made.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A flow quantity valve controller comprising:
   a flow quantity valve of a stepper motor type for controlling a flow quantity of a fluid flowing through a flow path disposed in an internal combustion engine;
   means for detecting a run condition of the internal combustion engine;
   means for calculating a target position of said flow quantity valve based on a detection output of said run condition detection means;
   means for calculating an assumed position of said flow quantity valve; and flow quantity valve control means for generating a drive signal to control said flow quantity valve to the target position based on calculation results of said target position calculation means; and
   said assumed position calculation means;
   wherein said flow quantity valve control means includes specific target position detection means for detecting the target position being a predetermined specific target position and performing initialization when said specific target position detection means detects a specific target position.

2. A flow quantity valve controller comprising:

a flow quantity valve of a stepper motor type for controlling a flow quantity of a fluid flowing through a flow path disposed in an internal combustion engine;

means for detecting a run condition of the internal combustion engine;

means for calculating a target position of said flow quantity valve based on a detection output of said run condition detection means;

means for calculating an assumed position of said flow quantity valve;

flow quantity valve control means for generating a drive signal to control said flow quantity valve to the target position based on calculation results of said target position calculation means and said assumed position calculation means;

a motor case for housing the stepper motor;

a valve body being stacked with said motor case for forming outer walls of said flow quantity valve in conjunction with said motor case;

a motor shaft threadedly engaging a rotor of the stepper motor for making a linear move with rotation of the rotor;

an energized valve shaft having a body of said flow quantity valve on one end and having the other end abutting against said motor shaft for being linearly moved;

a valve seat abutting against said body for blocking said flow quantity valve and positioning a fully closed position of said valve shaft; and adjustment means for adjusting a position of said motor shaft;

wherein said flow quantity valve control means, when said motor shaft is pulled most into the stepper motor side, gives a predetermined drive signal to the stepper motor in sequence before initialization, while the position of said motor shaft after the drive signal is given in sequence is adjusted to the other end of said valve shaft by said second adjustment means.

3. A flow quantity valve controller comprising:

a flow quantity valve of a stepper motor type for controlling a flow quantity of a fluid flowing through a flow path disposed in an internal combustion engine;

means for detecting a run condition of the internal combustion engine;

means for calculating a target position of the stepper motor of said flow quantity valve based on a detection output of said run condition detection means;

means for calculating an assumed position of the stepper motor;

flow quantity valve control means for controlling the stepper motor to the target position based on calculation results of said target position calculation means and said assumed position calculation means;

a motor case for housing the stepper motor;

a valve body being stacked with said motor case for forming outer walls of said flow quantity valve in conjunction with said motor case;

a motor shaft threadedly engaging a rotor of the stepper motor for making a linear move with rotation of the rotor;

an energized valve shaft having a body of said flow quantity valve on one end and having the other end abutting against said motor shaft for being linearly moved; and a valve seat abutting against said body for blocking said flow quantity valve and positioning a fully closed position of said valve shaft;

wherein said flow quantity valve control means drives the stepper motor according to a drive signal of a frequency at which out-of-adjustment does not occur in a no-load condition and occurs when said motor shaft abuts against the other end of said valve shaft and executes initialization after the stepper motor moves out of adjustment.

4. A flow quantity valve controller comprising:

a flow quantity valve of a stepper motor type for controlling a flow quantity of a fluid flowing through a flow path disposed in an internal combustion engine;

means for detecting a run condition of the internal combustion engine;

means for calculating a target position of the stepper motor of said flow quantity valve based on a detection output of said run condition detection means;

means for calculating an assumed position of the stepper motor;

flow quantity valve control means for controlling the stepper motor to the target position based on calculation results of said target position calculation means and said assumed position calculation means;

a motor case for housing the stepper motor;

a valve body being stacked with said motor case for forming outer walls of said flow quantity valve in conjunction with said motor case;

a motor shaft threadedly engaging a rotor of the stepper motor for making a linear move with rotation of the rotor;

an energized body linearly moved by said motor shaft; and a valve seat abutting against said body for blocking said flow quantity valve and positioning a fully closed position of said body;

wherein said flow quantity valve control means drives the stepper motor according to a drive signal of a frequency more than a frequency that can be followed up by the stepper motor and executes initialization after said body abuts against said valve seat.

5. A method for manufacturing a flow quantity valve comprising a motor case for housing a stepper motor, a valve body being stacked with said motor case for forming outer walls in conjunction with said motor case, a spacer member stacked between said motor case and said valve body, a motor shaft threadedly engaging a rotor of the stepper motor for making a linear move with rotation of the rotor, an energized valve shaft having a body on one end and having the other end abutting against said motor shaft for being linearly moved, and a valve seat abutting against said body for blocking said flow quantity valve and positioning a fully closed position of said valve shaft, said method comprising the step of:

adjusting an interval between a position of said motor shaft when said motor shaft is pulled most into the stepper motor side and the other end of said valve shaft at the fully closed position to a predetermined distance by means of said spacer member.

6. A method for manufacturing a flow quantity valve comprising a motor shaft threadedly engaging a rotor of a stepper motor for making a linear move with rotation of the rotor, an energized valve shaft having a body on one end and having the other end abutting against said motor shaft for being linearly moved, and a valve seat abutting against said body for blocking said flow quantity valve and positioning a fully closed position of said valve shaft, said motor shaft having a screw groove formed at a tip of one end on said valve shaft side and a screw member threadedly engaging said screw groove, said method comprising the step of:

adjusting an interval between a position of said motor shaft when said motor shaft is pulled most into the stepper motor side and the other end of said valve shaft at the fully closed position to a predetermined distance by means of said screw member.

7. A method for manufacturing a flow quantity valve comprising a motor case for housing a stepper motor, a valve body being stacked with said motor case for forming outer walls in conjunction with said motor case, a motor shaft threadedly engaging a rotor of the stepper motor for making a linear move with rotation of the rotor, an energized body linearly moved integrally with said motor shaft, and a valve seat abutting against said body for blocking said flow quantity valve and positioning a fully closed position of said body, said method comprising the step of:

stacking a spacer member between said motor case and said valve body for adjusting so that a phase of the stepper motor becomes a predetermined phase when said motor shaft is pulled most into the stepper motor side or providing a plurality of motor shafts different in shaft length and selecting one motor shaft from among them for adjusting.

8. A method for manufacturing a flow quantity valve comprising a motor shaft threadedly engaging a rotor of a stepper motor for making a linear move with rotation of the rotor and positioning means being provided on said rotor and said motor shaft for positioning a position where said motor shaft is pulled most into the stepper motor side, said method comprising the steps of:

providing a plurality of rotors or motor shafts different in position of said positioning means and selecting one rotor or motor shaft from among them so that a phase of the stepper motor becomes a predetermined phase when said motor shaft is pulled most into the stepper motor side.

9. A method for manufacturing a flow quantity valve comprising a motor shaft threadedly engaging a rotor of a stepper motor for making a linear move with rotation of the rotor, said method comprising the step of:

changing signal lines of drive signal of the stepper motor to set a phase of the stepper motor when said motor shaft is at a predetermined position to a predetermined phase.

10. A flow quantity valve controller comprising:

a flow quantity valve of a stepper motor type for controlling a flow quantity of a fluid flowing through a flow path disposed in an internal combustion engine;

means for detecting a run condition of the internal combustion engine;

means for calculating a target position of said flow quantity valve based on a detection output of said run condition detection means;

means for calculating an assumed position of said flow quantity valve;

flow quantity valve control means for generating a drive signal to control said flow quantity valve to the target position based on calculation results of said target position calculation means and said assumed position calculation means;

a motor case for housing the stepper motor;

a valve body being stacked with said motor case for forming outer walls of said flow quantity valve in conjunction with said motor case;

a motor shaft threadedly engaging a rotor of the stepper motor for making a linear move with rotation of the rotor;

an energized valve shaft having a body of said flow quantity valve on one end and having the other end abutting against said motor shaft for being linearly moved;

a valve seat abutting against said body for blocking said flow quantity valve and positioning a fully closed position of said valve shaft; and first adjustment means for adjusting an interval between a position of said motor shaft when it is pulled most into the stepper motor side and the other end of said valve shaft at the fully closed position to a predetermined distance.

11. The flow quantity valve controller as claimed in claim 10, wherein said first adjustment means comprises a spacer member stacked between said motor case and said valve body.

12. The flow quantity valve controller as claimed in claim 10, wherein said first adjustment means comprises a screw groove formed at a tip of one end of said motor shaft on the valve shaft side and a screw member threadedly engaging said screw groove.

13. The flow quantity valve controller as claimed in claim 10, wherein said first adjustment means adjusts the predetermined distance to less than a distance at which said motor shaft moves the number of steps twice the number of phases of the stepper motor.

14. A flow quantity valve controller comprising:

a flow quantity valve of a stepper motor type for controlling a flow quantity of a fluid flowing through a flow path disposed in an internal combustion engine;

means for detecting a run condition of the internal combustion engine;

means for calculating a target position of said flow quantity valve based on a detection output of said run condition detection means;

means for calculating an assumed position of said flow quantity valve;

flow quantity valve control means for generating a drive signal to control said flow quantity valve to the target position based on calculation results of said target position calculation means and said assumed position calculation means;

a motor case for housing the stepper motor;

a valve body being stacked with said motor case for forming outer walls of said flow quantity valve in conjunction with said motor case;

a motor shaft threadedly engaging a rotor of the stepper motor for making a linear move with rotation of the rotor;

an energized body linearly moved by means of said motor shaft;

a valve seat abutting against said body for blocking said flow quantity valve and positioning a fully closed position of said body; and means for positioning so that a phase of the stepper motor when said motor shaft is pulled most into the stepper motor side becomes a predetermined phase;

wherein said flow quantity valve control means changes a drive signal of the stepper motor to a drive signal corresponding to the predetermined phase when said motor shaft is pulled most into the stepper motor side.

15. The flow quantity valve controller as claimed in claim 14, wherein said body is formed integrally with said motor shaft, and wherein said positioning means comprises one of a spacer member stacked between said motor case and said valve body and a shaft length of said motor shaft.

16. The flow quantity valve controller as claimed in claim 14, wherein said body is provided on one end of a valve shaft abutting against said motor shaft for being linearly moved, and wherein said positioning means comprises lock members formed on the rotor and said motor shaft.

17. The flow quantity valve controller as claimed in claim 14, wherein said flow quantity valve control means includes means for detecting a specific run condition based on a detection output of said run condition detection means and performs initialization only once whenever said specific run condition detection means detects a specific run condition.

18. The flow quantity valve controller as claimed in claim 17, wherein said specific run condition detection means detects the time being within a predetermined time after the engine stops, being in an idling condition, or being at start completion at which a power supply voltage is a predetermined voltage or more.

19. A flow quantity valve controller comprising:

a flow quantity valve of a stepper motor type for controlling a flow quantity of a fluid flowing through a flow path disposed in an internal combustion engine;

means for detecting a run condition of the internal combustion engine;

means for calculating a target position of said flow quantity valve based on a detection output of said run condition detection means;

means for calculating an assumed position of said flow quantity valve;

flow quantity valve control means for generating a drive signal to control said flow quantity valve to the target position based on calculation results of said target position calculation means and said assumed position calculation means;

a motor case for housing the stepper motor;

a valve body being stacked with said motor case for forming outer walls of said flow quantity valve in conjunction with said motor case;

a motor shaft threadedly engaging a rotor of the stepper motor for making a linear move with rotation of the rotor;

an energized body linearly moved by said motor shaft; and a valve seat abutting against said body for blocking said flow quantity valve and positioning a fully closed position of said body;

wherein said flow quantity valve control means includes first drive method change means for changing a drive method of the stepper motor when initialization is executed at a position where said motor shaft is pulled most into the stepper motor side.

20. The flow quantity valve controller as claimed in claim 19, wherein said first drive method change means lessens a drive signal frequency as compared with normal control time.

21. The flow quantity valve controller as claimed in claim 19, wherein said first drive method change means lessens a driving force of the stepper motor as compared with normal control time.

22. The flow quantity valve controller as claimed in claim 19, wherein said first drive method change means lessens a travel distance of the stepper motor for each drive signal as compared with normal control time.

23. The flow quantity valve controller as claimed in claim 22, wherein said first drive method change means drives the stepper motor by a PWM signal.

24. A flow quantity valve controller comprising:

a flow quantity valve of a stepper motor type for controlling a flow quantity of a fluid flowing through a flow path disposed in an internal combustion engine;

means for detecting a run condition of the internal combustion engine;

means for calculating a target position of said flow quantity valve based on a detection output of said run condition detection means;

means for calculating an assumed position of said flow quantity valve;

flow quantity valve control means for generating a drive signal to control said flow quantity valve to the target position based on calculation results of said target position calculation means and said assumed position calculation means;

a motor case for housing the stepper motor;

a valve body being stacked with said motor case for forming outer walls of said flow quantity valve in conjunction with said motor case;

a motor shaft threadedly engaging a rotor of the stepper motor for making a linear move with rotation of the rotor;

an energized body linearly moved by means of said motor shaft; and a valve seat abutting against said body for blocking said flow quantity valve and positioning a fully closed position of said body;

wherein said flow quantity valve control means includes second drive method change means for changing a drive method of the stepper motor when the driving direction of the stepper motor is changed.

25. The flow quantity valve controller as claimed in claim 24, wherein said second drive method change means lessens a drive signal frequency as compared with normal control time.

26. The flow quantity valve controller as claimed in claim 24, wherein said second drive method change means changes the drive direction after once holding the stepper motor.

27. The flow quantity valve controller as claimed in claim 24, wherein said second drive method change means lessens a travel distance of the stepper motor for each drive signal as compared with normal control time.

28. The flow quantity valve controller as claimed in claim 27, wherein said second drive method change means drives the stepper motor by a PWM signal.

* * * * *